United States Patent
Hashimoto et al.

(10) Patent No.: US 10,437,867 B2
(45) Date of Patent: Oct. 8, 2019

(54) SCENARIO GENERATING APPARATUS AND COMPUTER PROGRAM THEREFOR

(71) Applicant: National Institute of Information and Communications Technology, Tokyo (JP)

(72) Inventors: Chikara Hashimoto, Tokyo (JP); Kentaro Torisawa, Tokyo (JP); Motoki Sano, Tokyo (JP); Yulan Yan, Tokyo (JP); Yutaka Kidawara, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 454 days.

(21) Appl. No.: 15/104,882

(22) PCT Filed: Dec. 17, 2014

(86) PCT No.: PCT/JP2014/083454
§ 371 (c)(1),
(2) Date: Jun. 15, 2016

(87) PCT Pub. No.: WO2015/093541
PCT Pub. Date: Jun. 25, 2015

(65) Prior Publication Data
US 2016/0357854 A1      Dec. 8, 2016

(30) Foreign Application Priority Data
Dec. 20, 2013 (JP) .................... 2013-264599

(51) Int. Cl.
*G09B 17/00* (2006.01)
*G06F 16/332* (2019.01)
(Continued)

(52) U.S. Cl.
CPC ...... *G06F 16/3329* (2019.01); *G06F 16/2365* (2019.01); *G06F 16/3344* (2019.01);
(Continued)

(58) Field of Classification Search
None
See application file for complete search history.

(56) References Cited

U.S. PATENT DOCUMENTS

| 4,633,435 A | 12/1986 | Morimoto et al. |
| 9,037,967 B1 | 5/2015 | Al-Jefri et al. |

(Continued)

FOREIGN PATENT DOCUMENTS

| CN | 101872341 A | 10/2010 |
| CN | 102737013 A | 10/2012 |

(Continued)

OTHER PUBLICATIONS

M. Tsuchida et al., "Analogy-based Relation Acquisition Using Distributionally Similar Words", Transactions of Information Processing Society of Japan, IPSJ Journal vol. 52, No. 4, pp. 1761-1776, Apr. 15, 2011.

(Continued)

*Primary Examiner* — Thu N Nguyen
(74) *Attorney, Agent, or Firm* — Renner, Otton, Boisselle & Sklar, LLP

(57) ABSTRACT

[Object] An object of the present invention is to provide a system for collecting elements as a basis for generating a social scenario useful for people to make well-balanced good decision.
[Solution] A scenario generating apparatus includes: a causality phrase pair DB 70 storing causality phrase pairs; synonimity generators 600, 602 and 604, searching, for each of the causality phrase pairs, causality phrase pairs having a cause phrase with causal consistency with the result phrase (Continued)

of the causality phrase pair, and generating join information for joining causality phrase pairs; join relation DB 610 storing the join information; and a causality joining unit 612 joining, to a result phrase of a causality phrase pair, a causality phrase pair having a cause phrase with causal consistency with the phrase by using the join information, and thereby linking causality. A join relation generator 606 that finds a hidden relation between phrases and linking causality phrase pairs may be provided.

15 Claims, 18 Drawing Sheets

(51) Int. Cl.
*G06F 16/23* (2019.01)
*G06F 16/33* (2019.01)
*G06Q 50/00* (2012.01)
*G06F 17/27* (2006.01)
*G06N 5/02* (2006.01)

(52) U.S. Cl.
CPC ........... *G06F 17/2785* (2013.01); *G06N 5/02* (2013.01); *G06Q 50/01* (2013.01)

(56) References Cited

U.S. PATENT DOCUMENTS

| | | |
|---|---|---|
| 2005/0033569 A1 | 2/2005 | Yu |
| 2005/0091038 A1 | 4/2005 | Yi |
| 2005/0119874 A1 | 6/2005 | Ishikura |
| 2005/0273314 A1 | 12/2005 | Chang et al. |
| 2006/0041424 A1 | 2/2006 | Todhunter et al. |
| 2006/0179050 A1* | 8/2006 | Giang .............. G06F 17/30687 |
| 2007/0233465 A1 | 10/2007 | Sato |
| 2009/0150139 A1 | 6/2009 | Jianfeng |
| 2010/0138211 A1 | 6/2010 | Shi et al. |
| 2010/0275179 A1 | 10/2010 | Mengusoglu |
| 2011/0078167 A1 | 3/2011 | Sundaresan |
| 2011/0131642 A1 | 6/2011 | Hamura |
| 2012/0029908 A1 | 2/2012 | Takamatsu |
| 2012/0179682 A1 | 7/2012 | De Saeger et al. |
| 2012/0296845 A1 | 11/2012 | Andrews et al. |
| 2012/0330976 A1 | 12/2012 | Tsuchida et al. |
| 2013/0172026 A1* | 7/2013 | Odell .................... H04L 51/046 455/466 |
| 2013/0204611 A1 | 8/2013 | Tsuchida et al. |
| 2013/0318172 A1* | 11/2013 | Liberty ................ G06Q 10/107 709/206 |
| 2014/0095425 A1* | 4/2014 | Sipple .................... G06N 7/005 706/52 |
| 2015/0039296 A1* | 2/2015 | Hashimoto ......... G06F 17/2785 704/9 |
| 2015/0095017 A1 | 4/2015 | Mnih et al. |
| 2017/0177710 A1* | 6/2017 | Burlik .................... G06F 16/243 |

FOREIGN PATENT DOCUMENTS

| | | |
|---|---|---|
| CN | 102770857 | 11/2012 |
| CN | 103221947 | 7/2014 |
| JP | 2009-059323 A | 3/2009 |
| JP | 2011-053776 A | 3/2011 |
| JP | 2013-130929 A | 7/2013 |
| JP | 2013-175097 A | 9/2013 |

OTHER PUBLICATIONS

D. Ishikawa et al., "Generation and Verification of a hypothesis by Analogical Reasoning using Causal Relationships in Patent Documents—Life Science Fields as an Example—", Proceedings of Annual Conference of Japan Society of Information and Knowledge, vol. 17, No. 3, pp. 164-181, Sep. 18, 2007.

J. Oh et al., "Improving Why Question Answering Using Semantic Orientation and Semantic Word Classes", Transactions of Information Processing Society of Japan, IPSJ Journal vol. 54, No. 7, pp. 1951-1966, Jul. 15, 2013.

S. De Saeger et al., "Semantic acquisition from a very low frequency syntax pattern", Proceedings of the 17th annual meeting of the Association for Natural Language, pp. 9-12, Mar. 31, 2011 (With partial English translation).

Extended European Search Report dated Nov. 8, 2017 for corresponding Application No. 14870811.8-1879 / 3086239 PCT/JP2014083454.

K. Radinsky et al: "Mining the web to predict future events", Web Search and Data Mining, ACM, 2 Penn Plaza, Suite 701 New York NY 10121-0701 USA. Feb. 4, 2013 (Feb. 4, 2013), pp. 255-264.

C. Hashimo To et al: "Toward Future Scenario Generation: Extracting Event Causality Exploiting Semantic Relation, Context, and Association Features", Proceedings of the 52nd Annual Meeting of the Association for Computational Linguistics (vol. 1: Long Papers), Jun. 23, 2014 (Jun. 23, 2014), pp. 987-997.

Jong-Hoon Oh et al: "Why Question Answering using Sentiment Analysis and Word Classes", Proceedings of the 2012 Joint Conference on Empirical Methods in Natural Language Processing and Computational Natural Language Learning, Jan. 1, 2012 (Jan. 1, 2012), pp. 368-378.

Co-pending U.S. Appl. No. 15/104,770, filed Jun. 15, 2016.

Co-pending U.S. Appl. No. 15/104,856, filed Jun. 15, 2016.

International Search report for corresponding International Application No. PCT/JP2014/083454 dated Mar. 17, 2015.

H. Takamura et al., "Extracting Semantic Orientations of Words using Spin Model", In Proceedings of the 43rd Annual Meeting of the ACL, pp. 133-140. 2005.

T. Nasukawa, et al., "Acquisition of Sentiment Lexicon by Using Context Coherence", IPSJ SIG Technical Report, Jul. 16, 2004(Jul. 16, 2004), vol. 2004, No. 73, pp. 109-116.

T. Inui et al., "Extracting Causal Knowledge from Text—The Case of Resultative Connectives 'tame'", IPSJ SIG Technical Report, Jul. 16, 2002(Jul. 16, 2002), vol. 2002, No. 66, pp. 171-178.

C. Hashimoto et al., "Excitatory or Inhibitory: A New Semantic Orientation Extracts Contradiction and Causality from the Web", Proceedings of EMNLP-CoNLL 2012: Conference on Empirical Methods in Natural Language Processing and Natural Language Learning, Poster, pp. 619-630. 2012.

C. Hashimoto et al., "Fundamental Language Resources", Journal of the National Institute of Information and Communications Technology vol. 59 Nos. 3/4 2012.

R. Girju, "Automatic Detection of Causal Relations for Question Answering", In Proceedings of ACL Workshop on Multilingual Summarization and Question Answering, 2003.

T. Sato et al., "Assessing the Plausibility of Inference Based on Automated Construction of Causal Networks Using Web-Mining", Sociotechnica, vol. 2006, No. 4, Sociotechnology Research Network, Dec. 28, 2007(Dec. 28, 2007), pp. 66-74.

H.Aono et al., "Construction of a Causal Network by Searching Factors", IPSJ SIG Technical Report, Jan. 18, 2010 (Jan. 18, 2010), pp. 1-8.

K.Radinsky et al., "Learning Causality for News Events Prediction", In Proceedings of International World Wide Web Conference 2012, pp. 909-918.

S. De Saeger et al., "Relation Acquisition using Word Classes and Partial Patterns", Proceedings of the 2011 Conference on Empirical Methods in Natural Language Processing, pp. 825-835.

\* cited by examiner

SCENARIO GENERATING APPARATUS AND COMPUTER PROGRAM THEREFOR

TECHNICAL FIELD

The present invention relates to a technique for generating, from pieces of information described on a huge amount of documents, information consisting of chained causality relations considering every risk and chance in a scope far exceeding the information described in the documents.

BACKGROUND ART

In a modern society where activities are complicated and of grand-scale and their influences are global, it is important how to predict or forecast the future. One will be able to avoid an "unexpected contingency" when he/she is well prepared based on the prediction. Such a prediction is essential to make well-balanced decisions in politics, economics and other various situations of everyday life.

In view of the fact that a formidable amount of ever-changing information is to be considered, correct prediction would be difficult to make if one relies only on one's limited knowledge and imagination. Prediction of limited events within limited scope of data has been practically used as in weather forecast, the very concept of applying such an idea to the social movements has been non-existent.

CITATION LIST

Non Patent Literature

NPL 1: Hiroya Takamura, Takashi Inui, and Manabu Okumura. Extracting Semantic Orientations of Words Using Spin Model. In Proceedings of the 43$^{rd}$ Annual Meeting of the ACL, pp. 133-140. 2005. (A scheme for automatically calculating polarity values)

SUMMARY OF INVENTION

Technical Problem

A computer is a powerful tool reinforcing individual ability. For example, computers have far superior ability to memorize information as compared with an individual. Further, highly advanced techniques of natural language processing have been developed. Question-answering systems making full use of such information storage ability and the natural language processing techniques have been realized, and now it is possible to provide, with high accuracy, correct answers to questions uttered in natural languages.

Such prior art techniques, however, cannot provide any answer to question of "what will happen" type, though they can provide answers to a so-called "what" type question of "what is XX?" Therefore, it is difficult to solve such a problem as described above related to future prediction. To solve this problem, it would be helpful to predict events that could happen in the future, considering every risk and chance using computer power, for better decision making by people. In the present specification, information referred to as a "social scenario" consisting of chained causality is generated for such a prediction. For conventional question-answering systems, it has been impossible to predict future and thereby providing information useful for decision making by the people. In order to realize such a process, it is necessary to collect elements forming causality from general pieces of information in natural languages, in order to generate social scenarios.

Therefore, an object of the present invention is to provide a system for collecting elements forming a basis for generating social scenarios useful for the people to make well-balanced good decision.

Solution to Problem

According to a first aspect, the present invention provides a scenario generating apparatus, including: phrase pair storage means for storing a large number of causality phrase pairs; and scenario generating means for generating a scenario formed of a series of phrases, by linking those of the phase pairs stored in the phrase pair storage means which are linkable as causality. Each of the large number of causality phrase pairs includes a cause phrase and a result phrase of causality. Each phrase includes a noun and a predicate template following the noun. The scenario generating means includes: join information generating means, for searching the phrase pair storage means, for each of the large number of causality phrase pairs, for a causality phrase pair having a cause phrase with causal consistency with the result phrase of the causality phrase pair and for generating join information for joining causality phrase pairs; join information storage means for storing the join information generated by the join information generating means; initial scenario designating means for designating an arbitrary phrase pair as an initial scenario; and linking means for searching the phrase pair storing means for a phrase pair having a cause phrase having causal consistency with a result phrase at a tail of a scenario, using the join information stored in the join information storage means, and for linking the searched out causality phrase pair to the tail of the scenario. The linking means continues linking, starting from the initial scenario designated by the initial scenario designating means, a causality phrase pair to the tail of the scenario until a predetermined end condition is satisfied, thereby generating a scenario.

Preferably, a polarity is assigned beforehand to the predicate template, and the linking means detects from the phrase pair storage means the phrase pair having causal consistency using the polarity of predicate template included in each phrase.

More preferably, the join information generating means includes means for searching the phrase pair storage means, for each of the large number of causality phrase pairs, for a causality phrase pair having a cause phrase sharing a noun of semantic sameness with a result phrase of the causality phrase pair and having a predicate template of the same polarity, and for generating join information for joining from the original causality phrase pair to the searched out causality phrase pair.

More preferably, the join information generating means includes means for searching the phrase pair storage means, for each of the large number of causality phrase pairs, for a causality phrase pair having a cause phrase sharing a noun of semantic sameness with a result phrase of the causality phrase pair and having same sentiment polarity as a whole phrase, and for generating join information for joining from the original causality phrase pair to the searched out causality phrase pair.

More preferably, the join information generating means includes: distributional similarity storage means for storing distributional similarity of predicate templates in a corpus; and means for searching the phrase pair storage means, for each of the large number of causality phrase pairs, for a causality phrase pair having a cause phrase sharing a noun of semantic sameness with a result phrase of the causality phrase pair and having the distributional similarity of predicate template equal to or higher than a threshold value, and for generating join information for joining from the original causality phrase pair to the searched out causality phrase pair.

The join information generating means may further include: word pair storage means for storing a word pair consisting of first and second words having a prescribed semantic relation with each other, with a word order of first to second; and means for generating, for each of the word pairs stored in the word pair storage means, connection information for connecting a causality phrase pair having the first word of the word pair to a causality phrase pair having the second word of the word pair.

According to a second aspect, the present invention provides a computer program causing a computer to function as all means of any of the scenario generating apparatuses described above.

DESCRIPTION OF EMBODIMENTS

Figure 1:
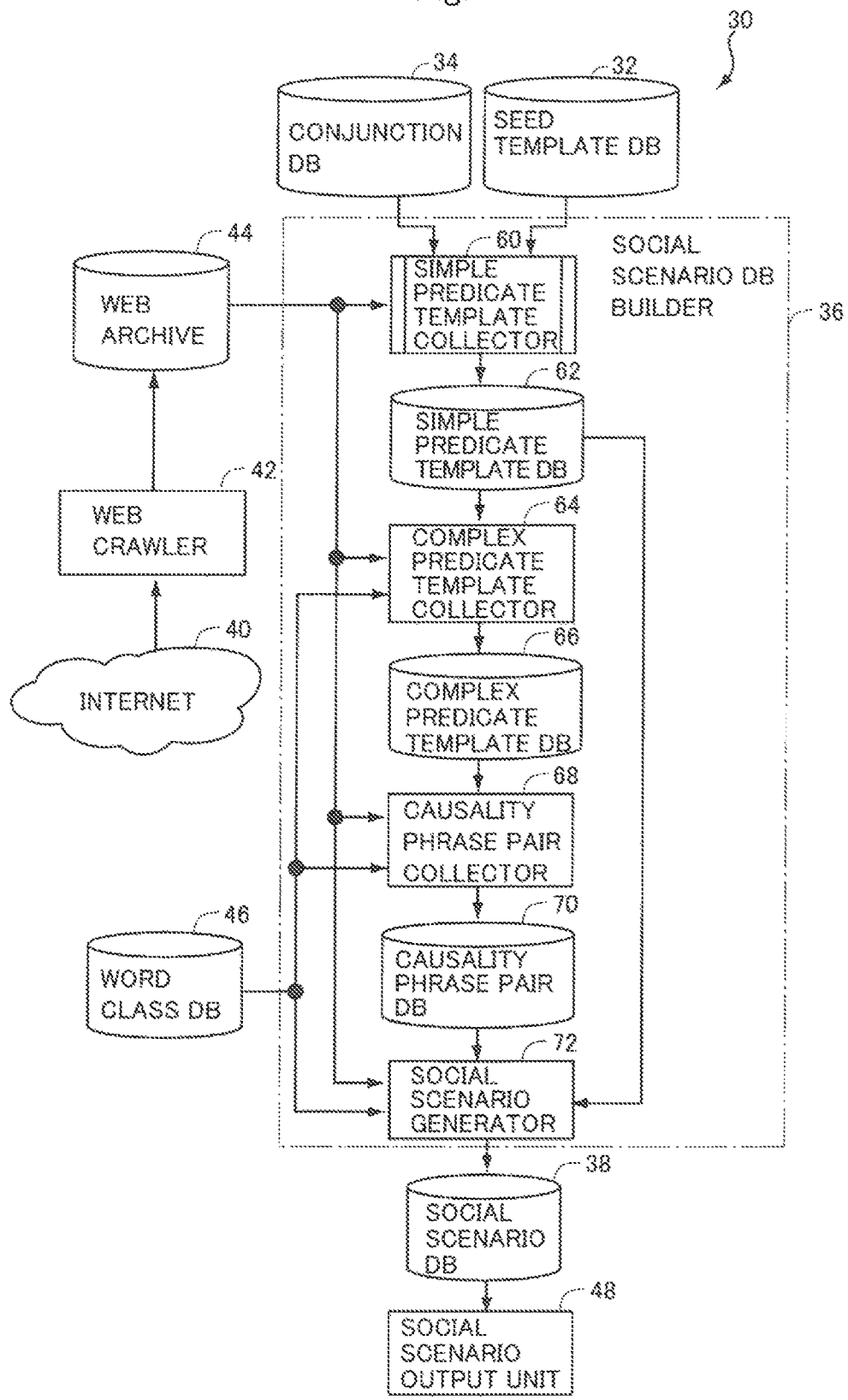
FIG. 1 is a block diagram of a social scenario generating system in accordance with a first embodiment of the present invention.

In the following description and in the drawings, the same components are denoted by the same reference characters. Therefore, detailed description thereof will not be repeated.

In the following description, first, basic concepts used in the embodiments will be described. Further, how a causality expression can be recognized by using such concepts will be described. Then, how to generate a social scenario using the recognized causality relations will be demonstrated.

Though the following description is directed to Japanese, simple predicate templates and complex predicate templates in languages other than Japanese can also be collected based on the idea similar to that described in the following, considering the characteristics of the language of interest.

[Basic Concept]

<<Predicate Template>>

A predicate template as used herein is an element of a sentence forming causality. In the present embodiment, predicate templates are classified to simple predicate templates and complex predicate templates. In the following description, the simple predicate templates and the complex predicate templates are generally referred to as predicate templates. As will be described later, a polarity is added to a predicate template.

<<Simple Predicate Template>>

In Japanese, a combination of a particle and a predicate (example: <wo, taberu> (eat XX)), connecting one particle with one predicate will be referred to as a "simple predicate template." Examples may include "ga shinko suru (something proceeds)," "wo fusegu (prevent something)," "ga kengen suru (something appears)." Here, in a sentence, a subject, an object or the like of the predicate is positioned immediately preceding a particle forming a simple predicate template.

<<Complex Predicate Template>>

In Japanese, a combination connecting a particle "の (pronounced 'no')," a noun, and a simple predicate template will be referred to as a "complex predicate template." In the present embodiment, the noun includes a so-called sahen-noun, a "trouble-noun," which will be described later, and a quantifier noun. Examples include "no gensho ga shinko suru (reduction of something proceeds)," "no yokusei wo fusegu (prevent restraint of something)," "no jiko wo fusegu (prevent accident of something)," "no ketten ga kengensuru (defect of something appears)," and "no daisu wo fuyasu (increase the number of something)."

<<Phrase>>

In Japanese, a phrase refers to character strings having a form of noun+predicate template. A phrase is considered to represent some piece of event or action.

<<Causality>>

In the present embodiment, causality consists of a phrase (cause phrase) describing some piece of event or action as a cause and a phrase (result phrase) describing some event or action as a result.

<<Polarity>>

In the following, polarity of a predicate template will be described. Then, a method of automatically obtaining polarities of simple predicate templates and complex predicate templates will be described. Finally, an application of the classified predicate templates will be described.

(1) Polarity of Predicate Template

In the present embodiment, predicate templates appearing in texts as inputs to the entire system will be classified to three types shown in Table 1 below.

TABLE 1

| Classification | Description |
|---|---|
| <Excitatory> | Predicate template describing an event having an orientation to increase or stimulate a function, effect and the like of an object indicated by the noun (subject, object or the like of the predicate) positioned immediately preceding a first particle forming a predicate template in a sentence Examples: (pen) de kaku (write with a pen); (sekiyu) wo yunyu suru (import oil); (sekiyu) de tsukuru (form with oil); (kabuka) ga jyoushou suru: (stock price increases); (tabako) wo suu (smoke a cigarette); (wakuchin) wo chuusha suru (inject vaccine); (noun) no yokusei wo fusegu (prevent reduction of noun); (noun) no jiko wo fusegu (prevent accident of noun); (noun) no daisu wo fuyasu (increase the number of noun) |
| <Inhibitory> | Predicate template describing an event having an orientation not to stimulate a function, effect and the like of an object Examples: (pen) wo suteru (discard a pen); (gan) wo chiryou suru (treat cancer); (sekiyu) wo kin'yu suru (ban oil import); (kabuka) ga geraku suru (stock price plummets); (tabako) wo yameru (quit smoking); (wakuchin) wo shohou shinai (administer no vaccine); (noun) no gensho ga shinko suru (reduction of noun proceeds); (noun) no ketten ga kengen suru (defect of noun appears) |
| <Neutral> | Predicate templates other than the two above Examples: (kokyo) wo omou (think of home); (kabuica) wo kanngaeru (think about stock price); (houhou) wo kento suru (consider methods); (noun) no kekka ni tsuite giron suru (discuss results of noun); (noun) no keika wo houdou suru (report progress of noun) |

In the present embodiment, the classification of predicate templates above is automatically calculated from texts including the predicate templates. At that time, a positive excitation value is assigned to an excitatory template and a negative excitation value is assigned to an inhibitory template. Different methods of calculating the excitation values are used for the simple predicate templates and complex predicate templates. The methods will be described later. A neutral verb as used herein is one whose absolute value of excitation value obtained as a result of calculation is equal to or smaller than a certain threshold value. In the present specification, the classification of "excitatory," "inhibitory" and "neutral" described above and the excitation value assigned to each template are generally referred to as a "polarity" of the predicate template.

If an auxiliary verb of negation "nai" (not) or the like follows a predicate, the combination of a predicate and the auxiliary verb of negation is considered to be one predicate. An excitation value obtained by inverting the positive/negative sign of the excitation value of original predicate is assigned to it.

(2) Polarity Assignment to Simple Predicate Template

Polarity assignment to a predicate template is automatically calculated. First, linguistic characteristics and constraints such as shown below are considered as clues to assign polarity. Initially, a noun pair is considered and a concept of causality between the noun pair is introduced.

Noun pairs having causality have two types of relations as shown in Table 2 below.

TABLE 2

| Name of relation | Examples |
|---|---|
| Positive causality | Example: <earthquake, tsunami> the object designated by one noun causes occurrence of the object designated by the other noun |
| Negative causality | Example: <anticancer drug, cancer> the object designated by one noun prevents occurrence of the object designated by the other noun |

The noun pairs and the polarities (signs) of excitation values of simple predicate templates have the following relations: (1) a product of excitation values of two simple predicate templates connected by an and/thus-type conjunction, a connection particle or other connection expression (hereinafter simply referred to as a conjunction) ( . . . node (hence), . . . tame (since), . . . te (and) etc.) will have positive polarity if nominal phrases having positive causality have dependency on the two simple predicate templates; (2) on the contrary, if nominal phrases having negative causality have dependency on the two simple predicate templates connected by an and/thus-type conjunction, the product will have negative polarity; (3) if two verbs are connected by a but-type conjunction (, . . . ga (but), . . . nimo kakawarazu (though) etc.), the products of excitation values will be opposite to those of (1) and (2), respectively.

Table 3 shows examples of the relations above. Here, noun pair <earthquake, tsunami> has positive causality, and noun pair <anticancer drug, cancer> has negative causality.

TABLE 3

| Noun pair examples | Examples | Product of excitation values |
|---|---|---|
| <Earthquake, tsunami> | (Earthquake) occurred (excitation value: positive) and hit by (tsunami) (excitation value: positive) | Positive |
| <Anticancer drug, cancer> | (Anticancer drug) is injected (excitation value: positive) and (cancer) is cured (excitation value: negative) | Negative |
| <Earthquake, tsunami> | (Earthquake) occurred (excitation value: positive) but not hit by (tsunami) (excitation value: negative) | Negative |
| <Anticancer drug, cancer> | (Anticancer drug) is injected (excitation value: positive) but (cancer) is not cured (excitation value: positive) | Positive |

It is noted that a pair of simple predicate templates having a relation of synonymity/entailment has the same polarity. For example, "administer (vaccine)" and "inject (vaccine)" both have positive polarities and "(earthquake) occurs" and "(earthquake) hits" both have positive polarities. It is noted, however, that their excitation values are not always the same.

For specific calculation of excitation values, a huge amount of texts as exemplified above, that is, expressions comprised of two simple predicate templates each connected to a noun and connected by and/thus-type or but-type conjunctions to each other, are collected from the Internet. A network of simple predicate templates is made by providing links between the simple predicate templates connected by conjunctions and simple predicates templates having the relation of synonymity/entailment. Information as to whether the simple predicate templates have the same polarity is assigned as an attribute to each link. To a small number of simple predicate templates on the network, excitation values of +1 or −1 are assigned manually in advance. As will be described later, it is possible to define energy, similar to electron spin energy in quantum mechanics, on the network. By conducting calculation to optimize (here, minimize) the energy and thereby conducting a kind of constraint solving, the polarities of simple predicate templates and polarities of causality between noun pairs can be determined and calculated globally in a bootstrap-like method. As to the details of the method of calculating excitation values, see Non Patent Literature 1.

The algorithm for assigning excitation values described later is only an example, and there may be other methods of calculating specific excitation values based on an energy function considering the linguistic constraints described above.

(3) Polarity Assignment to Complex Predicate Template

Frequency of appearance of complex predicate templates is lower than that of simple predicate templates. Therefore, it would be rather difficult to attain high reliability if polarity of a complex predicate template is to be determined based only on the statistical information as in the prior art. In the embodiment below, the polarity of complex predicate template is automatically assigned in the following manner.

Specifically, in the embodiment below, "excitatory" will be denoted by +1 and "inhibitory" will be denoted by −1, and the product of excitatory/inhibitory polarities of the noun and of the simple predicate forming the complex predicate template is regarded as the polarity of the complex predicate template. Specifically, the polarity of a complex predicate template "no gensho ga shinko suru (reduction of something proceeds)" is determined in the following manner. The polarity of noun "gensho (reduction)" is inhibitory (−1) and the polarity of simple predicate template "ga shinko suru (something proceeds)" is excitatory (+1) and, hence, the polarity of complex predicate template "no gensho ga shinko suru (reduction of something proceeds)" is −1×(+1)=−1.

It is difficult, however, to prepare beforehand information indicating polarity for every noun. Therefore, in the present embodiment, determination for sahen-nouns and trouble-nouns is made possible by the following method, without the necessity of preparing information indicating polarity. It is noted, however, that such polarity determination requires due attention, as will be described later.

<<Sahen-Noun>>

Basically, polarity of a sahen-noun is determined from the simple predicate template in the following manner. Specifically, to a sahen-noun, the polarity of simple predicate template corresponding to the sahen-noun is simply added. The simple predicate template corresponding to the sahen-noun refers to, when a particle immediately preceding the sahen-noun is "ハ, ヲ, ガ, ニ, デ (ha, wo, ga, ni, de)", one that starts in the form of that particle+sahen-noun. For example, for the noun "gensho (reduction)", if the particle immediately preceding it is "が (ga)," the corresponding simple predicate template is "ga gensho suru (something reduces)" (inhibitory) and, if the particle is "を (wo)," the corresponding simple predicate template is "wo gensho suru (reduce something)" (inhibitory). In either case, the polarity is inhibitory. Therefore, in either case, the polarity of noun "gensho (reduction)" is inhibitory. On the other hand, determination for a noun "yokusei (restraint)" is rather complicated. For example, if the particle immediately preceding "yokusei (restraint)" in a complex predicate template is "が (ga)," the corresponding simple predicate template is "ga yokusei suru (something restrains)" (excitatory), and the polarity of "yokusei (restraint)" will be excitatory. If the immediately preceding particle is "を (wo)," however, the corresponding simple predicate template is "wo yokusei suru (restrain something)" (inhibitory) and the polarity of "yokusei (restraint)" will be inhibitory. Therefore, for a sahen-noun in a complex predicate template, it is necessary to determine, from the context, what simple predicate template accompanying which particle is to be used. For this determination, we need information related to the context in which a complex predicate template is used. The polarity of a complex predicate template cannot be determined by the complex predicate template on its own.

A complex predicate template has a form of "noun+'の (no)'+{sahen-noun|trouble-noun}+simple predicate template." Using this form, in the embodiments described below, determination of polarity of a sahen-noun is enabled in the following manner. First, frequency of co-occurrence of a noun immediately preceding the particle (such as "の (no)") immediately preceding the sahen-noun of interest with a verb derived from the sahen-noun (sahen-verb) accompanied by a case particle is examined for each particle, on a corpus. As a result, we can find which case particle has the highest frequency of co-occurrence with a combination of a specific noun and a specific sahen-verb. Further, since the combination of the case particle and the sahen-verb is a simple predicate template, its polarity can also be determined easily. For the polarity of the complex predicate template, that polarity may be used. The highest frequency of co-occurrence between which particle and which specific noun and which specific sahen-verb can be determined only after the noun and the sahen-verb are specified. Therefore, in the present embodiment, the polarity of a complex predicate template of a context-dependent sahen-noun is not specified at the time of extracting the complex predicate template. In an actual application, when a context in which a complex predicate template appears is found, from combination of a noun appearing immediately before the sahen-noun and the sahen-verb obtained from the sahen-noun, a case particle connecting these is determined. By checking the polarity of the simple predicate template having the case particle and the sahen-verb at the head, the polarity of the original sahen-noun can be determined therefrom.

In the present embodiment, in case a simple predicate template corresponding to a sahen-noun is context-dependent, for each combination of a noun and a sahen-noun, a case particle connecting these having the highest frequency in the corpus is examined beforehand. Then, from simple predicate templates, one simple predicate template having that case particle at the head and having a sahen-verb derived from the sahen-noun is searched, and the polarity of that one is used as the polarity of the sahen-noun. This polarity is stored in a dictionary for each combination of a noun and a sahen-verb.

<<Trouble-Noun>>

For a trouble-noun, if a noun accompanying a case particle "ノ (no)" preceding the trouble-noun can be regarded as a victim of the trouble, the polarity is determined to be inhibitory, and otherwise, it is determined to be excitatory. Examples are as follows. In the following examples, "jiko (accident)" and "yogore (smear)" are trouble-nouns.

"(Ressha no) jiko (accident of a train)" is inhibitory.

"(Daidokoro no) yogore (smear in the kitchen)" is inhibitory.

"(Haiyu no) yogore (smear of waste oil)" is excitatory.

When such a method of determination is adopted, it is necessary to determine the relation between the trouble noun and the noun followed by a case particle "ノ (no)" immediately preceding the trouble noun, in order to determine the polarity of the trouble-noun. In the embodiment below, in order to determine the polarity, for each combination of a trouble-noun and a co-occurring noun followed by a case particle "ノ (no)" immediately preceding the trouble-noun, a pattern dictionary for determining the polarity is prepared. Specifically, for each of the combinations of trouble-noun, noun accompanying case particle "ノ (no)" immediately preceding the trouble-noun and the co-occurrence pattern thereof, polarity of the trouble-noun is determined in advance. Then, by checking which specific combination of a noun accompanying case particle "ノ (no)" and a trouble-noun actually co-occur with what pattern in the corpus, the polarity of the trouble-noun is determined.

For example, in such patterns as "(trouble-noun A) de (noun a) ga taiha suru (noun a is crushed by trouble-noun A)" (inhibitory), "(noun b) ga (trouble-noun B) de ugokanai (noun b is inoperative because of trouble-noun B)" (inhibitory), if a noun "ressha (train)" and trouble-noun "jiko (accident)" co-occur, it is possible to determine that "jiko (accident)" in "(ressha no) jiko (train accident)" is inhibitory. On the contrary, if a pattern in which a noun and a trouble-noun co-occur is an excitatory pattern, the polarity of the trouble-noun in the form of that noun+"ノ (no)"+ trouble-noun is excitatory.

<<Quantifier Noun>>

Every quantifier noun can be considered to be excitatory.

(4) Possible Applications

Use of such classification and polarities as described above allows applications described in the following.

(A) the Scheme for Automatically Recognizing Causality Between Phrases

Assume that a pair of predicate templates, of which product of excitation values is positive and the absolute values of excitation values are large, co-occur with nouns having positive causality and connected by an and/thus-type conjunction. Then, it is highly likely that the resulting expression represents causality. Assume that a pair of predicate templates, of which product of excitation values is negative and the absolute values of excitation values are large, co-occur with nouns having negative causality and connected by an and/thus-type conjunction. In this case also, it is highly likely that the resulting expression represents causality. Utilizing such a feature, expressions representing causality, including two predicate templates and a noun pair having positive/negative causality, can automatically be recognized and acquired from among texts, as shown in Table 4.

TABLE 4

| Examples | Description |
| --- | --- |
| Earthquake occurred (excitation value: positive, absolute value: large) and hit by tsunami (excitation value: positive, absolute value: large) | Product of excitation values of these two predicate templates is positive, and "earthquake" and "tsunami" have positive causality. Thus, the expression represents causality. |

TABLE 4-continued

| Examples | Description |
| --- | --- |
| Demand drops (excitation value: negative, absolute value: large) and stock price declines (excitation value: negative, absolute value: large) | Product of excitation values of these two predicate templates is positive, and "demand" and "stock price" have positive causality. Thus, the expression represents causality. |
| Arouse feeling of fullness (excitation value: positive, absolute value: large) and avoid overeating (excitation value: negative, absolute value: large) | Product of excitation values of these two predicate templates is negative, and "feeling of fullness" and "overeating" have negative causality. Thus, the expression represents causality. |
| Base metabolism increases (excitation value: positive, absolute value: large) and fat is lost (excitation value: negative, absolute value: large) | Product of excitation values of these two predicate templates is negative, and "base metabolism" and "fat" have negative causality. Thus, the expression represents causality. |

Note that the conjunction "te (and/thus)" does not always represent causality. There are numerous examples in which "te" represents other than causality. For example, consider "furo ni haitte shokuji wo suru" (take bath and have a meal). Here, generally, there is no causality between bath and meal. By the present embodiment, such a phrase pair that does not have causality can successfully be excluded and only the causality can be acquired with high accuracy. Japanese conjunctions possibly representing causality may include "shitagatte," "yueni," "node," "ba," "to," "de," "kara," "tame," and "tameni," in addition to "te."

It becomes possible to acquire causality between phrases with high accuracy by considering the constraint described above, from such a set of expressions using and/thus-type conjunctions. Once a causality is obtained, it becomes possible to predict that "tsunami possibly hits" from the information that "earthquake has occurred." The causality acquired in this manner could be a big factor for the very important technique of automatically acquiring a semantic relation between phrases.

(B) Generation of Hypotheses by Combining Causality Between Phrases

By using the scheme for automatically recognizing causality between phrases described above, it becomes possible to automatically acquire causality not explicitly described in the original texts. The scheme will be briefly described in the following.

First, from the original texts, it is possible to automatically acquire a relation of, for example, materials, by acquiring semantic relations between nouns using patterns (for this process, an existing technique is available). Specifically, the relation between a product B and material A can be automatically acquired by utilizing a pattern such as "form B from A." Assume that the information that material of a product "cemented carbide tool" is "tungsten" is obtained from the result of such automatic acquisition. Then, we select predicate templates frequently co-occur with the noun pair having a semantic relation of material relation, i.e., "cemented carbide tool" and "tungsten", the templates of which product of excitation values are positive and the absolute values of excitation values are large. The selected predicate templates are respectively arranged together with the noun pair. Then, we can acquire causality (in a broad meaning) between verb phrases composed of predicates (verbs) and nouns such as "import tungsten (excitation value: positive) and manufacture cemented carbide tool (excitation value: positive)." The causality here is that to "import tungsten" is to "manufacture cemented carbide tool."

Such a causality acquired in this manner may be sometimes not explicitly written in the texts. In that case, the above-described scheme is considered to successfully generate a hypothesis related to causality. Here, a constraint such as "verbs 'import' and 'manufacture' by themselves co-occur frequently in one sentence" may be utilized.

Naturally, even if a huge amount of documents are collected from the Web, it is not the case that we can find all causality relations in the world written therein. In order to help people make balanced, good decisions considering every risk and chance by supplementing limited knowledge and imagination of individuals, it is necessary to thoroughly collect causality relations. Therefore, in the embodiment below, a huge amount of causality hypotheses, which are not explicitly described on the Web, are generated and filtered, so as to improve scope of coverage and accuracy of causality relations all over the world.

Specifically, in the following embodiment, causality hypotheses are generated by using the following two schemes.

(1) Causality Hypothesis Phrase Pair Generation Based on Semantic Relations

As described above, semantic relations between nouns can be obtained. Using the semantic relations, a large number of causality hypotheses can be generated from the obtained causality relations.

Specifically, assume that there is a semantic relation between a noun included in a cause phrase and a noun included in a result phrase of certain causality. Then, it is highly likely that the causality may be established for another pair of nouns having the same semantic relation. Therefore, by replacing the noun in the cause phrase and the noun in the result phrase of the original causality with a pair of nouns having the same semantic relation, a new causality hypothesis can be generated.

Examples of semantic relations are as follows:
Material relation (example: <produce B from A> (corn, biofuel)
Necessity relation (example: <A is indispensable for B> (sunlight, photosynthesis)
Use relation (example: <use A for B> (iPS cells, regenerative medicine)
Prevention relation (example: <prevent B by A> (vaccine, influenza)
Causal relation (example: <A causes B> (diabetes, brain infarction).

Such semantic relations can automatically be obtained as will be described later.

(2) Causality Hypothesis Phrase Pair Generation Based on Logical Relations (Inverse)

If certain causality is relevant, it is highly likely that the inverse of the causality is also relevant. For example, if a causality of "stress increases (cause)"→"sleeplessness continues (result)" is relevant, it is highly likely that an inverse semantic causality, that is, "stress decreases (cause)"→"sleeplessness stops (result)" is also relevant. In order to obtain such inverse expressions, a database of contradictory expressions may be prepared beforehand. Contradictory expressions can be collected in the similar manner as for colleting causality relations.

By acquiring a huge amount of causality relations and their hypotheses by the above-described scheme and building a database, it becomes possible to infer a possible outcome in response to an actual new information. For example, assume that a causality hypothesis "since import of tungsten is banned, sale of cemented carbide tool is stopped" has been stored in the database, and a news article reporting that "import of tungsten is banned" appears. By searching the database, an inference can be drawn such as "since 'import of tungsten is banned,' it is possible that 'sale of cemented carbide tool is stopped' as a result." In other words, a hypothesis unknown for a person not having deep knowledge of the related field can be automatically generated.

Generation of hypothesis as described above simply starts from the initial information described in simple and frequently occurring patterns such as "form cemented carbide tool from tungsten." Meanwhile, information related to excitatory/inhibitory nature of predicate templates is extracted from texts not having any relation to cemented carbide tool or tungsten. By combining these pieces of information, causality hypothesis can be generated. Specifically, even when the expression "form cemented carbide tool from tungsten" is the only reference to the cemented carbide tool and tungsten in the input texts, generation of such a hypothesis as described above is possible. As a result, it becomes possible to obtain a highly sophisticated hypothesis that "manufacturing of cemented carbide tool is possibly banned" from very limited information. Thus, this technique could be used across the broad spectrum of applications and serve as the core technique for advanced use of information.

(C) Improving Accuracy of Automatically Acquiring Expressions Having Relations of Synonymity/Entailment According to the conventional technique for automatically acquiring relations of synonymity/entailment, synonyms and entailments are recognized based on similarity in distribution of probability of occurrence of words that appear near the expression of interest. However, a word B, which is an antonym of a word A, is often erroneously recognized as having a relation of synonymity or entailment with word A. This is because antonyms frequently appear in similar contexts. In contrast, according to the present embodiment, that the expression "wo hikiokosu (cause something)" has positive excitation value and the expression "wo fusegu" (prevent something)" has negative excitation value can automatically be calculated. Using these pieces of information, it becomes possible to distinguish synonyms from others among candidates of synonymous expressions extracted by the conventional art, depending on whether the polarity of predicate template is different. As a result, the technique of the present embodiment improves accuracy in automatically acquiring synonyms and entailments of words.

(D) the Scheme for Automatically Acquiring Causality Bridging Sentences

By the techniques (A) and (B) described above, a huge number of causality relations can be collected. By building a database of the huge number of causality relations, pairs of predicate templates frequently appearing in causality expressions can be acquired. For instance, assume that a pair of predicate templates consisting of "ga okita (something occurred)" and "ni osowareta (hit by something)" appears frequently in causality relations in the database. It is highly likely that such predicate templates represent causality even when they appear in bridging sentences (in separate sentences) in the texts, if the "distance" such as the number of sentences, number of words or number of characters between each other is close. Consider an example in which the expressions "jishin ga okita (earthquake occurred)" and "tsunami ni osowareta (hit by tsunami)" appear in two separate sentences, such as "Kinou jishinn ga okita. (Yesterday, an earthquake occurred.) Tunami ni osowareta tono houkoku ga yoserarete iru (Hits by tsunamis are reported)."
In this case also, events described by the two phrases "jishin ga okita (earthquake occurred)" and "tsunami ni osowareta (hits by tsunamis)" have causality. Further, the noun pair appearing in these phrases, that is, "jishin (earthquake)" and "tsunami" also have causality. Utilizing such a characteristic, it is possible to automatically acquire causality described in bridging sentences, both for the phrases and words.

In the following, the configuration and operation of the system in accordance with embodiments of the invention based on the idea above will be described. Of the embodiments described in the following, the first embodiment is directed to a technique of collecting causality phrases and generating a social scenario by linking these, using the phrase pair extracting technique and the hypothesis generating technique described above. The second embodiment is a modification of the first embodiment, and it relates to a technique of scoring social scenario candidates.

First Embodiment

Configuration

<Overall Configuration>
Referring to FIG. 1, a social scenario generating system 30 in accordance with the first embodiment of the present invention includes: a seed template DB 32 for storing simple predicate templates (which will be referred to as "seed templates") serving as a core in building a template network, among predicate templates described above; a conjunction DB 34 for storing and/thus-type and but-type conjunctions joining predicate templates; a social scenario DB builder 36, obtaining a huge amount of causality phrase pairs each consisting of two phrases having a relation of cause and result connected by a conjunction or the like stored in conjunction DB 34 from a WEB archive 44 as a corpus of documents collected from seed template DB 32, conjunction DB 34 and the Internet 40, and expanding and linking the causality phrase pairs based on various pieces of knowledge and generating social scenarios; a social scenario DB 38 storing social scenarios generated by social scenario DB builder 36; and a social scenario output unit 48 for processing and outputting social scenarios stored in social scenario DB 38 in response to a request from outside.

Social scenario generating system 30 in accordance with the present embodiment generates social scenarios using the documents on the WEB stored in WEB archive 44. WEB archive 44 consists of WEB documents collected by a WEB crawler 42 from the Internet 40.

<Social Scenario DB Builder 36>
Referring to FIG. 1, social scenario DB builder 36 includes: a simple predicate template collector 60 connected to seed template DB 32, conjunction DB 34 and WEB archive 44 for collecting a huge amount of phrase pairs from WEB archive 44, taking out a huge amount of simple predicate templates therefrom and thereby building simple predicate template DB 62; and a complex predicate template collector 64 for obtaining complex predicate templates from WEB archive 44 using the simple predicate template DB 62 built by simple predicate template collector 60. Each simple predicate template stored in seed template DB 32 has a positive or negative excitation value appended beforehand depending on whether the template is excitatory or inhibitory. At the start of the process described in the following, these values are +1 and −1, respectively.

Social scenario DB builder 36 further includes: a complex predicate template DB 66 storing complex predicate templates collected by complex predicate template collector 64; a causality phrase pair collector 68 collecting pairs of two phrases having a cause and result relation with each other from WEB archive 44, using the complex predicate templates stored in complex predicate template DB 66 and class information for each word stored in a word class DB 46; a causality phrase pair DB 70 storing causality phrase pairs collected by causality phrase pair collector 68; and a social scenario generator 72 generating a large number of social scenarios having chained causality relations, by referring to the causality phrase pairs stored in causality phrase pair DB 70, documents stored in WEB archive 44 and word class DB 46.

The class information of a word as used herein is information representing a class (word class) to which the word belongs, and generally it is a set of a word and a class identifier indicating the class to which the word belongs. The word class is, in the present embodiment, a set of words that are semantically similar (semantic class). As a method of automatically obtaining a word class, frequency of co-occurrence of a word with one same verb is used, in which words having co-occurrence frequency (or ratio of co-occurrence) equal to or higher than a threshold value are determined to belong to the same class. Frequency of co-occurrence of a word with one same combination of a verb and a particle may be used instead.

Figure 2:
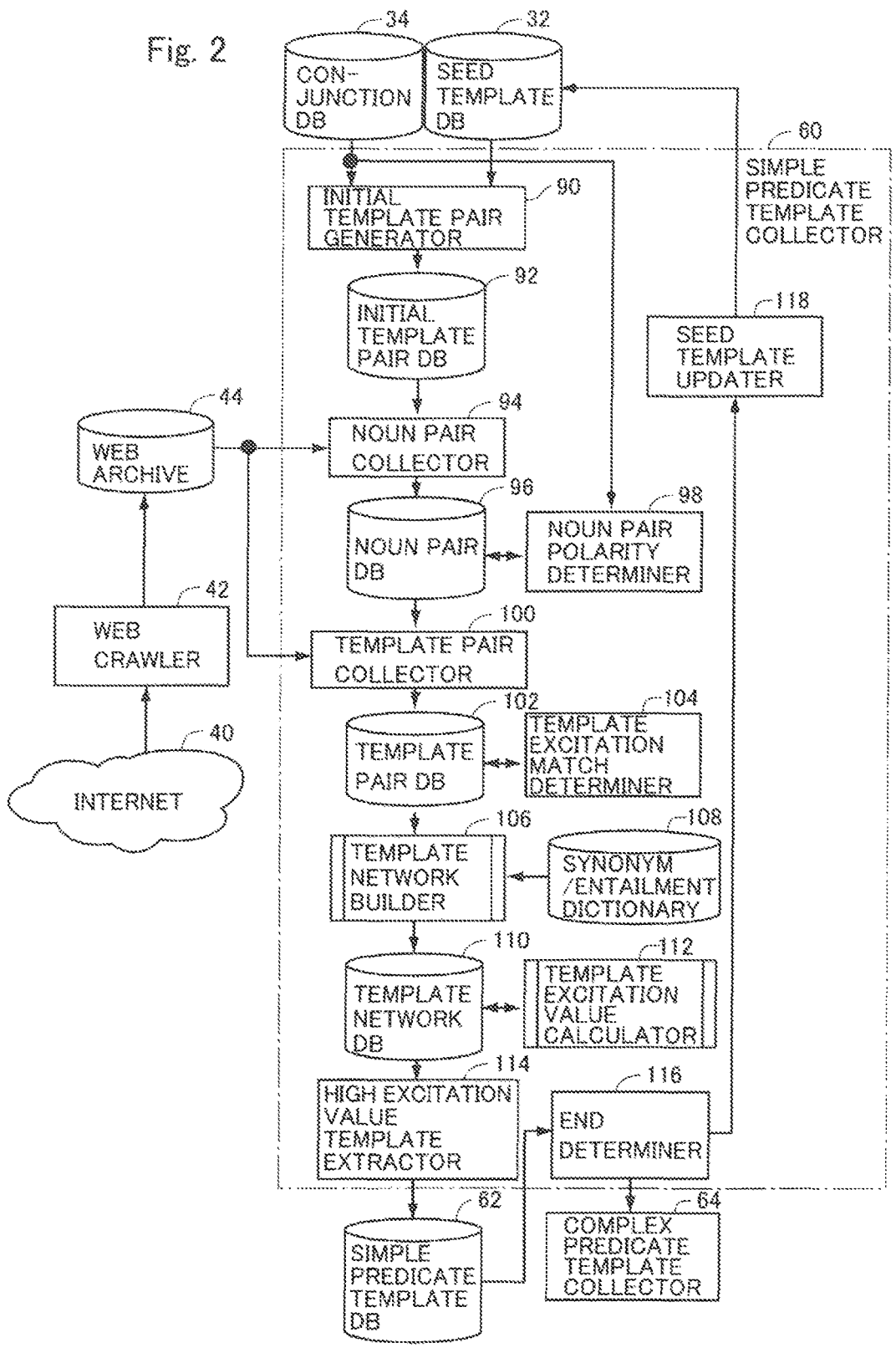
FIG. 2 is a more detailed block diagram of a simple predicate template collector shown in FIG. 1.

<Simple Predicate Template Collector 60>
Referring to FIG. 2, simple predicate template collector 60 includes: an initial template pair generator 90, connected to seed template DB 32 and conjunction DB 34 for generating, using all simple predicate templates stored in seed template DB 32 and all conjunctions stored in conjunction DB 34, all combinations of two simple predicate templates connected by each conjunction; and an initial template pair DB 92 for storing simple predicate template pairs generated by initial template pair generator 90. Exemplary forms of simple predicate template pairs generated by initial template pair generator 90 are as shown in Table 5 below.

TABLE 5

| Cases | 1st template | Conjunction | 2nd template |
|---|---|---|---|
| a. | cause (1st noun) | and (and/thus type) | generate (2nd noun) |
| b. | cause (1st noun) | thus (and/thus type) | prevent (2nd noun) |
| c. | generate (1st noun) | but (but type) | restrain (2nd noun) |

Simple predicate template collector 60 further includes: a noun pair collector 94 for collecting, for each of the simple predicate template pairs stored in initial template pair DB 92, a noun pair that co-occurs with the pair, from WEB archive 44; noun pair DB 96 for storing noun pairs collected by noun pair collector 94; and a noun pair polarity determiner 98, connected to noun pair DB 96, for determining relation between nouns included in each of the noun pairs stored in noun pair DB 96, based on the polarities of simple predicate template co-occurring with the nouns and on the type of conjunction or the like stored in conjunction DB 34, and attaching a tag (relation tag) indicating the relation to each noun pair.

Here, noun pair polarity determiner 98 determines the relation between nouns forming a noun pair in accordance with the method shown in Table 6 below.

TABLE 6

| Cases | Examples | Relation |
| --- | --- | --- |
| Matching a. | (Earthquake, tsunami) | Positive |
| Matching b. | (Secretion of saliva, dry mouth) | Negative |
| Matching c. | (Acetaldehyde, hepatic disorder) | Positive |

Specifically, the relation of noun pair co-occurring with two simple predicate templates can be determined in the following manner.

(1) If the two simple predicate templates have the same polarities and are connected by an and/thus-type conjunction, the noun pair co-occurring with the templates has a positive relation.

(2) If the two simple predicate templates have the same polarities and are connected by a but-type conjunction, the noun pair co-occurring with the templates has a negative relation.

(3) If the two simple predicate templates have opposite polarities and are connected by an and/thus-type conjunction, the noun pair co-occurring with the templates has a negative relation.

(4) If the two simple predicate templates have opposite polarities and are connected by a but-type conjunction, the noun pair co-occurring with the templates has a positive relation.

Simple predicate template collector 60 further includes: a template pair collector 100, connected to noun pair DB 96 for collecting, for each of the noun pairs having a relation tag assigned by noun pair polarity determiner 98, a simple predicate template pair co-occurring with the noun pair from the Internet 40; a template pair DB 102 for storing the simple predicate template pairs collected by template pair collector 100 associated with their co-occurring noun pairs; and a template excitation match determiner 104 for determining, for each of the simple predicate template pairs stored in template pair DB 102, whether the simple predicate templates have the same excitatory/inhibitory class (matching or not), based on the relation (positive/negative) of the noun pair co-occurring with the simple predicate template pair and based on whether the conjunction joining the simple predicate templates is an and/thus-type or but-type conjunction, and assigning the result as a tag to each template pair.

Whether the pair of simple predicate templates has the same excitatory/inhibitory class can be determined by the following method as shown in Table 7 below. As shown in Table 6, the relation between noun pair <earthquake, tsunami> is positive, noun pair <secretion of saliva, dry mouth> is negative, and the relation between noun pair <acetaldehyde, hepatic disorder> is positive.

TABLE 7

| 1st predicate template | Conjunction | 2nd predicate template | Match determination |
| --- | --- | --- | --- |
| (Earthquake) stops | node (hence) | prevents (tsunami) | same |
| Cause (earthquake) | ga (but) | prevents (tsunami) | opposite |
| (Earthquake) occurs | ga (but) | prevents (tsunami) | opposite |
| Promote (secretion of saliva) | te (and) | prevents (dry mouth) | opposite |
| Prevent (secretion of saliva) | node (hence) | causes (dry mouth) | opposite |
| Generate (acetaldehyde) | tame (because) | develops (hepatic disorder) | same |

Specifically, whether the pair of simple predicate templates has the same excitatory/inhibitory class or not can be determined by the following conditions.

(1) If the simple predicate template pair co-occurs with a noun pair having positive relation and the templates are connected by an and/thus-type conjunction, the pair of simple predicate templates has the same excitatory/inhibitory class.

(2) If the simple predicate template pair co-occurs with a noun pair having positive relation and the templates are connected by a but-type conjunction, the pair of simple predicate templates has the opposite excitatory/inhibitory classes.

(3) If the simple predicate template pair co-occurs with a noun pair having negative relation and the templates are connected by an and/thus-type conjunction, the pair of simple predicate templates has the opposite excitatory/inhibitory class.

(4) If the simple predicate template pair co-occurs with a noun pair having negative relation and the templates are connected by a-but-type conjunction, the pair of simple predicate templates has the same excitatory/inhibitory class.

Simple predicate template collector 60 further includes: a template network builder 106 for building a network among the simple predicate templates based on the simple predicate template pairs stored in template pair DB 102 and the results of match determination thereof; and a synonym/entailment dictionary 108 used for adding links between each of the simple predicate templates when the template network builder 106 builds the network. In the present specification, the network will be referred to as a "template network."

Figure 3:
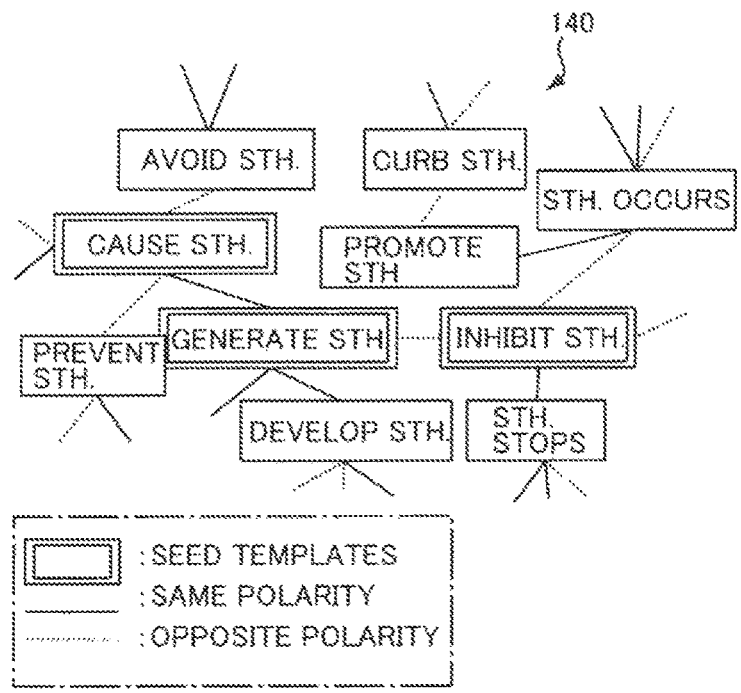
FIG. 3 schematically shows a configuration of a template network related to the simple predicate template.

Referring to FIG. 3, for example, a template network 140 includes a plurality of nodes, each of which corresponds to one simple predicate template, and links defined between the nodes. A link is provided between nodes corresponding to simple predicate templates of which match determination shown in Table 6 has been done. Each link has an attribute of same polarity or opposite polarity, assigned in accordance with the result of match determination (Table 6) between the simple predicate templates at the nodes of opposite ends of the link. In FIG. 3, the link having the same polarity assigned is represented by a solid line, and the link having the opposite polarity assigned is represented by a dotted line. As will be described later, excitation value of each simple predicate template is calculated utilizing the links. In order to calculate the excitation value, of the nodes in template network 140, the values +1 or −1 are manually assigned in advance to the seed templates (nodes such as "cause," "generate", "prevent" of FIG. 3) stored in seed template DB 32. The excitation values of the nodes (simple predicate templates) are calculated using these values, links among the nodes, and the attributes of the links. Specific method of calculation will be described later.

Again referring to FIG. 2, simple predicate template collector 60 further includes: a template network DB 110, connected to template network builder 106, for storing the template network 140 built by template network builder 106; a template excitation value calculator 112 for calculating, for each node of template network 140 stored in template network DB 110, the excitation value of each node (simple predicate template) based on the excitation value of +1 or −1 assigned in advance to the seed templates, and assigning the excitation value to each node (simple predicate template); a high excitation value template extractor 114 for extracting, from the nodes (simple predicate templates) of template network 140 stored in template network DB 110, only those of which absolute values of excitation values calculated by template excitation value calculator 112 are large, and for building simple predicate template DB 62 with the extracted simple predicate templates; an end determiner 116 for determining whether or not a predetermined end condition for building template DB is satisfied; and a seed template updater 118, responsive to a determination that the end condition is not satisfied by end determiner 116, for updating the seed template DB 32 using the simple predicate templates stored in simple predicate template DB 62 as the new seed templates, and again causing simple predicate template collector 60 to execute the process for building a template DB. If it is determined by end determiner 116 that the end condition is satisfied, the operation of simple predicate template collector 60 ends, and a complex predicate template collector 64 is activated.

As will be described later, each section of social scenario generating system 30 may be realized by computer hardware and a computer program executed by the computer hardware.

A typical example of a simple predicate template pair generated by initial template pair generator 90 is "cause (noun 1)" "node (hence)" "generate (noun 2)".

Figure 8:
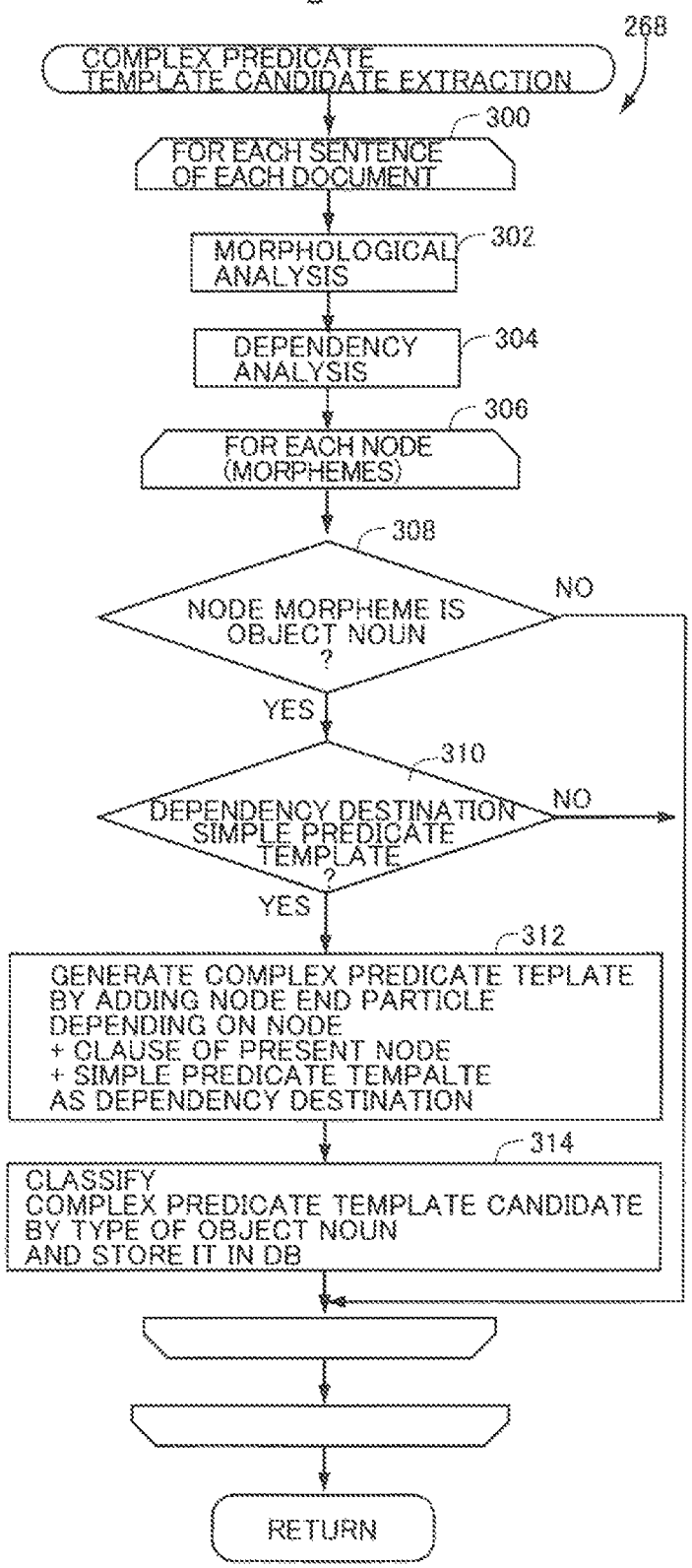
FIG. 8 is a flowchart representing a control structure of a program realizing the complex predicate template candidate extractor shown in FIG. 7 by a computer.

Noun pair collector 94 is in charge of the following process. We can conceive a noun pair that co-occurs in one sentence with the combination of simple predicate template pair+conjunction. Such a noun pair can be classified to one having mutually positive relation or one having mutually negative relation. The positive/negative relation of noun pair is determined by the combination of excitatory/inhibitory class of co-occurring simple predicate template pair and the conjunction, as shown in FIG. 8. Specifically, if a template pair co-occurring with a certain noun pair is connected by an and/thus-type conjunction and the pair of templates has matching polarities, the noun pair has a positive relation, and if the pair of templates has opposite polarities, the noun pair has a negative relation. If a template pair co-occurring with a certain noun pair is connected by a but-type conjunction and the pair of templates has matching polarities, the noun pair has a negative relation, and if the pair of templates has opposite polarities, the noun pair has a positive relation.

TABLE 8

| | Excitatory/inhibitory match of template pair | |
|---|---|---|
| Conjunction | Same | Opposite |
| And/thus type (example: node (hence)) | Positive relation (Example 1) | Negative relation (Example 2) |
| But type (example: ga (but)) | Negative relation (Example 3) | Positive relation (Example 4) |

Example 1: Cause (earthquake) (excitatory) . . . node (hence) . . . generates (tsunami) (excitatory)
Example 2: Cause (secretion of saliva) (excitatory) . . . node (hence) . . . prevents (dry mouth) (inhibitory)
Example 3: Harm (ozone layer) (inhibitory) . . . ga (but) . . . intercept (ultraviolet ray) (inhibitory)
Example 4: Generate (acetaldehyde) (excitatory) . . . ga (but) . . . prevents (hepatic disorder) (inhibitory)

Template pair collector 100 performs the following process. Consider noun pairs determined to appear on the WEB archive 44 only as pairs having positive relations by noun pair polarity determiner 98. Of these pairs, template pair collector 100 adopts, as positive relation noun pairs, only those noun pairs of which frequencies of occurrence are equal to or higher than a prescribed number. Similarly, of noun pairs appearing on the WEB archive 44 only as pairs having negative relations, only the noun pairs of which frequencies of occurrence are equal to or higher than a prescribed number are left as negative relation noun pairs. Here, the prescribed number as the threshold value for selecting the positive relation noun pairs may be the same, or not the same as the prescribed number as the threshold value for selecting the negative relation noun pairs.

Template excitation match determiner 104 classifies simple predicate template pairs that co-occur in one sentence with the remaining positive/negative noun pairs+conjunction, to simple predicate templates having the same excitatory/inhibitory class (same) and opposite class (opposite), in accordance with the determination method shown in Table 9 below. Here, some simple predicate template pairs may sometimes appear on the WEB archive 44 as having the same excitatory/inhibitory class, and having an opposite excitatory/inhibitory class at other times. For such pairs, frequency of occurrence as the pair having the same class is compared with that as the pair having the opposite classes, and the class is determined by the majority.

TABLE 9

| | Positive relation noun pair | Negative relation noun pair |
|---|---|---|
| And/thus type (example: node (hence)) | Same (Example 1) | Opposite (Example 2) |
| But type (example: ga (but)) | Opposite (Example 3) | Same (Example 4) |

Example 1: (Earthquake) stops (inhibitory) . . . node (hence) . . . prevents (tsunami) (inhibitory)
Example 2: Prevents (secretion of saliva) (inhibitory) . . . node (hence) . . . cause (dry mouth) (excitatory)
Example 3: Generates (Acetaldehyde) (excitatory) . . . ga (but) . . . prevents (hepatic disorder) (inhibitory)
Example 4: Maintain (ozone layer) (excitatory) . . . ga (but) . . . exposed to (ultraviolet ray) (excitatory)

Figure 4:
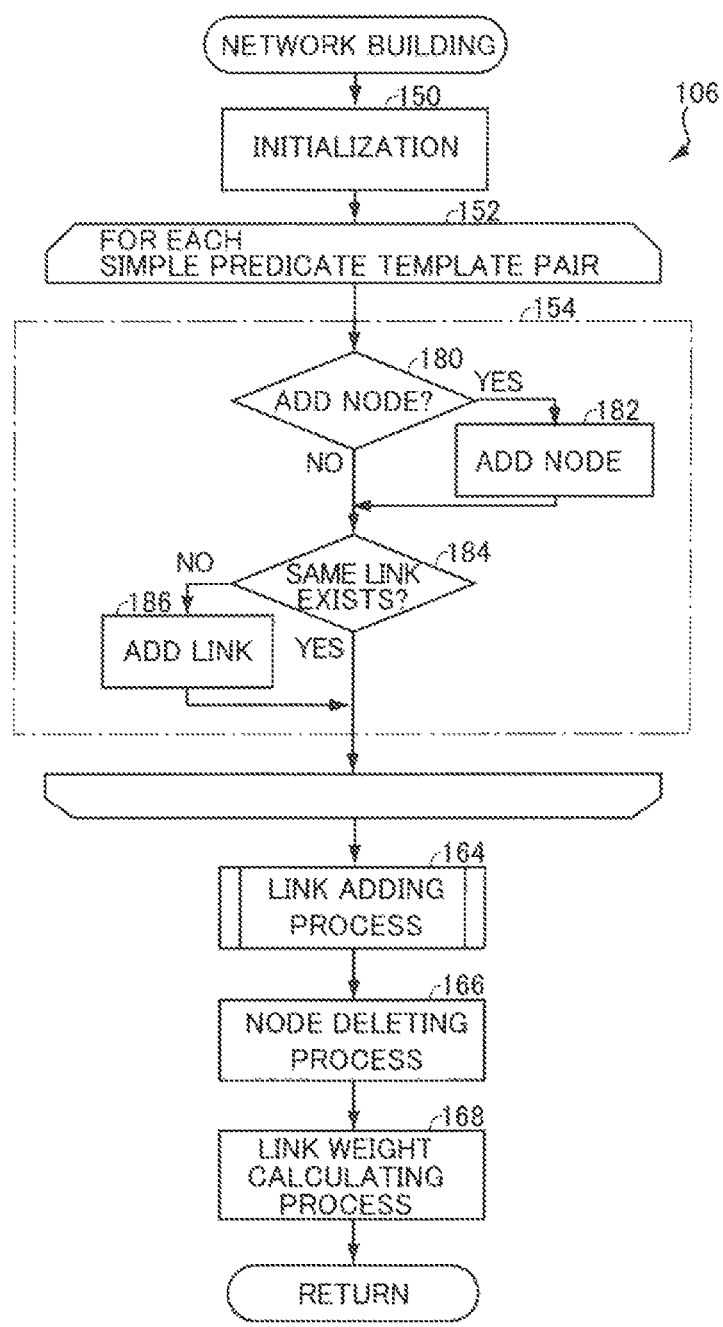
FIG. 4 is a flowchart representing a control structure of a program realizing the template network builder.

Referring to FIG. 4, the program for realizing the template network builder 106 shown in FIG. 2 is activated when simple predicate template pairs are stored in template pair DB 102 and excitation match determination for each simple predicate template pair by template excitation match determiner 104 is completed. The program includes: a step 150 of initialization, including ensuring a prescribed storage area on a memory, inputting initial values to prescribed areas for variables of the storage area, and building an initial, empty template network 140; and a step 152 of executing a process 154, for every simple predicate template pair stored in template pair DB 102. The process 154 is for adding simple predicate templates forming each simple predicate template pair and a link therebetween to the template network 140. It is assumed that at step 150, an empty network has already been built as template network 140.

The process 154 includes: a step 180 of determining, for each of the simple predicate templates included in the simple predicate template pair under processing, whether the corresponding node exists in template network 140, that is, whether the node is to be added to template network 140; a step 182, executed if the determination at step 180 is in the positive, of adding the node or nodes (one or two) determined to be added to template network 140, to the template network 140; a step 184, executed after steps 180 and 182, of determining whether or not a link exists between the nodes corresponding to the simple predicate template pair under processing; and a step 186, executed if the determination at step 184 is in the negative, of adding the link to template network 140 and ends the process 154. If the determination at step 184 is in the positive, the execution of process 154 for the simple predicate template pair is terminated.

The program realizing template network builder 106 further includes: a step 164, executed after the end of processing at step 152, of adding a link to template network 140 thus built, by looking up synonym/entailment dictionary 108; a step 166 of deleting, in the template network 140 obtained as a result of step 164, a node of which number of links to other nodes is equal to or smaller than a prescribed threshold value; and a step 168 of calculating a weight of each link based on the number of nodes to which each node links (method of calculation will be described later), adding the weight to each link, and ending the process.

Figure 5:
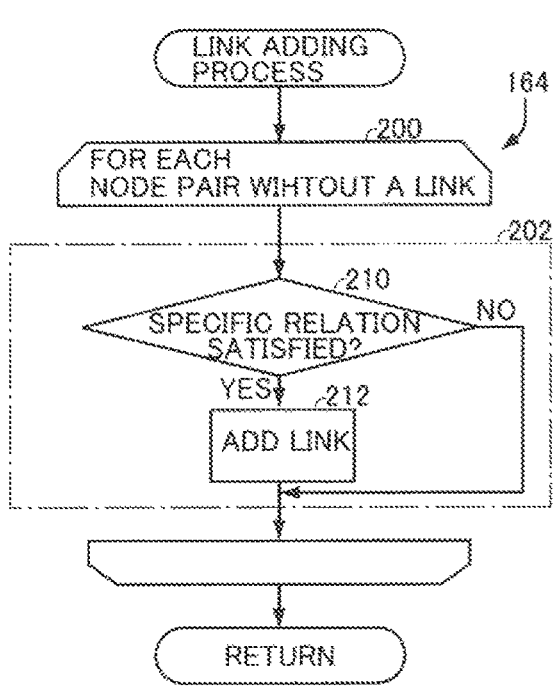
FIG. 5 is a flowchart representing a control structure of a program realizing the process of adding a link, in building the template network.

Referring to FIG. 5, the program portion (routine) executed at step 164 of adding links shown in FIG. 4 includes a step 200 of executing the following process 202 on all the node pairs not having any link therebetween, among the nodes in template network 140.

The process 202 includes: a step 210 of determining whether or not a specific relation exists between the node pairs under processing; and a step 212 of adding, if the determination at step 210 is in the positive, a link having the attribute "same" to the node pairs under processing, and ending the process 202. The process 202 also ends if the determination at step 210 is in the negative. Determination as to the presence/absence of specific relation here utilizes grammatical information of a verb and the relation of synonymity/entailment of words stored in synonym/entailment dictionary 108 shown in FIG. 2, as shown in Table 10 below.

TABLE 10

| Relation | Examples |
| --- | --- |
| "Infinitive—passive voice" relation | "use"—"used" |
| "Infinitive—causative voice" relation | "use"—"let use" |
| Synonym/entailment relation | "use"—"utilize" |

Referring to FIG. 4, at step 168, weight of each link is calculated. The weight given to a link between a simple predicate template i and a simple predicate template j will be denoted as $w_{ij}$. The weight $w_{ij}$ is calculated by Equation (1) below.

$$w_{ij} = \begin{cases} 1/\sqrt{d(i)d(j)} & \text{if SAME}(i, j) \\ -1/\sqrt{d(i)d(j)} & \text{if OPPOSITE}(i, j) \end{cases} \quad (1)$$

where d(i) represents the number of simple predicate templates linked to simple predicate template i. SAME(i, j) indicates that the attribute "same" is assigned to the link between simple predicate template i and simple predicate template j. OPPOSITE(i, j) indicates that the attribute "opposite" is assigned to the link between simple predicate template i and simple predicate template j. Specifically, if the SAME attribute is assigned to simple predicate templates i and j, the weight has a positive value, and if the OPPOSITE attribute is assigned, the sign of weight is inverted to a negative value.

Figure 6:
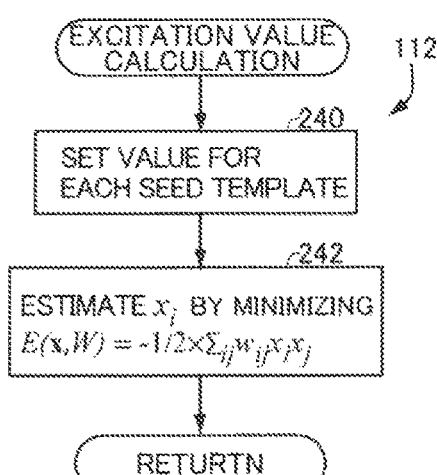
FIG. 6 is a flowchart representing a control structure of a program realizing a process for calculating excitation values of simple predicate templates.

A template excitation value calculator 112 shown in FIG. 2 calculates the excitation value of each node in accordance with the method as described in the following, for each node of template network 140 stored in template network DB 110. Referring to FIG. 6, execution of a computer program realizing template excitation value calculator 112 is started when template network 140 is stored in template network DB 110 and weight is assigned to each link. The program includes: a step 240 of assigning, for nodes corresponding to the seed templates among the nodes in template network 140, excitation values given in advance to the seed templates (+1 to excitatory seed plates, and −1 to inhibitory seed templates), and assigning prescribed initial values to other nodes; and a step 242, following step 240, of optimizing (here, minimizing) the value E (x, W) defined by the Equation below, and thereby estimating the excitation value of each node.

$$E(x,W) = -1/2 \times w_{ij} x_i x_j \quad (2)$$

where $x_i$ and $x_j$ are signed excitation values of simple predicate templates i and j, respectively, x represents a vector consisting of the excitation values, and W represents a matrix consisting of the link weights $w_{ij}$, respectively. The value E is similar to the equation for calculating electron spin energy in quantum mechanics, and it can be processed in the similar manner as the calculation for minimizing energy in quantum mechanics. Of the terms in sigma of this equation, the value $x_i x_j$ tends to be a positive value if the polarities of $x_i$ and $x_j$ are the same, and tends to be a negative value if the polarities are different, after the energy minimization calculation. The sign of weight $w_{ij}$ is positive if the polarities of $x_i$ and $x_j$ are the same, and negative if the polarities are different. Therefore, the value of each term in sigma tends to always have a positive value. By maximizing these, a sort of constraint solving is realized. In Equation (2), a coefficient "−1/2" precedes sigma and, therefore, by maximizing inside of sigma, the value E(x, W) is minimized.

<Complex Predicate Template Collector 64>

Figure 7:
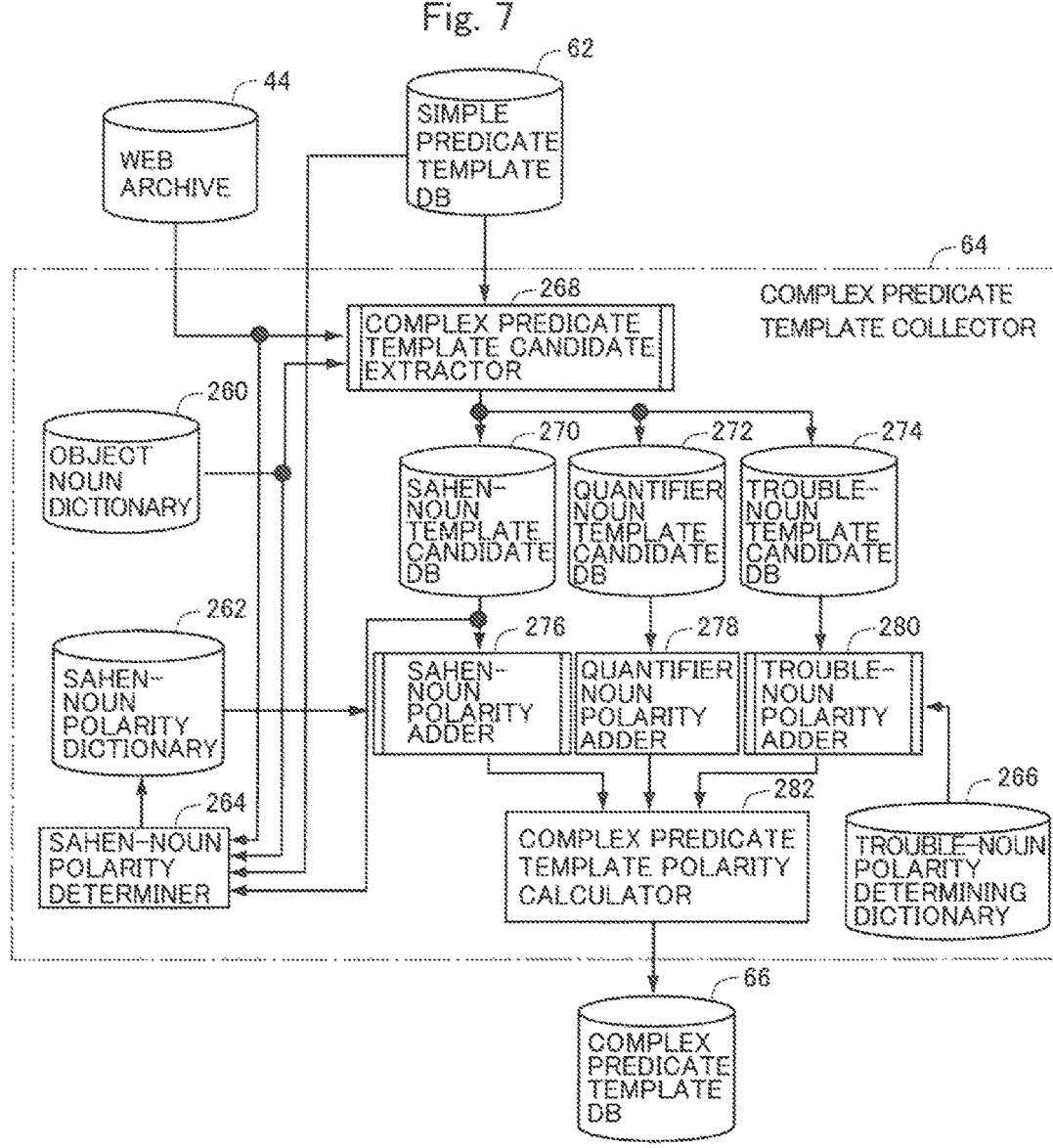
FIG. 7 is a block diagram showing a functional structure of the complex predicate template collector shown in FIG. 1.

On the other hand, referring to FIG. 7, complex predicate template collector 64 shown in FIG. 1 is for generating complex predicate template DB 66 from simple predicate template DB 62 and WEB archive 44. Complex predicate template collector 64 includes: an object noun dictionary 260 storing nouns as objects of complex predicate templates; and a complex predicate template candidate extractor 268 extracting candidates of complex predicate templates from WEB archive 44 while looking up simple predicate template DB 62 and object noun dictionary 260, and classifying the candidates to sahen-noun templates, quantifier noun templates and trouble-noun templates, in accordance with the noun-portions thereof. Complex predicate template candidate extractor 268 is realized by a computer program. Configuration thereof will be described later with reference to FIG. 8.

Complex predicate template collector 64 further includes; a sahen-noun polarity determiner 264, built by determining in advance polarity of each sahen-noun appearing in the WEB archive 44, outputting the polarity if the polarity of a sahen-noun is determined and outputting a value indicating context-dependency if the polarity of a sahen-noun depends on the context; a sahen-noun polarity dictionary 262 storing the polarity value output from sahen-noun polarity determiner 264 with the sahen-noun; a sahen-noun template candidate DB 270 storing complex predicate template candidates of sahen-nouns classified by complex predicate template candidate extractor 268; a quantifier noun template candidate DB 272 for string quantifier noun template candidates; and a trouble-noun template candidate DB 274 storing candidates of complex predicate templates including trouble-nouns. It follows that if the polarity of a sahen-noun depends on a context, a piece of information indicating such dependency is added and, the polarity of the sahen-noun is determined in accordance with the context in which the complex predicate template appears.

Complex predicate template collector 64 further includes: a sahen-noun polarity adder 276 adding, to a sahen-noun of a sahen-noun template candidate stored in sahen-noun template candidate DB 270, a piece of information indicating the polarity or indicating that the polarity is context-dependent, with reference to sahen-noun polarity dictionary 262; a quantifier noun polarity adder 278 adding "excitatory" as the polarity to a quantifier noun in a quantifier noun template candidate stored in quantifier noun template candidate DB 272; and a trouble-noun polarity determining dictionary 266 storing in advance patterns for determining a polarity of a trouble-noun stored in trouble-noun template candidate DB 274. The polarity of a trouble-noun may be determined beforehand or may be context-dependent. Trouble-noun polarity determining dictionary 266 is built such that if the polarity of a trouble-noun is determined beforehand, it outputs the polarity, and if the polarity depends on context, it outputs a piece of information indicating to that effect.

Complex predicate template collector 64 further includes: a trouble-noun polarity adder 280 adding, to each trouble-noun of trouble-noun template candidates stored in trouble-noun template candidate DB 274, a piece of information indicating the polarity or indicating that the polarity is context-dependent, with reference to trouble-noun polarity determining dictionary 266; and a complex predicate template polarity calculator 282 calculating and adding the polarity of a complex predicate template candidate output from sahen-noun polarity adder 276, quantifier noun polarity adder 278 and trouble-noun polarity adder 280, as a product of polarity of the noun and the polarity of simple predicate template, and storing it in complex predicate template DB 66. If the sahen-noun of a sahen-noun complex predicate template candidate given from sahen-noun polarity adder 276 has a value indicating that its polarity is context-dependent, complex predicate template polarity calculator 282 outputs the complex predicate template candidate with a tag indicating that the polarity of sahen-noun is context-dependent. Therefore, in this case, the polarity of complex predicate template itself is not determined. The same applies to trouble-nouns.

<<Complex Predicate Template Candidate Extractor 268>>

Referring to FIG. 8, the computer program realizing complex predicate template candidate extractor 268 shown in FIG. 7 has the following control structure. Specifically, this program has a step 300 of repeating, on all sentences of all documents stored in WEB archive 44, the following process. The process repeated at step 300 includes: a step 302 of conducting morphological analysis on a sentence as an object and outputting a sequence of morphemes; a step 304 of conducting dependency analysis on the sequence of morphemes obtained at step 302 and outputting a dependency tree; and a step 306 of executing the following process steps on every node included in the dependency tree.

The process executed at step 306 includes: a step 308 of determining, for a node as an object of processing, whether the morphemes of the node is any of the object nouns (sahen-noun, quantifier noun or trouble-noun) stored in object noun dictionary 260 shown in FIG. 7, and if the determination is in the negative, proceeding the process to a next node; a step 310, executed if the determination at step 308 is in the positive, of determining whether or not the node dependency destination is a simple predicate template, and if the result of determination is in the negative, proceeding the process to a next node; a step 312, executed if the determination at step 310 is in the positive, of generating a complex predicate template candidate by combining a particle at the end of the node depending on the node under processing, a clause of the node under processing (current node) and the simple predicate template of the dependency destination; and a step 314 of classifying the complex predicate template generated at step 312 by the type (sahen-noun, quantifier noun, trouble-noun) of the object noun, storing the candidate in sahen-noun template candidate DB 270, quantifier noun template candidate DB 272 or trouble-noun template candidate DB 274, and proceeding the process to the next node.

<<Sahen-Noun Polarity Adder 276>>

Figure 9:
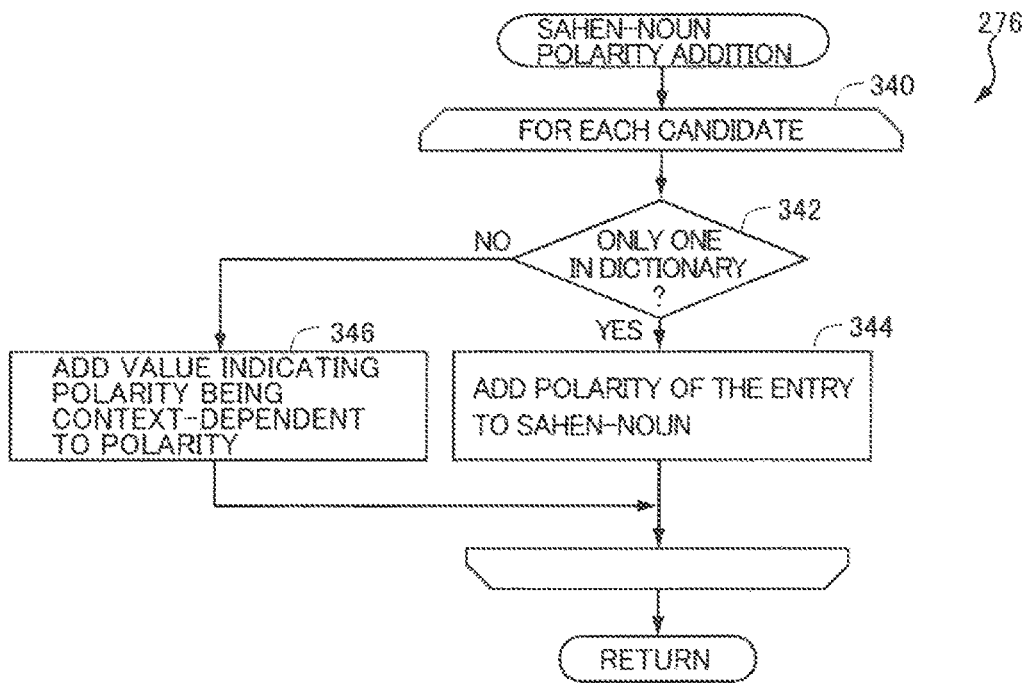
FIG. 9 is a flowchart representing a control structure of a program realizing a sahen-noun polarity adder shown in FIG. 7.

Sahen-noun polarity adder 276 shown in FIG. 7 is realized by a computer program as shown in FIG. 9. Referring to FIG. 9, the program includes a step 340 of executing the following process on every sahen-noun template candidate stored in sahen-noun template candidate DB 270.

Step 340 includes: a step 342 of determining whether or not only one index including the sahen-noun of a complex predicate template candidate exists in sahen-noun polarity dictionary 262; a step 344 executed if the determination at step 342 is in the positive, of adding the polarity indicated for the index in the dictionary to the sahen-noun and proceeding to processing of the next sahen-noun; and a step 346, executed if the determination at step 342 is in the negative, of adding a piece of information indicating that the polarity of sahen-noun is context-dependent, and proceeding to processing of the next sahen-noun.

<<Trouble-Noun Polarity Adder 280>>

Figure 10:
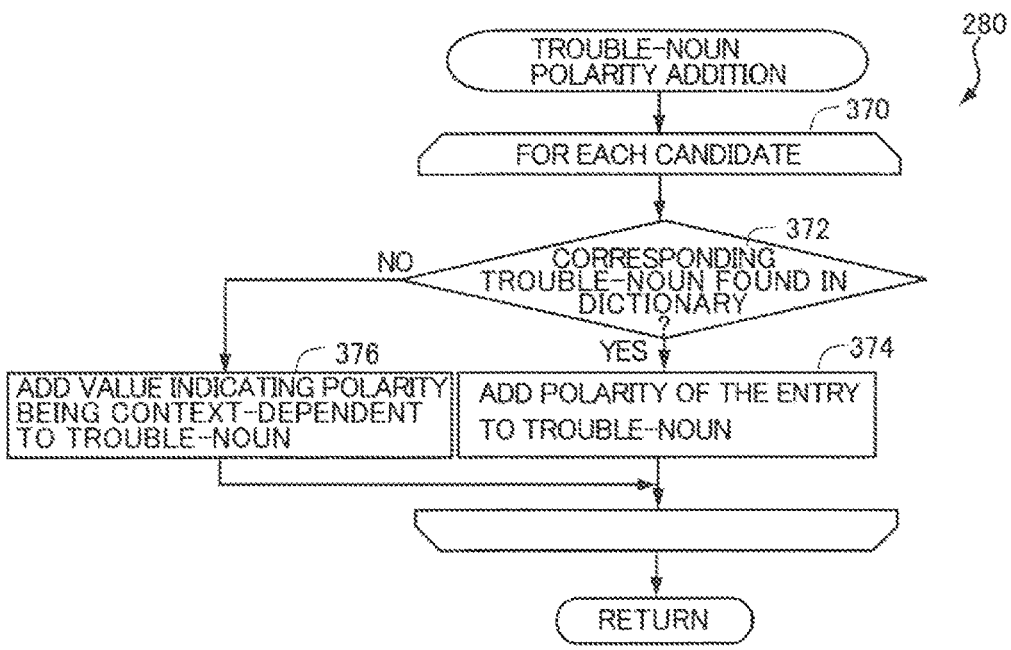
FIG. 10 is a flowchart representing a control structure of a program realizing a trouble-noun polarity adder shown in FIG. 7.

Referring to FIG. 10, trouble-noun polarity adder 280 shown in FIG. 7 is realized by a computer program having such a control structure as follows. The program includes a step 370 of executing the following process on every trouble-noun template candidate stored in trouble-noun template candidate DB 274.

The process executed at step 370 includes: a step 372 of determining whether or not only one index including the trouble-noun of a trouble-noun template candidate exists in trouble-noun polarity determining dictionary 266; a step 374, executed if the determination at step 372 is in the positive, of adding the polarity indicated for the index to the trouble-noun and proceeding to processing of the next candidate; and a step 376, executed if the determination at step 372 is in the negative, of adding a piece of information to the trouble-noun, the information indicating that the polarity of the trouble-noun is context-dependent, and proceeding to processing of the next trouble-noun.

<<Causality Phrase Pair Collector 68>>

Figure 11:
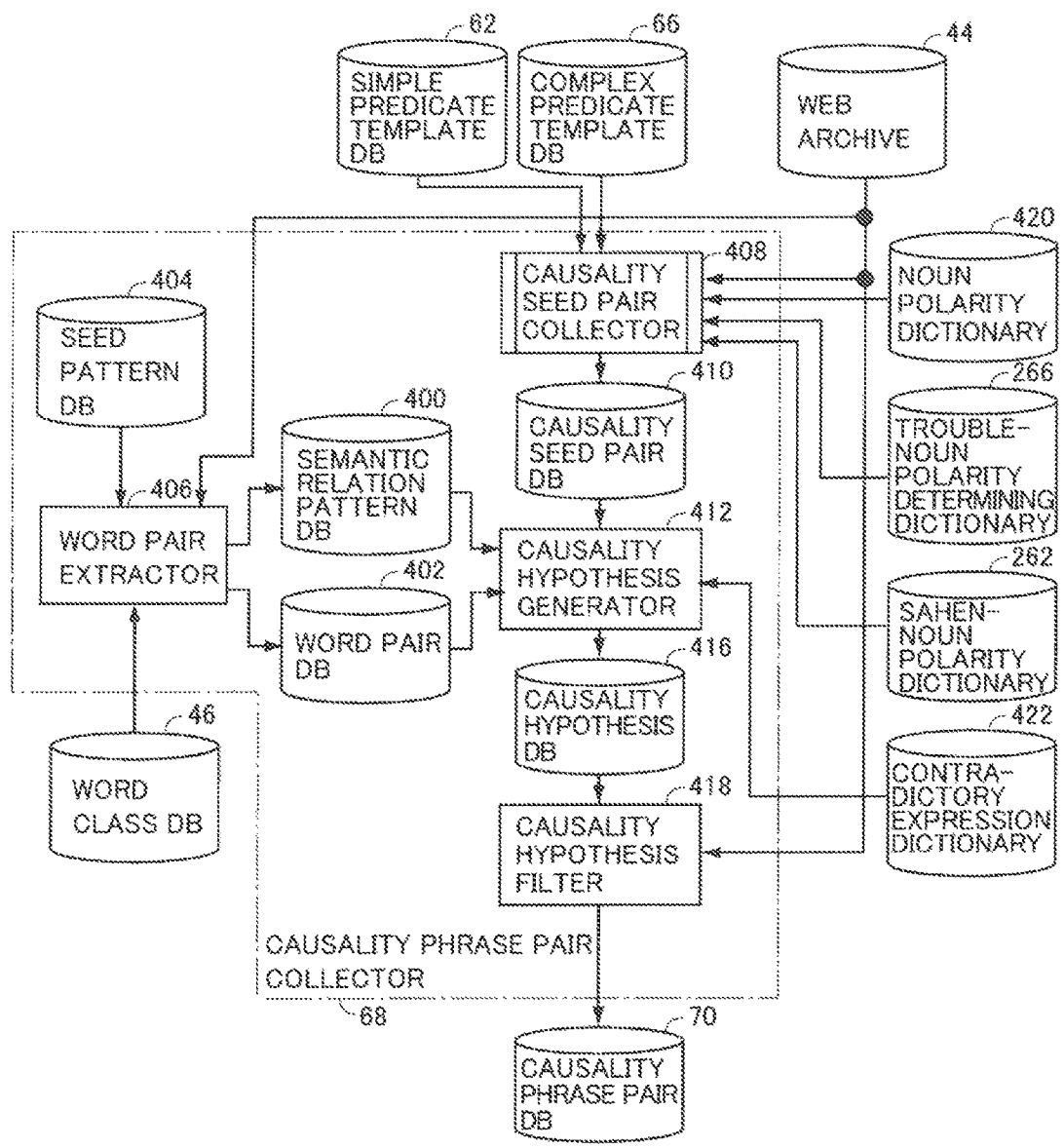
FIG. 11 is a block diagram showing a functional structure of a causality phrase pair collector shown in FIG. 1.

Referring to FIG. 11, the causality phrase pair collector 68 shown in FIG. 1 has a function of extracting, by looking up simple predicate template DB 62, complex predicate template DB 66, word class DB 46, noun polarity dictionary 420, trouble-noun polarity determining dictionary 266, sahen-noun polarity dictionary 262 and a contradictory expression dictionary 422, pairs of phrases having a relation of cause phrase and result phrase of causality from WEB archive 44 and storing them in causality phrase pair DB 70. Contradictory expression dictionary 422 is formed by collecting simple predicate template pairs consisting of mutually contradictory simple predicate templates.

Causality phrase pair collector 68 includes: a causality seed pair collector 408 collecting, by looking up simple predicate template DB 62, complex predicate template DB 66, noun polarity dictionary 420, trouble-noun polarity determining dictionary 266, and sahen-noun polarity dictionary 262, seed pairs that are phrase pairs forming causality as sources for generating subsequent causality hypotheses, from WEB archive 44; and a causality seed pair DB 410 storing the causality seed pairs collected by causality seed pair collector 408. Here, the "seed pair" refers to a pair of phrases that actually exists in WEB archive 44.

Causality phrase pair collector 68 further includes: a semantic relation pattern DB 400 storing semantic relation patterns prepared in advance; a word pair DB 402 storing word pairs satisfying certain semantic relations; a causality hypothesis generator 412 executing a process of generating, using semantic relation pattern DB 400 and word pair DB 402, based on causality seed pairs stored in causality seed pair DB 410, a new causality hypothesis by replacing a word pair in an original causality seed pair with a word pair satisfying the same semantic relation as the semantic relation of word (noun) pair included in the seed pair, and a process of generating a new causality hypothesis by replacing simple predicate templates in a causality seed pair with respective contradictory expressions; a causality hypothesis DB 416 storing causality hypotheses generated by causality hypothesis generator 412; and a causality hypothesis filter 418 extracting relevant causality relations from a large number of causality hypotheses stored in causality hypothesis DB 416, filtering the causality hypotheses and adding the results to causality phrase pair DB 70.

In the present embodiment, semantic relation pattern DB 400 and word pair DB 402 are also prepared beforehand by causality phrase pair collector 68. For this purpose, causality phrase pair collector 68 includes: a seed pattern DB 404 storing groups of specific patterns (referred to as seed patterns) as a source for extracting semantic relation patterns; and a word pair extractor 406 extracting, by looking up seed pattern DB 404 and word class DB 46, patterns similar to the seed patterns stored in seed pattern DB 404 from WEB archive 44 and thereby building the semantic relation pattern DB 400, and at the same time, specifying word pairs satisfying the semantic relation patterns and thereby building word pair DB 402. In the present embodiment, seed patterns are classified to separate seed pattern groups representing several semantic relations, and the semantic relations of word pairs correspond to different seed pattern groups, as will be described later.

<<Causality Seed Pair Collector 408>>

Figure 12:
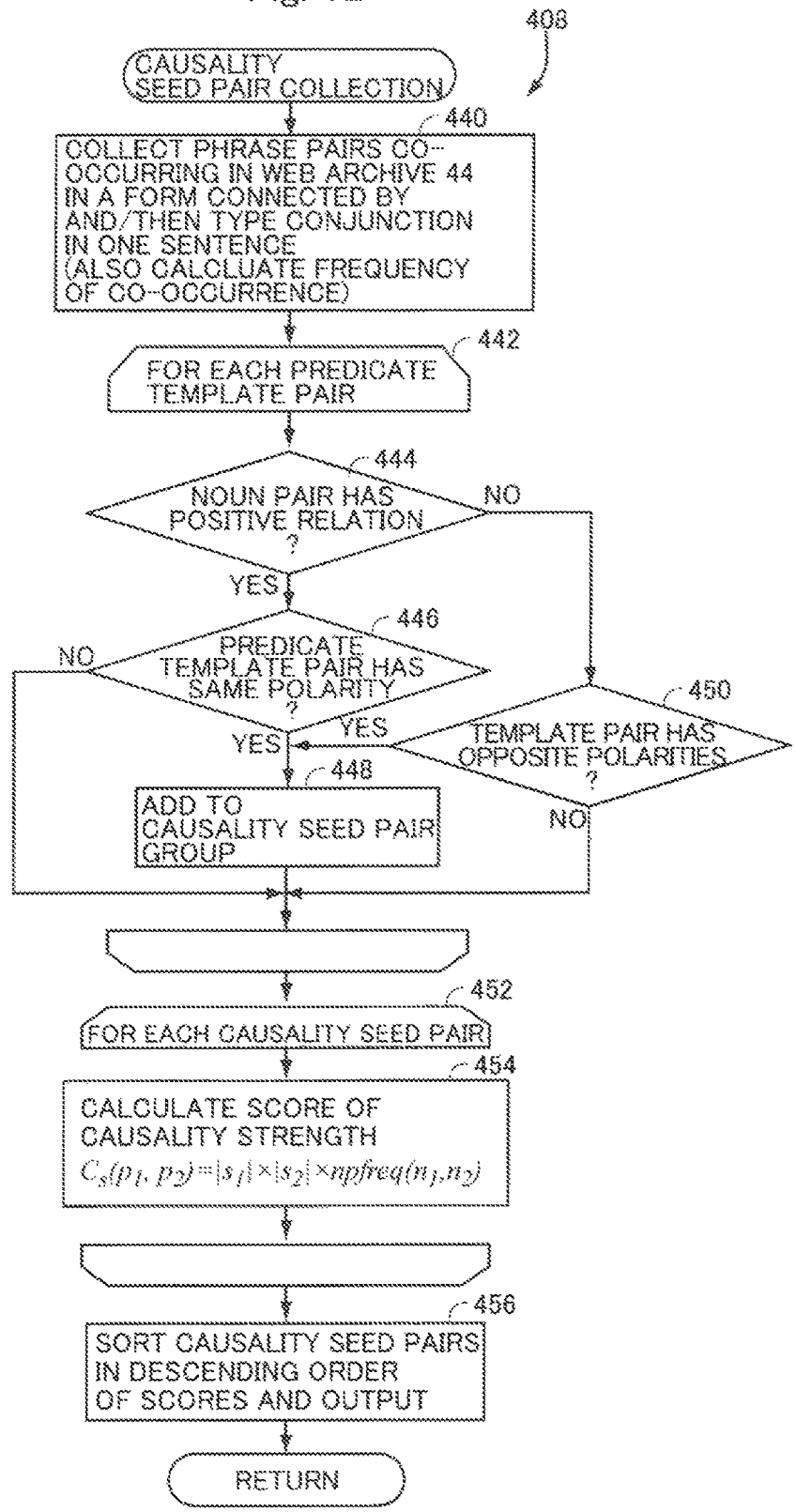
FIG. 12 is a flowchart representing a control structure of a program realizing a causality seed pair collector shown in FIG. 11 by a computer.

Causality seed pair collector 408 can be realized by a computer program. Referring to FIG. 12, the computer program includes: a step 440 of collecting, from WEB archive 44, phrase pairs, each in the form of a pair connected in one sentence by an and/thus-type conjunction ("noun+predicate template" pair (including both the simple predicate template and complex predicate template)), co-occurring in WEB archive 44, and calculating co-occurrence frequency thereof; and a step 442 of executing the following process on each of the phrase pairs collected at step 440. Here, a pair formed by nouns of phrases forming individual phrase pair will be referred to as a noun pair, and a pair formed by predicate templates will be referred to as predicate template pair.

Thereafter, on each phrase pair obtained in this manner, the following process is executed (step 442). The process executed at step 442 includes: a step 444 of determining whether the noun pair in the phrase pair as the object of processing has the positive relation; and a step 446, executed if the determination is in the positive, of determining whether the predicate template pair has the same polarities. If the determination at step 446 is in the negative, this phrase pair is discarded. Specifically, no further process is done and the process proceeds to the next predicate template. If the determination at step 446 is in the positive, the phrase pair is added to a causality seed pair group (step 448).

On the other hand, if the determination at step 444 is in the negative, whether the polarities of the template pair are opposite is determined at step 450. If the determination is in the negative, the phrase pair is discarded. If the determination is in the positive, the phrase pair is added to the group of causality seed pairs (step 448).

When the process described above is completed for all phrase pairs, for all causality seed pairs in the resulting group of causality seed pairs, the process of step 454 is executed. The process executed on each causality phrase pair at step 454 is the process of calculating the causality strength score $Cs(p_1, p_2)$, in accordance with the equation below.

$$C_s(p_1,p_2)=|s_1|\times|s_2|\times np\text{freq}(n_1,n_2) \qquad (3)$$

where $p_1$, $p_2$ represent phrases constituting the causality seed pair, $s_1$ and $s_2$ represent excitation values of templates forming phrases $p_1$ and $p_2$, respectively, $|s_1|$ represents absolute value of excitation value $s_1$, $n_1$ and $n_2$ represent nouns included in phrases $p_1$ and $p_2$, respectively, npfreq($n_1$, $n_2$) represents frequency of co-occurrence of $n_1$ and $n_2$ in one sentence with the template pair of the same excitatory/inhibitory class if $n_1$ and $n_2$ have the positive relation, and frequency of co-occurrence of $n_1$ and $n_2$ in one sentence with the template pair of the different excitatory/inhibitory class if $n_1$ and $n_2$ have the negative relation.

After the score of causality strength is calculated for every causality seed pair in this manner, at step 456, the causality seed pairs are sorted and output, in the descending order of scores.

By executing such a process, a huge number of phrase pairs representing causality can automatically be collected from WEB archive 44.

The method of acquiring causality seed pairs is not limited to the above. For example, the phrase pairs satisfying all the following conditions may be acquired as causality seed pairs.

(1) Each of the two phrases consists of one noun and one predicate template. Example: phrase pair such as "(jishin wo) okosu (cause earthquake)" and "(tsunami ga) hassei suru (tsunami hits)".

(2) Both phrases co-occur in one sentence, connected by an and/thus-type conjunction, such as " . . . te (and)". Example: phrase pair such as "danso ga jishin wo okoshi te tsunami ga hassei shita (a fault caused an earthquake, and tusnamis hit)".

Specifically, from WEB archive 44, predicate template pairs co-occurring in one sentence with an and/thus-type conjunction and noun pair co-occurring in the one sentence are acquired. These are considered to be a prototype of causality phrase pair.

For the causality seed pair obtained in this manner, the causality strength score is calculated in accordance with Equation (3) above. Then, all the causality seed pairs are sorted and output in descending order of the causality strength scores.

The score may be calculated using Equation (4) below, in place of Equation (3).

$$C_s(p_1,p_2)=|s_1|\times|s_2| \qquad (4)$$

<<Causality Hypothesis Generator 412>>

Figure 13:
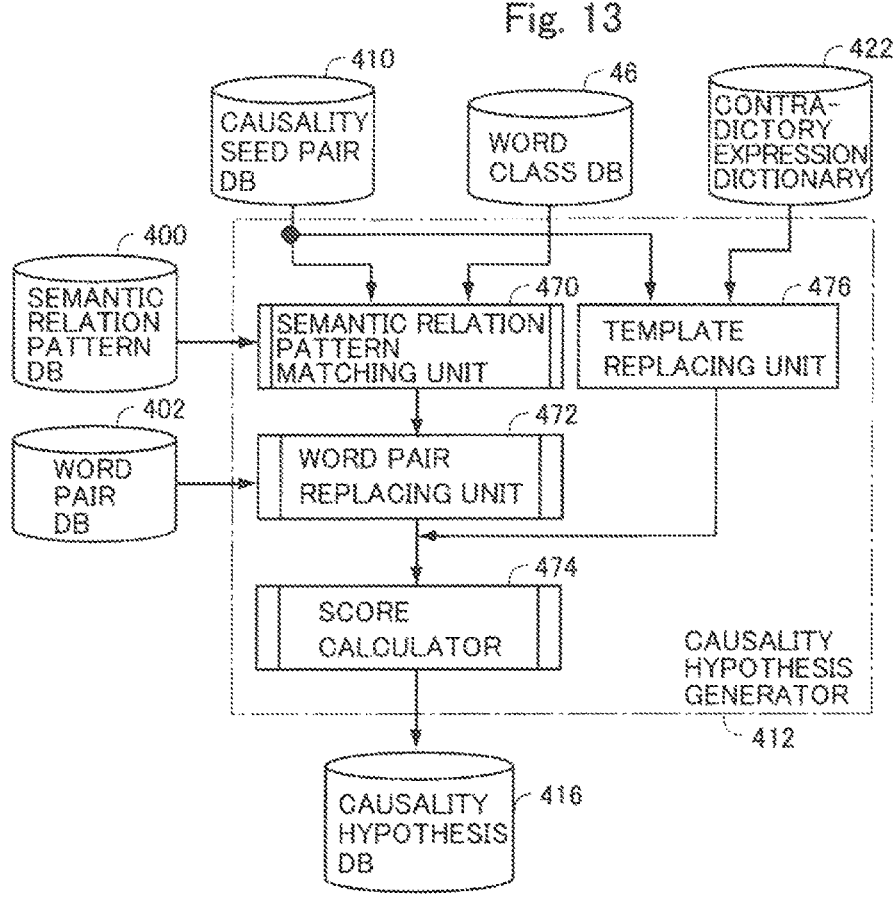
FIG. 13 is a block diagram showing a functional structure of a causality hypothesis generator shown in FIG. 11.

Referring to FIG. 13, causality hypothesis generator 412 shown in FIG. 11 includes: a semantic relation pattern matching unit 470, connected to causality seed pair DB 410, word class DB 46, semantic relation pattern DB 400 and word pair DB 402, conducting matching between semantic relation pattern of a noun pair included in a causality seed pair stored in causality seed pair DB 410 with semantic relation pattern DB 400; a word pair replacing unit 472 reading, from word pair DB 402, a word pair having the semantic relation determined by semantic relation pattern matching unit 470 to be matching the semantic relation pattern of the causality seed pair from among the word pairs stored in word pair DB 402, replacing the noun pair of the original causality seed pair with the read pair and thereby generating a new causality hypothesis; a template replacing unit 476 replacing, for each of the causality seed pairs stored in causality seed pair DB 410, simple predicate template of each phrase of causality seed pair with contradictory expression with reference to contradictory expression dictionary 422 and thereby generating a new causality hypothesis; and a score calculator 474 calculating scores of causality strength of causality hypotheses newly generated by word pair replacing unit 472 and template replacing unit 476, and adding the causality hypotheses having the scores assigned, to causality hypothesis DB 416. A new causality hypothesis is generated by template replacing unit 476 on the ground that if the original causality phrase pair is relevant, it is highly likely that the inverse (the pair negating the predicate of each phrase) is also relevant. For example, if a causality of "stress increases (cause)"→"sleeplessness continues (result)" is relevant, an inverse semantic causality, that is, "stress decreases (cause)"→"sleeplessness stops (result)" is considered to be highly relevant.

The semantic relation pattern DB 400 and word pair DB 402 shown in FIG. 13 may be prepared by any means. In order to prepare semantic relation pattern DB 400 and word pair DB 402, the present embodiment provides: a seed pattern DB 404 storing seed patterns classified to a number of seed pattern groups as phrases as sources of semantic relation patterns; and a word pair extractor 406 connected to seed pattern DB 404 and word class DB 46 and based on pieces of information stored therein, extracting expression patterns having similar semantic relations as the seed patterns stored in seed pattern DB 404 and word pairs appearing in such expressions from WEB archive 44, and adding these to semantic relation pattern DB 400 and word pair DB 402, respectively, as shown in FIG. 11.

Here, the seed patterns are patterns representing the material relation, necessity relation, use relation, prevention relation or causality as described above, and the seed patterns are classified to different seed pattern groups. Pattern examples are "produce B from A" for the material relation, "A is indispensable for B" for the necessity relation, "use A for B" for the use relation, "prevent B by A" for the prevention relation, and "A causes B" for the causality. The pattern refers to a phrase including a portion corresponding to a variable. In the examples above, A and B are variables. By replacing A and B by different words, various phrases can be generated. If A and B have no semantic relation, however, the resulting phrases would be meaningless.

Word pair extractor 406 has a function of extracting word pairs having specific semantic relations. Word pair extractor 406 further has a function of adding not only the seed patterns stored in seed pattern DB 404 but also patterns similar to the seed patterns among the patterns extracted from WEB archive 44 to the seed patterns.

<<Word Pair Extractor 406>>

Figure 14:
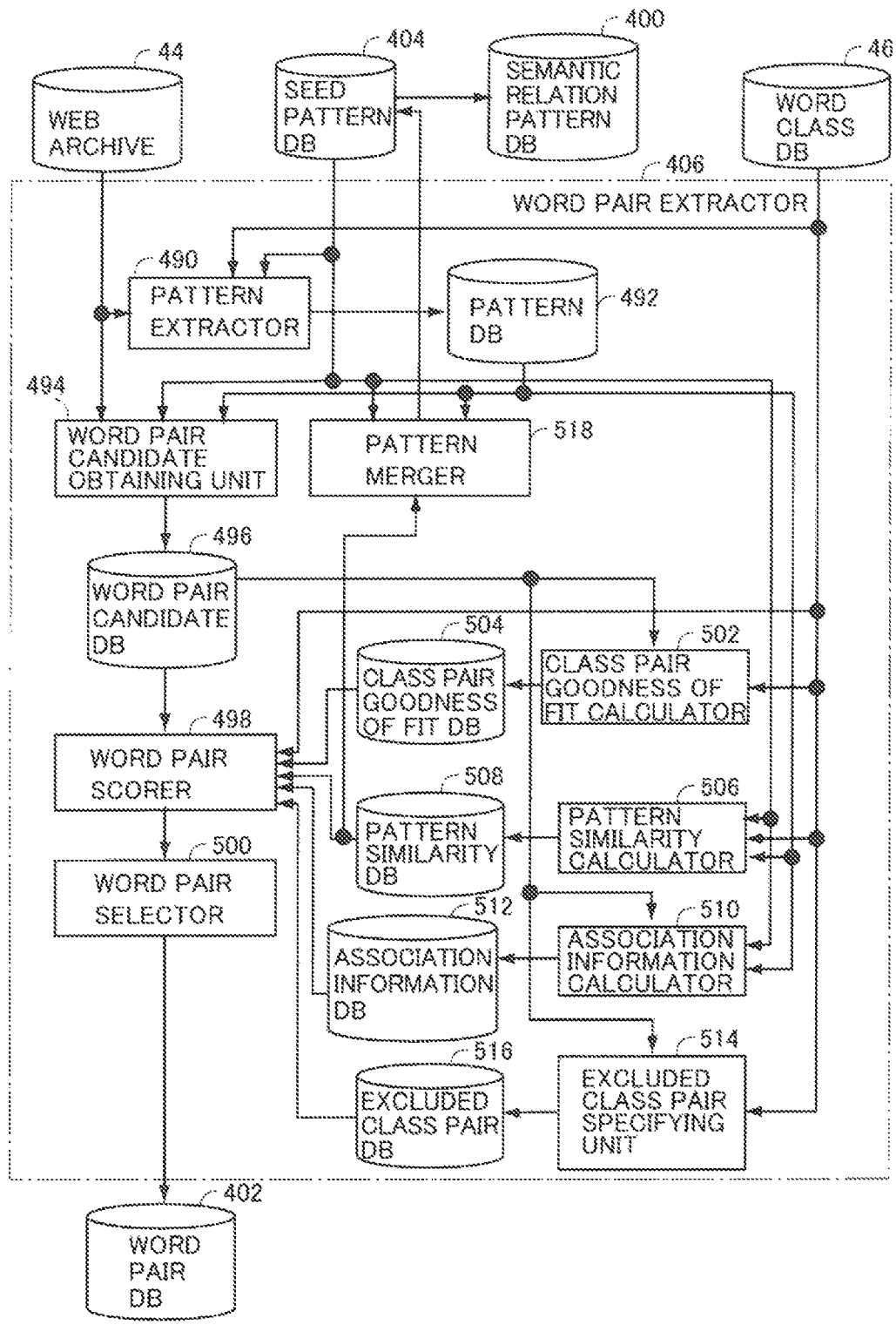
FIG. 14 is a block diagram showing a functional structure of a word pair extractor shown in FIG. 11.

Referring to FIG. 14, word pair extractor 406 adopted in the present embodiment includes: a pattern extractor 490 connected to WEB archive 44 and seed pattern DB 404, extracting specific patterns from WEB archive 44; a pattern DB 492 storing patterns extracted by pattern extractor 490; a word pair candidate obtaining unit 494, obtaining, by looking up seed patterns stored in seed pattern DB 404 and patterns stored in pattern DB 492, word pairs matching respective patterns (satisfying the relations of A and B described above) from WEB archive 44; a word pair candidate DB 496 storing word pairs extracted by word pair candidate obtaining unit 494; and a pattern merger 518 specifying, of the patterns stored in pattern DB 492, a pattern similar to any of the seed patterns stored in seed pattern DB 404 based on a degree of similarity of a set of word pairs extracted from the patterns, and merging it as a new seed pattern, in seed pattern DB 404. To the seed pattern added in this manner, pattern merger 518 puts a label of semantic relation of the seed pattern group to which the seed pattern having the highest similarity to the new seed pattern, and adds the new pattern to seed pattern DB 404.

Word pair extractor 406 further includes: a class pair goodness of fit calculator 502 for calculating, for each class pair, a degree of class pair goodness of fit as an index of goodness of fit between any two word classes held in word class DB 46, with reference to word pair candidate DB 496, WEB archive 44 and seed pattern DB 404; class pair goodness of fit DB 504 storing the calculated class pair goodness of fit for each class pair; a pattern similarity calculator 506 calculating degree of pattern similarity for each combination of a pattern stored in pattern DB 492 and a seed pattern group stored in seed pattern DB 404; a pattern similarity DB 508 storing, for each combination of a pattern stored in pattern DB 492 and a seed pattern group stored in seed pattern DB 404, the pattern similarity calculated by pattern similarity calculator 506; an association information calculator 510 calculating association information between a word pair and each pattern stored in pattern DB 492 and a seed pattern group stored in seed pattern DB 404; an association information DB 512 storing, for each combination of the word pair and the pattern, the association information calculated by association information calculator 510; an excluded class pair specifying unit 514, determining, for each word class pair stored in word class DB 46, whether a difference in appearance frequency on WEB archive 44 of words belonging to each class is equal to or higher than a threshold value, and excluding a class pair of which difference is equal to or higher than the threshold value from objects of final output; and an excluded class pair DB 516 storing excluded class pairs specified by excluded class pair specifying unit 514. Functions of class pair goodness of fit calculator 502, pattern similarity calculator 506, association information calculator 510 and excluded class pair specifying unit 514 will be described later.

Word pair extractor 406 further includes: a word pair scorer 498 calculating, for each word pair stored in word pair candidate DB 496, a score indicating adequacy as a word pair that co-occurs with the seed pattern, with reference to class pair goodness of fit DB 504, pattern similarity DB 508 and association information DB 512, while excluding word pairs belonging to the class pairs specified by excluded class pair specifying unit 514; and a word pair selector 500 selecting, from the word pairs scored by word pair scorer 498, only those word pairs which have scores equal to or higher than a threshold value and outputting these to word pair DB 402.

In the following, main components of word pair extractor 406 will be described in greater detail.

—Pattern Extractor 490

Pattern extractor 490 extracts patterns from documents stored in WEB archive 44 through the following steps. Specifically, pattern extractor 490 conducts morphological analysis on each sentence of each document stored in WEB archive 44 and then conducts dependency analysis. As a result, (data representing) a dependency tree is obtained for each sentence. Using a path on the dependency tree having each noun of the dependency tree as a start point and another noun as an end point as a pattern candidate, pattern extractor 490 extracts morpheme sequences existing on the path. Then, nouns on the morpheme sequences are each converted to a variable. At this time, the class to which each noun belongs is examined by looking up word class DB 46, and it is added to each variable as class information representing to which the variable belongs. Thus, one pattern is obtained. It may be possible that a plurality of patterns are obtained from one sentence. Further, the number of nouns depending on one noun is not limited to two and, therefore, a plurality of patterns including variables corresponding to one same noun may result.

For the patterns obtained in this manner, pattern extractor 490 calculates frequency information representing how many times the same pattern including the variable class appeared, and every time a new pattern is obtained, the pattern extractor adds it to pattern DB 492.

—Word Pair Candidate Obtaining Unit 494

Word pair candidate obtaining unit 494 examines and obtains word pairs that co-occur with seed patterns stored in seed pattern DB 404, using all sentences of all documents included in WEB archive 44 as objects. Here, a word pair co-occurs with a seed pattern means that character strings including a word pair existing in a document having the word pair replaced by respective word classes match the seed pattern. Word pair candidate obtaining unit 494 stores the word pair obtained in this manner in word pair candidate DB 496, together with identification information of the matching seed pattern. Word pair candidate obtaining unit 494 also counts the frequency of co-occurrence of a seed pattern with a word pair for every combination of a seed pattern and a word class pair, and stores in word pair candidate DB 496.

—Class Pair Goodness of Fit Calculator 502

Class pair goodness of fit is an index representing frequency (degree) of two word classes co-occurring with any of the seed patterns belonging to a certain seed pattern group. Class pair goodness of fit calculator 502 calculates class pair goodness of fit of each class pair. In the present embodiment, the class pair goodness of fit is defined such that when words belonging to two class pairs have higher frequency of co-occurrence with any of the seed patterns p belonging to a seed pattern group P, the class pair goodness of fit of the class pair becomes higher. For example, class pair goodness of fit $C(c_i, c_j, P)$ of word class pair $c_i$ and $c_j$ with respect to a seed pattern group P can be defined as follows. In the equation below, $n_i$ and $n_j$ represent words belonging to word classes $c_i$ and $c_j$, respectively, and represents an arbitrary pattern.

$$C(c_i, c_j, P) \begin{cases} \dfrac{\sum_{(n_i, n_j) \in c_i * c_j} \|(n_i, P, n_j)\|}{\sum_{(n_i, n_j) \in c_i * c_j} \|(n_i, *, n_j)\|} & \text{when condition a is satisfied} \\ 0 & \text{otherwise} \end{cases}$$

In the equation, "$\|(n_i, P, n_j)\|$" represents the number of elements of a set consisting of frequency instances where nouns $n_i$ and $n_j$ co-occur with any of the seed patterns p in seed pattern group P. Therefore, "$\|(n_i, *, n_j)\|$" represents frequency of nouns $n_i$ and $n_j$ co-occur with any pattern in the group of documents (referred to as a document set M) stored in WEB archive 44, which is given by the following equation.

$$\|(n_i, *, n_j)\| = \Sigma_{(n_i, p, n_j) \in M} \|(n_i, p, n_j)\|$$

This value is equal to the frequency of co-occurrence of nouns $n_i$ and $n_j$ regardless of the pattern.

Condition a is, for example, a condition that the number of types of seed patterns with which word class pair $c_i$ and $c_j$ co-occurs is a prescribed number or larger. This can be represented by the following equation, in which β is the prescribed number.

$$\alpha: \|\{(p \in P | \exists (n_i, n_j) \in c_i \times c_j, (n_i, p, n_j) \in M)\}\| \geq \beta$$

Class pair goodness of fit calculator 502 counts the word pairs stored in word pair candidate DB 496 and pieces of identification information of seed patterns with which the word pairs co-occurred, and thereby calculates, for each class pair, the class pair goodness of fit and stores the results in class pair goodness of lit DB 504.

—Pattern Similarity Calculator 506

Pattern similarity calculator 506 calculates degree of similarity between each pattern stored in pattern DB 492 with each seed pattern group stored in seed pattern DB 404, and stores the results for each combination of a pattern group and a pattern, in pattern similarity DB 508. In the present embodiment, the pattern similarity between a certain seed pattern group and a pattern is defined as representing a degree of overlap between a class pair co-occurring with a seed pattern belonging to a seed pattern group and a class pair co-occurring with an object pattern. Specifically, the pattern similarity S (P, p) between a set P of seed patterns belonging to a certain group of seed patterns and a pattern p as an object is defined by the following equation, where the set of word class pairs (ci×cj) consisting of word class ci and word class cj co-occurring with a seed pattern belonging to the set P is represented by $I(P_{ci \times cj})$ and the set of word class pair (ci×cj) co-occurring the pattern is represented as $I(p_{ci \times cj})$.

$$S(p_{c_i \times c_j}, P) = \frac{\|I(p_{c_i \times c_j}) \cap I(P_{c_i \times c_j})\|}{\|I(p_{c_i \times c_j}) \cup I(P_{c_i \times c_j})\|}$$

Here, two lines delimiting the denominator and the numerator on the right side represent the number of elements belonging to the set represented by the expressions therein.

Pattern similarity may be defined otherwise. For example, vector comparison as described below is possible. Consider, for example, a vector having all possible word class pairs as elements. In WEB archive 44, the number of word class pairs co-occurring with a certain seed pattern group P is counted, and its value is used as the value of elements corresponding to the word class pair of the vector mentioned above, to calculate a feature vector $V_P$ of the seed pattern group P. Similarly, the number of word class pairs co-occurring with a certain pattern p is counted, and its value is used as the value of elements corresponding to the word class pair of the vector mentioned above, to calculate the feature vector $V_p$ of the pattern p. By calculating an angle between these two vectors $V_P$ and $V_p$, the degree of similarity between the seed pattern group P and the pattern p can be obtained. In calculating the vectors, class pairs not co-occurring with the pattern group P or the pattern group p ma be excluded from the vector elements.

—Association Information Calculator 510

The association information is an index representing association with a certain word pair and a certain pattern, of which value becomes higher as the frequency of co-occurrence between a certain word pair and a certain pattern becomes higher. In the present embodiment, the frequency represents frequency of co-occurrence between a word pair and a pattern in WEB archive 44. In the present embodiment, association information Assoc(p, $n_1$, $n_2$) of a word pair ($n_1$, $n_2$) and a pattern p is defined by the following equation, where ($n_1$, p, $n_2$) represents a set of instances in which the word pair ($n_1$, $n_2$) is co-occurring with pattern p, and "*" represents, depending on its position, an arbitrary pattern or word.

$$Assoc(p, n_1, n_2) = \log\frac{\|(n_1, p, n_2)\|}{\|(n_1, *, n_2)\| \cdot \|(*, p, *)\|}$$

As can be seen from this equation, if the frequency of co-occurrence of word pair ($n_1$, $n_2$) and pattern p becomes higher, the value of association information Assoc(p, $n_1$, $n_2$) becomes higher. For a prescribed word pair ($n_1$, $n_2$), the association information Assoc(p, $n_1$, $n_2$) becomes smaller as the frequency of appearance $\|(*, p, *)\|$ of pattern p becomes higher. Similarly, for a prescribed pattern p, the association information Assoc(p, $n_1$, $n_2$) becomes smaller as the frequency of appearance $\|(n_1, n_2)\|$ of word pair ($n_1$, $n_2$) becomes higher.

The association information Assoc(p, $n_1$, $n_2$) can also be calculated for a combination of an arbitrary word pair and an arbitrary pattern, by counting the word pairs recorded in word pair candidate DB 496 and the pattern identification information.

—Excluded Class Pair Specifying Unit 514

Excluded class pair specifying unit 514 specifies a word class pair that will be excluded from the set of word pairs to be eventually output. In the present embodiment, for each word class pair, average frequency of appearance of a word pair formed of words belonging to the class pair is calculated, and a word class pair of which difference between the average values is large is defined as an excluded class. More specifically, those word pairs with substantially different values are excluded as unfit. Here, if the ratio of the frequency of appearance of a word class having high frequency of appearance to the frequency of appearance of a word class having low frequency of appearance exceeds a threshold value, that word class pair is excluded. It is necessary to set the threshold value to an appropriate value through preliminary experiments. In the present embodiment, this value is set to about 25.

—Word Pair Scorer 498

Word pair scorer 498 calculates and outputs to word pair selector 500 a prescribed score for each combination of each of word pairs recorded in word pair candidate DB 496 and not the object of exclusion and a seed pattern best-matching the word pair, based on the word class goodness of fit stored in word class pair goodness of fit DB 504, the pattern similarity stored in pattern similarity DB 508, the association information stored in association information DB 512 and excluded class pair information stored in excluded class pair DB 516. In the present embodiment, this score is defined such that it changes with positive correlation with any of the class goodness of fit, the pattern similarity and the association information.

For example, a score Score ($n_1$, $n_2$, P) for the combination of a word pair ($n_1$, $n_2$) and a seed pattern P is, in the simplest manner, given by the equation below.

$$\text{Score}(n_i, n_j, P) = \max_{c_i \in class(n_i), c_j \in class(n_j), (n_i, p, n_j) \in M} \{C(c_i, c_j, P) \cdot S(p_{c_i \times c_j}, P) \cdot Assoc(p, n_i, n_j)\}$$

—Word Pair Selector 500

Word pair selector 500 selects, from combinations of sorted word pairs and seed pattern groups, a prescribed number of higher ranked ones and outputs these to word pair DB 402. At this time, word pair selector 500 adds, to each word pair, an identifier of the seed pattern group with which the pair forms a set. The number of word pairs to be selected is determined in advance through experiments.

—Pattern Merger 518

For each of the patterns stored in pattern DB 492 and each of the pattern groups stored in seed pattern DB 404, pattern merger 518 reads the pattern similarity calculated by pattern similarity calculator 506 from pattern similarity DB 508, and adds a pattern having the pattern similarity higher than a threshold value as a new seed pattern, to the seed pattern group.

Word pair extractor 406 repeats the above-described process while updating the seed pattern DB 404, outputs, as final word pairs, that word pair DB 402 which is at hand when a prescribed end condition is satisfied, and also outputs the seed pattern groups stored in seed pattern DB 404 at that time to semantic relation pattern DB 400. Each of the seed pattern groups stored in semantic relation pattern DB 400 has an identifier indicating the type of original seed pattern group. Therefore, by examining the identifier of a semantic relation pattern stored in semantic relation pattern DB 400, it is possible to know which of the material relation, necessity relation, use relation, prevention relation and causal relation described above the semantic relation pattern represents. Further, a word pair stored in word pair DB 402 has an identifier of a seed pattern group that frequently co-occurs with the word pair. Therefore, by examining the identifier, it is possible to know which semantic relation is satisfied by the word pair.

<<Semantic Relation Pattern Matching Unit 470, Word Pair Replacing Unit 472 and Score Calculator 474>>

Each of the semantic relation pattern matching unit 470, word pair replacing unit 472, score calculator 474 and template replacing unit 476 forming causality hypothesis generator 412 shown in FIG. 13 can be realized by a computer program. Control structure of the program for this purpose in accordance with the present embodiment will be described.

Figure 15:
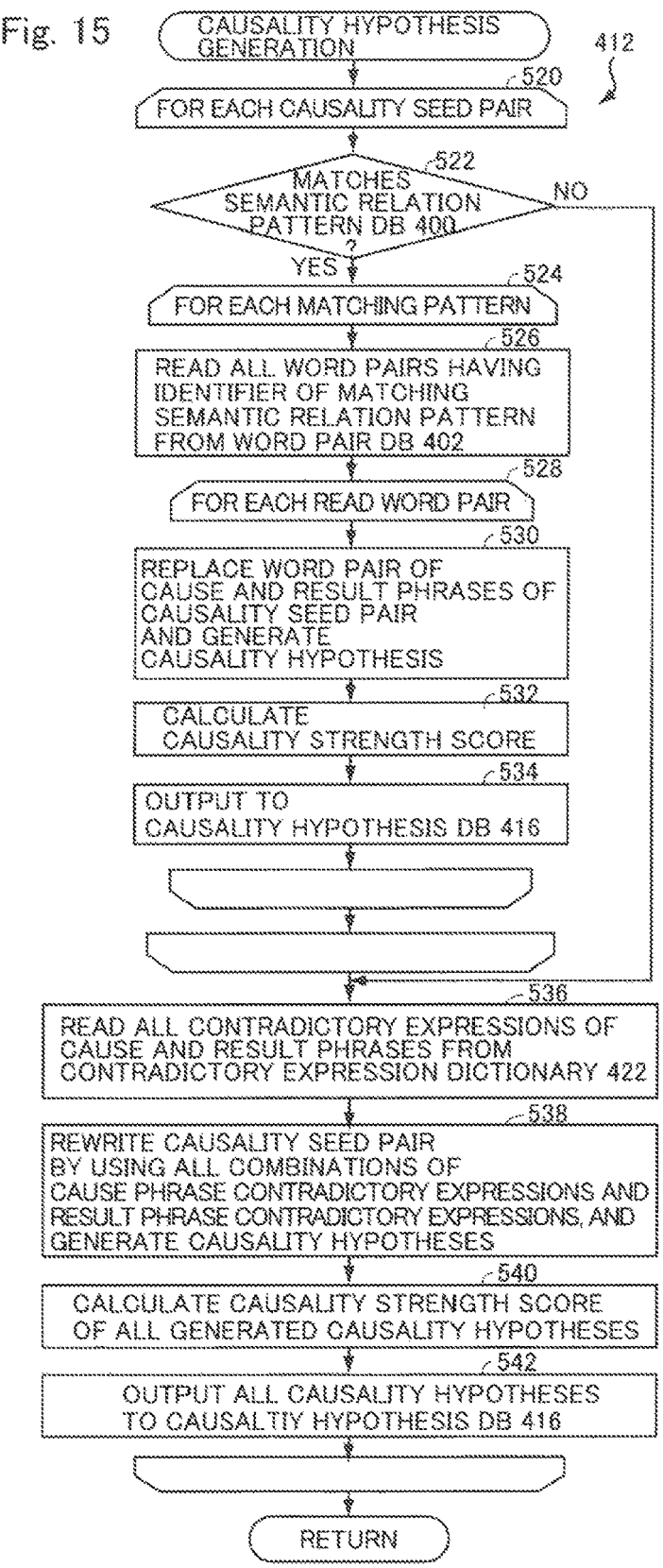
FIG. 15 is a flowchart representing a control structure of a program realizing a causality hypothesis generator 412 shown in FIG. 13 by a computer.

Referring to FIG. 15, the program includes a step 520 of reading one by one causality seed pairs from causality seed pair DB 410 shown in FIG. 13 and executing the following process on every pair.

The process executed at step 520 includes: a step 522 of matching a word class pair formed of nouns of a cause phrase and a result phrase of a causality seed pair as an object of processing with a semantic relation pattern stored in semantic relation pattern DB 400, and determining whether there is any semantic relation pattern matching the word pair; and a step 524 of executing, if it is determined at step 522 that there is a matching semantic relation pattern, the following process on every matching patterns. If it is determined at step 522 that there is no matching semantic relation pattern, the process on the causality seed pair as the object of processing ends, and the process proceeds to a next causality seed pair.

The process executed at step 524 includes: a step 526 of reading all word pairs having the identifier of the matching semantic relation pattern from word pair DB 402; and a step 528 of executing the following process on every word pair read at step 526.

Step 528 includes: a step 530 of replacing noun slots of the cause phrase and the result phrase of the causality seed pair as an object of processing with words included in the read word pair, respectively, and thereby generating a new causality hypothesis; a step 532 of calculating causality strength score of the causality hypothesis generated at step 530, through the process similar to that executed at step 454 of FIG. 12; and a step 534 of adding the causality strength score calculated at step 532 to the causality hypothesis generated at step 530, and outputting the results to causality hypothesis DB 416 (see FIG. 13). If the determination at step 522 is YES, the process above is executed on every matched pattern.

The program further includes: a step 536, executed if the determination at step 522 is NO, or if the determination at step 522 is YES and the process at step 524 is completed on the causality seed pair under processing, of reading, for the causality seed pair under processing, all contradictory expressions of the cause phrase and the result phrase from contradictory expression dictionary 422; a step 538 of replacing, using each of the combinations of the contradictory expressions of the cause phrase and the contradictory expressions of the result phrase read at step 536, the cause phrase and the result phrase of the causality seed pair and thereby generating new causality hypotheses; a step 540 of calculating the causality strength of every causality hypothesis generated at step 538; and a step 542 of adding the score calculated at step 540 to each of the causality hypotheses generated at step 538 and outputting these to causality hypothesis DB 416.

When the process described above is completed on all causality seed pairs, execution of this program ends.

<<Causality Hypothesis Filter 418>>

The causality hypotheses generated in the above-described manner may include correct ones and incorrect ones. Thus, it is necessary to select only the correct causality relations. Causality hypothesis filter 418 executes the filtering process.

Figure 16:
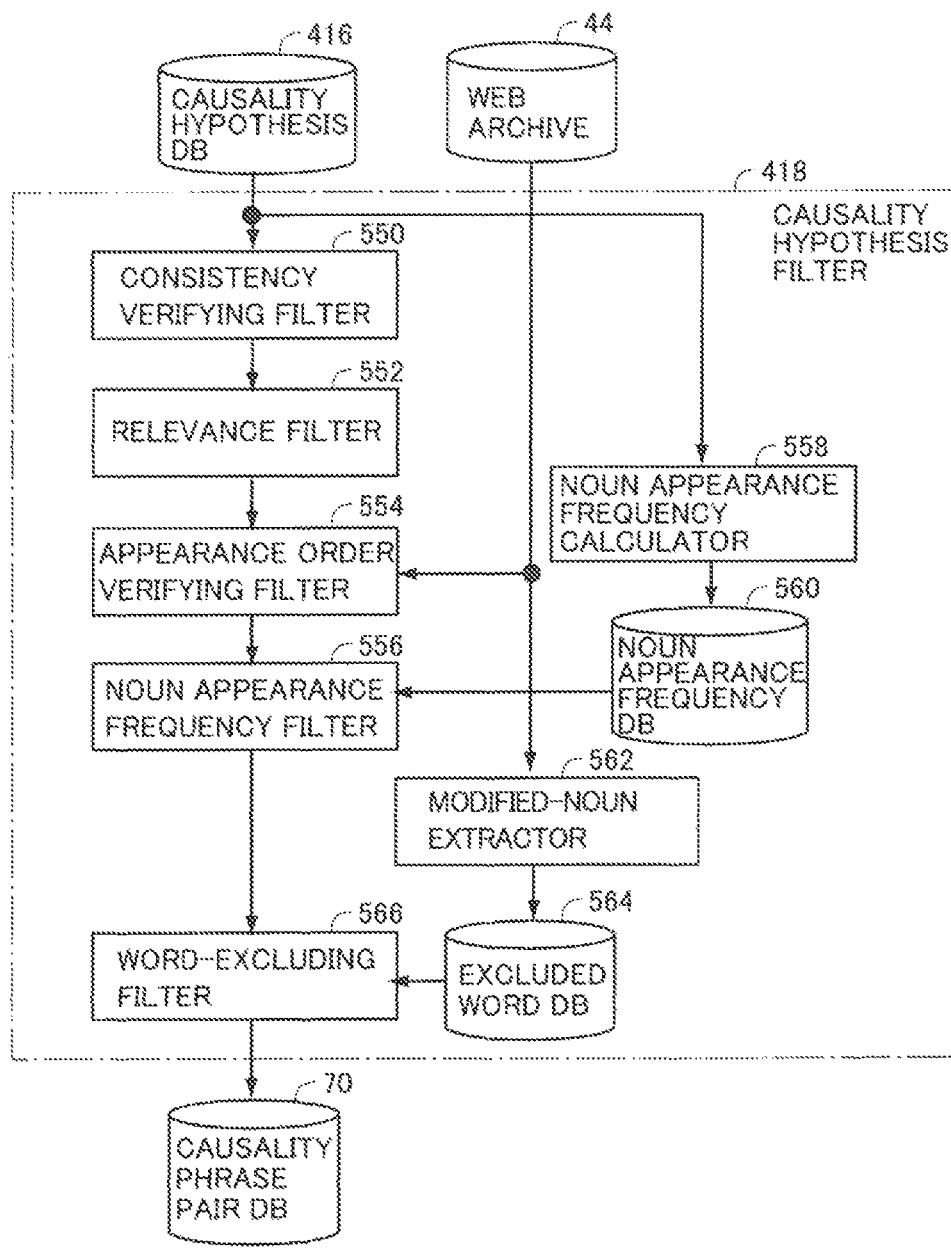
FIG. 16 is a block diagram showing a functional structure of a causality hypothesis filter shown in FIG. 11.

Referring to FIG. 16, causality hypothesis filter 418 includes: a consistency verifying filter 550, reading one by one the causality hypotheses from causality hypothesis DB 416, verifying consistency of causality of each one and thereby filtering the causality hypotheses; a relevance filter 552, filtering the causality hypotheses remaining after the filtering by consistency verifying filter 550, by relevancy of noun pairs in the phrase pair forming each causality hypothesis; an appearance order verifying filter 554, filtering the causality hypotheses remaining after the filtering by relevance filter 552, in accordance with the order in which the cause phrase and the result phrase appear in a sentence in WEB archive 44; a noun appearance frequency filter 556, filtering the causality hypotheses remaining after the filtering by appearance order verifying filter 554, excluding those causality hypotheses which are considered to be too vague and to have too wide meanings since the nouns included in the cause phrase or result phrase are used in a very large number of causality hypotheses; and a word-excluding filter 566, determining whether or not a noun as an element of a causality hypothesis accompanies a specific form of modifier phrase on WEB archive 44, thereby excluding causality hypotheses including nouns only having vague meanings, and outputting final causality phrase pairs to causality phrase pair DB 70.

Causality hypothesis filter 418 further includes: a noun appearance frequency calculator 558 for calculating noun appearance frequency in causality hypotheses recorded in causality hypothesis DB 416, to be used for the process by noun appearance frequency filter 556; a noun appearance frequency DB 560 storing appearance frequencies of nouns calculated by noun appearance frequency calculator 558; a modified-noun extractor 562 extracting a noun modified by another phrase ("B" in the form of "B of A"), by searching the entire WEB archive 44; and an excluded-word DB 564 storing nouns extracted by modified-noun extractor 562 to be used by word-excluding filter 566 for excluding causality. The details of the five filters and others in the causality hypothesis filter 418 will be described in the following.

<<Consistency Verifying Filter 550>>

Consistency verifying filter 550 performs a process of determining whether or not a certain causality hypothesis has consistency with another causality hypothesis, and retaining only the consistent one, focusing on a noun pair included in the cause phrase and the result phrase of causality. Here, when we consider an example of causality hypotheses "sea level rises→drought protracts," the noun pair of this causality hypothesis is "sea level" and "drought."

If there are a causality hypothesis including a noun pair $(n_1, n_2)$ and a causality hypothesis including a noun pair $(n_2, n_1)$, consistency verifying filter 550 excludes these causality hypotheses from candidates. For example, if a causality hypothesis "sea level rises→drought protracts" and a causality hypothesis "drought protracts→sea level rises" exist, both causality hypotheses are excluded.

The reason for the above is as follows. If a cause phrase and a result phrase of a certain causality hypothesis have opposite relations with a cause phrase and a result phrase of another causality hypothesis, it is considered that both of these causality hypotheses are irrelevant as causality relations.

<<Relevance Filter 552>>

Relevance Filter 552 excludes such a noun pair of a causality hypothesis that has low relevance with each other. As the degree of relevance, Pointwise Mutual Information (PMI), DICE coefficient, Jaccard coefficient, x square and the like may be used. Specific method of calculation is as follows.

PMI

PMI is an index representing degree of relevancy between nouns x and y. PMI (x, y) is calculated by the following equation. In the following equation. P(x) represents probability of appearance of noun x, and P(y) represents probability of appearance or noun y, and P(x, y) represents probability of co-occurrence of nouns x and y.

$$PMI(x, y) = \log \frac{P(x, y)}{P(x)P(y)}$$

When the probability of co-occurrence of nouns x and y is to be calculated, it is necessary to count the frequency of co-occurrence of nouns x and y. The frequency of co-occurrence may be obtained by counting frequency of co-occurrence of nouns x and y in a document, or by counting frequency of co-occurrence in one sentence.

DICE Coefficient

DICE coefficient is used for quantification of co-occurrence relation between two words. DICE coefficient DICE (x, y) for words x and y can be calculated by the following equation, where df(x) represents the number of documents in which the word x appears, df(y) represents the number of documents in which the word y appears, anti df(x, y) represents the frequency of co-occurrence of words x and y.

$$DICE(x, y) = 2 \times \frac{df(x, y)}{df(x) + df(y)}$$

Jaccard Coefficient

Jaccard Coefficient is a measure indicating degree of similarity between two sets. For example, degree of similarity between nouns x and y can be represented as Jaccard Coefficient J(S(x), S(y)) between sets S(x) and S(y), where a set of documents or sentences in which noun x appears is denoted as S(x) and a set of documents or sentences in which noun y appears denoted as S(y).

$$J(S(x), S(y)) = \frac{|S(x) \cap S(y)|}{|S(x) \cup S(y)|}$$

χ Square

χ square is used in χ square test and it is also applicable to examine whether or not two words are related to each other. For example, χ square related to two words x and y can be calculated in accordance with the following equation by forming 2×2 cross table in which presence/absence of word x is labeled on the ordinate and presence/absence of word y is labeled on the abscissa based on whether or not words x and y appear in a large number of documents.

$$\chi^2(x, y) = \sum_{e_x \in \{0,1\}} \sum_{e_y \in \{0,1\}} \frac{(Ne_x e_y - Ee_x e_y)^2}{Ee_x e_y}$$

Here, $N_{11}$ represents the number of documents in Which words x and y both appear; $N_{10}$ represents the number of documents in which word x appears but word y does not appear, $N_{01}$ represents the number of documents in which word x does not appear but word y appears; and $N_{00}$ represents the number of documents in which both words x and y do not appear, $E_{11}$ represents degree of expectation of the number of documents $N_{11}$ when words x and y are assumed to be independent, and $E_{10}$, $E_{01}$ and $E_{00}$ are degrees of expectations corresponding to $N_{10}$, $N_{01}$ and $N_{00}$, respectively. If words x and v are less related, the χ square increases, and if these words are more related, the χ square becomes smaller.

<<Appearance Order Verifying Filter 554>>

Appearance order verifying filter 554 filters the causality hypotheses based on the order of appearance of the elements of causality hypotheses. For example, a method ma be possible in which, if a noun of a result phrase of a certain causality hypothesis appears before a noun in a cause phrase in a certain sentence in WEB archive 44, the causality is excluded.

Consider an example. There is a causality hypothesis "energy production is increased→circulatory system is suppressed" (in which the noun pair is "energy production" and "circulatory system"). If there is a description "glucocorticoid activates the circulatory system, increases energy production and suppresses unnecessary synthesizing system" in a document in Web archive 44, the causality is excluded. The reason for this is that there is a sentence in which the original nouns "energy production" and "circulatory system" appear in the opposite order.

<<Noun Appearance Frequency Filter 556>>

Noun appearance frequency filter 556 excludes causality hypotheses including noun pairs that appear in many different causality hypotheses. Possible examples are as follows.

"global warming advances→inflicts damage"
"stock prices fall→cause damage"
"damage incurred→stop projects"

These examples include the noun "damage", which appears in a large number. Therefore, these causality relations are all excluded. Such a noun that appears in various and many causality relations has inherently vague meaning and, therefore, it is better not to adopt it as causality.

For this purpose, causality hypothesis filter 418 includes noun appearance frequency calculator 558 and noun appearance frequency DB 560.

<<Noun Appearance Frequency Calculator 558>>

Noun appearance frequency calculator 558 calculates, of each of the nouns in the cause phrases and the result phrases of causality hypothesis phrase pairs stored in causality hypothesis DB 416, frequency of appearance in all causality hypotheses in causality hypothesis DB 416 in advance.

<<Noun Appearance Frequency DB 560>>

Noun appearance frequency DB 560 is for storing the frequency of appearance of each noun calculated by noun appearance frequency calculator 558. When a noun is given, noun appearance frequency DB 560 can return its frequency of appearance. Using this functionality, noun appearance frequency filter 556 filters the causality hypotheses.

<<Word-Excluding Filter 566>>

Word-excluding filter 566 excludes a causality hypothesis including a noun modified by a modifier phrase (referred to as "modified noun") such as "B" in "B of A" in WEB archive 44. The reason for this is as follows. If a modifier phrase is added to a noun, the meaning of corresponding phrase is mainly expressed by the modifier phrase, and the meaning of modified noun itself is not very specific but vague. In other words, it is not appropriate to adopt a causality hypothesis including a modified noun as causality. The modified noun found in this manner is referred to as an excluded word here. For this purpose, causality hypothesis filter 418 includes modified-noun extractor 562 and excluded-word DB 564.

<<Modified-Noun Extractor 562>>

Modified-noun extractor 562 extracts a set of modified nouns from WEB archive 44. This process is possible at any time.

<<Excluded-Word DB 564>>

Excluded-word DB 564 stores the modified nouns extracted by modified-noun extractor 562, as excluded words. Excluded-word DB 564 has a function of outputting information indicating whether or not the noun is an excluded word in response to a noun received. Typically, when a noun is given from word-excluding filter 566, excluded-word DB 564 returns to word-excluding filter 566 information indicating whether or not the noun is stored as an excluded word. If the noun is stored in excluded-word DB 564, word-excluding filter 566 excludes the causality hypothesis including the word. If not, the causality hypothesis is adopted and stored in causality phrase pair DB 70.

<Social Scenario Generator 72>

Figure 17:
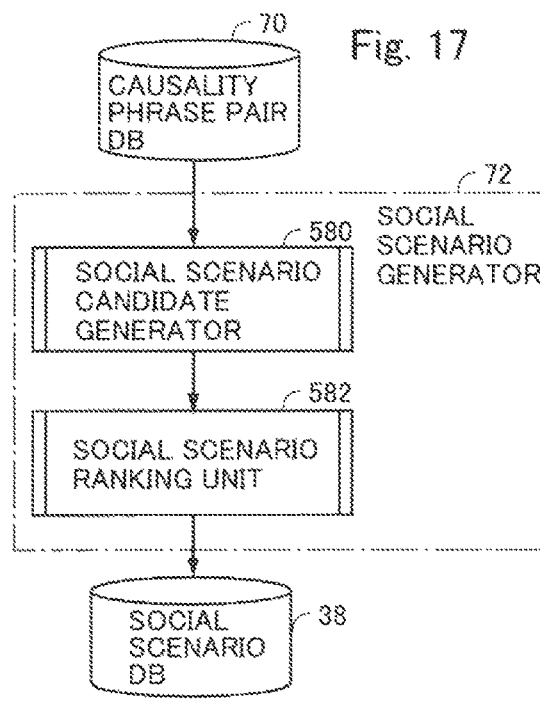
FIG. 17 is a block diagram showing a functional structure of a social scenario generator shown in FIG. 1.

Referring to FIG. 17, social scenario generator 72 includes: a social scenario candidate generator 580 generating a social scenario candidate by linking causality phrase pairs stored in causality phrase pair DB 70; and a social scenario ranking unit 582 ranking social scenario candidates generated by social scenario candidate generator 580 in accordance with a prescribed score and outputting the results to social scenario DB 38. When there are a large number of causality phrase pairs, it is possible to obtain a long sequence of causality phrases linked by cause and result relations by linking appropriate ones thereof in an appropriate order. In the present embodiment, such a sequence of phrases will be referred to as a social scenario. The social scenario possibly connects a number of causality relations having relations that will not be conceived by humans, and may result in unexpected result phrases. For this purpose, however, it is necessary to select and link pairs of appropriate causality phrase pairs to be linked. Social scenario candidate generator 580 serves for this purpose. It is noted, however, that even the social scenarios generated in this manner may include those having appropriate relations and not-so-appropriate relations between the cause and result. Social scenario ranking unit 582 adds to each social scenario a score indicating appropriateness of the social scenario and to enable distinction between social scenarios having and not having high scores.

Consider linking of causality relations such as described above. Simply, it is easy if a result phrase of a certain causality phrase pair is the same as a cause phrase of another causality phrase pair. Actually, however, there are such relations between phrases that allow linkage of two causality phrase pairs, even if character strings are different. Overlooking such relations would undesirably limit the scope of generated social scenarios. Therefore, between a result phrase of a certain causality phrase pair and a cause phrase of another causality phrase pair that can form a joining portion of two causality phrase pairs, it is important to find such a relation that allow interpretation of both phrases as substantially the same, even if the two phrases have different character strings.

In the present embodiment, when the two are interpreted as substantially the same even if they do not have the same character strings, we say the two have causal consistency. The causal consistency is a new idea encompassing paraphrasing and entailment, which cannot be realized by the conventional natural language processing techniques alone. Social scenario candidate generator 580 evaluates, for two causality phrase pairs, causal consistency between the result phrase of one and the cause phrase of the other, and thereby links causality phrase pairs having causal consistency.

<Social Scenario Candidate Generator 580>

Figure 18:
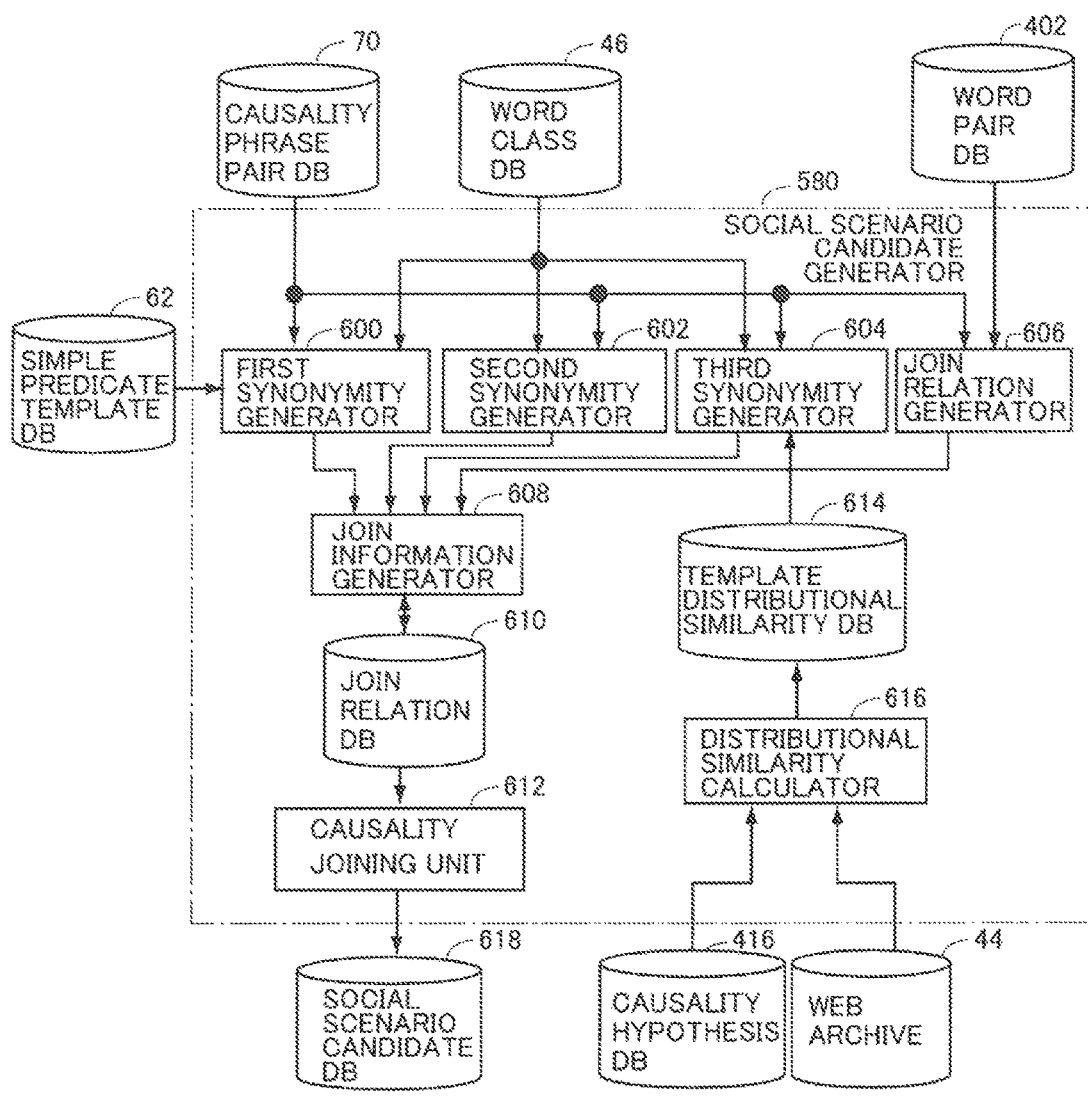
FIG. 18 is a block diagram showing a functional structure of a social scenario candidate generator shown in FIG. 17.

Referring to FIG. 18, social scenario candidate generator 580 includes a first synonymity generator 600 finding, with reference to simple predicate template DB 62, causality phrase pair DB 70 and word class DB 46, phrases in causality phrase pair DB 70 having the same noun and having the simple predicate templates of the same polarity as synonymous phrases having causal consistency, and generating and outputting a piece of information representing the combination thereof (link information). The link information is a pair of identifiers of the two phrases determined to have the causal consistency.

Social scenario candidate generator 580 further includes: a second synonymity generator 602, finding, with reference to word class DB 46 and causality phrase pair DB 70, phrases in causality phrase pair DB 70 having the same noun and having the same sentiment polarity of the entire phrases as synonymous phrases having causal consistency, and generating and outputting the link information thereof; and a third synonymity generator 604, selecting, with reference to word class DB 46, a pair of phrases in causality phrase pair DB 70 having the same noun and having templates of similar contexts of appearance in a large amount of documents as synonymous phrases having causal consistency, and generating and outputting the link information thereof.

Social scenario candidate generator 580 further includes a template distributional similarity DB 614 storing in advance distribution similarities of templates used for the determination by the third synonymity generator 604. Template distributional similarity DB 614 may be prepared by any method. In the present embodiment, social scenario candidate generator 580 includes, in order to prepare template distributional similarity DB 614 beforehand, a distributional similarity calculator 616 calculating distributional similarity of each template in WEB archive 44 with reference to WEB archive 44 and complex predicate template DB 66 and storing the results in template distributional similarity DB 614.

The method of joining causality phrase pairs is not limited to the above-described use of causal consistency between two phrases. For example, there is a relation bridging a certain phrase to another phrase semantically, though there is no causal consistency between the two phrases. Assume, for example, that one phrase is "sunlight is blocked" and the other phrase is "photosynthesis is prevented." Here, it is possible to consider a phrase "sunlight is necessary for photosynthesis" as a link bridging the two. Then, using this phrase as an intermediary, a causality phrase pair having a result phrase of "sunlight is blocked" and a causality phrase pair having a cause phrase of "photosynthesis is prevented" may be linked. In this case, however, the newly inserted phrase "sunlight is necessary for photosynthesis" need not be inserted to the social scenario, since it is sufficient to know the start and end of the causality. Therefore, when the causality phrase pairs are to be linked in this manner also, what is necessary is to store the pair of phrase identifiers. In this situation, linkage needs order and, therefore, it is necessary to store ordered phrase identifier pairs.

A join relation generator 606 shown in FIG. 18 generates an ordered phrase identifier pair through the process such as described above. The problem is how to find the relation between the phrases that form such a link. Here, this problem is solved by focusing on the semantic relation between nouns included in two phrases. Specifically, when a specific relation holds between two nouns, a process of making a link between corresponding phrases is done, assuming that the relation holds therebetween. The relation here may be the relations between words extracted by word pair extractor 406 shown in FIG. 11 and forming word pairs recorded in word pair DB 402. Namely, the semantic relations represented by the semantic relation patterns recorded in semantic relation pattern DB 400 may be used. Word pair extractor 406 extracts word pairs having the necessity relation, material relation, use relation, prevention relation and causality, and records such word pairs in word pair DB 402 and stores patterns representing such relations in semantic relation pattern DB 400, respectively. Therefore, by using these, whether or not a specific relation holds between phrases is examined, and if it holds, the phrases are connected, considering that the two have causality. When a certain semantic relation holds as described above between a result phrase of a certain causality phrase pair and a cause phrase of another causality phrase pair and hence a causality is found between these two, the relation is referred to as "link based on semantic relation."

If a noun word included in a certain phrase and a noun word included in another phrase are stored in word pair DB 402 as a word pair, join relation generator 606 determines that the relation represented by the noun pair holds between the two. Typically, the causality here is one-directional and, therefore, join relation generator 606 generates an ordered identifier pair including identifiers of both phrases and output it to join information generator 608.

Social scenario candidate generator 580 further includes: a join information generator 608, using identifier pairs of phrases output from the first, second and third synonymity generators 600, 602 and 604 and ordered identifier pairs output from join relation generator 606, generating, for each causality phrase pair, a tree consisting of a set formed of a certain causality phrase pair and another causality phrase pair connected by causality to the certain causality phrase pair; and a join relation DB 610 storing the trees output from join information generator 608. Using the trees, it becomes possible to link one causality phrase pair to another causality phrase pair and further to a still another causality phrase pair.

Social scenario candidate generator 580 further includes: a causality joining unit 612 successively following up and joining causality phrase pairs using an arbitrary causality phrase pair stored in causality phrase pair DB 70 as a start point, using the join information stored in causality phrase pair DB 70 and thereby generating social scenario candidates; and a social scenario candidate DB 618 storing social scenario candidates generated by causality joining unit 612.

Causality joining unit 612 may form, when an upper limit of the number of causality relations to be joined is given, all possible social scenarios within that limit; when a certain causality phrase pair is designated, it may present a plurality of causality phrase pairs that follow the certain causality pair, and when any of the causality phrase pair is further designated therefrom, it may present a plurality of causality phrase pairs that follow the newly designated causality phrase pair, and it may generate a social scenario by repeating such a process in an interactive manner.

<<Social Scenario Ranking Unit 582>>

Figure 19:
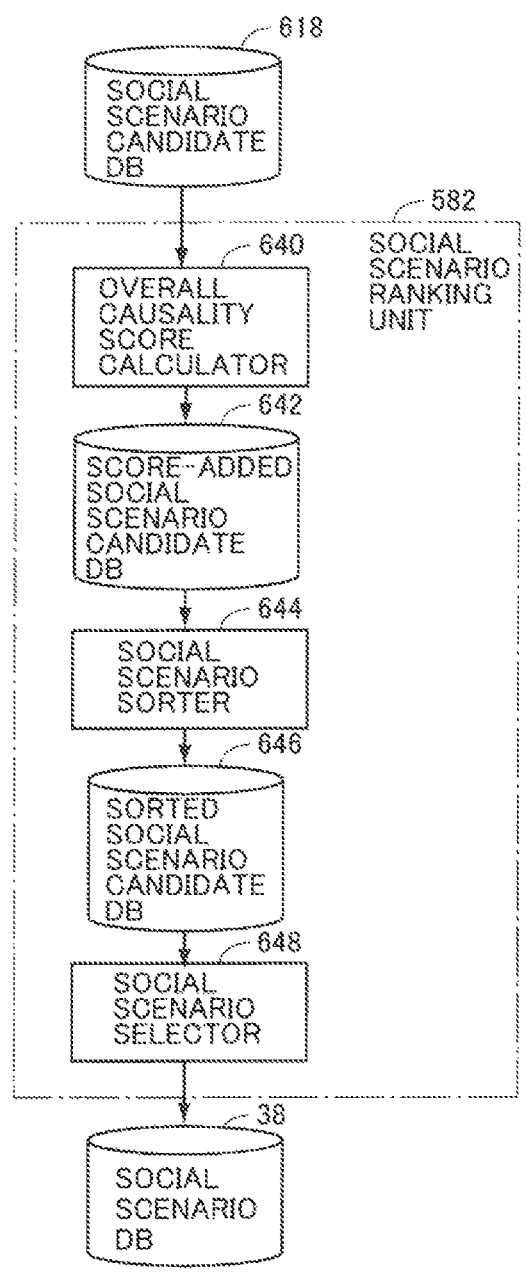
FIG. 19 is a block diagram showing a functional structure of a social scenario ranking unit shown in FIG. 17.

Referring to FIG. 19, social scenario ranking unit 582 in accordance with the present embodiment (see FIG. 17) adds, to every social scenario stored in social scenario candidate DB 618, a score based on strength of causality of all the causality phrase pairs forming the scenario. In the present embodiment, social scenario ranking unit 582 adds a score of the causality strength described with reference to FIG. 12, to each of the causality phrase pairs included in a certain social scenario candidate. Further, social scenario ranking unit 582 adds a score to the social scenario candidate, by multiplying all the scores.

Specifically, social scenario ranking unit 582 includes: an overall causality score calculator 640, calculating, for each of the social scenario candidates stored in social scenario candidate DB 618, the causality strength thereof with reference to the causality strength scores added to the causality phrase pairs, multiplying these and thus adding a score to each candidate and outputting score-added candidates; a score-added social scenario candidate DB 642 storing social scenario candidates having scores output from overall causality score calculator 640; a social scenario sorter 644 sorting, in a descending order of the scores, the score-added social scenario candidates stored in score-added social scenario candidate DB 642; a sorted social scenario candidate DB 646 storing sorted social scenario candidates; and a social scenario selector 648 selecting, from the social scenario candidates stored in sorted social scenario candidate DB 646, those having scores equal to or higher than a threshold value and outputting these to social scenario DB 38.

[Operation]

Social scenario generating system 30 in accordance with the first embodiment operates in the following manner. Referring to FIG. 1, a small number of seed templates are stored in seed template DB 32. Determination as to whether each seed template is excitatory or not is made beforehand, and a tag indicating the determination is added to each template. On the other hand, in conjunction DB 34, and/thus-type conjunctions and but-type conjunctions of Japanese are stored and their types are also recorded. Contradictory expression dictionary 422 (FIGS. 11, 13) stores a large number of pairs formed of mutually contradictory expressions collected beforehand.

<Preparation Step>

For the trouble-noun polarity determining dictionary 266 shown in FIG. 7, patterns necessary for determining polarities of trouble-nouns are collected in advance with reference to WEB archive 44, and stored with their polarities.

Further, semantic relation pattern DB 400 and word pair DB 402 shown in FIG. 11 are also prepared. For this purpose, a number of seed patterns representing prescribed relations between words are stored in advance in seed pattern DB 404. Word class DB 46 is also prepared in advance. Seed pattern DB 404 and word class DB 46 may be prepared in accordance with any method.

In order to prepare semantic relation pattern DB 400 and word pair DB 402, word pair extractor 406 operates in the following manner. Referring to FIG. 14, pattern extractor 490 of word pair extractor 406 extracts various relations between words from WEB archive 44, as shown in FIG. 14. For this purpose, pattern extractor 490 extracts a large number of phrases each including two nouns from WEB archive 44. By replacing nouns included in these phrases with variables of corresponding classes read from word class DB 46, a large number of patterns are generated. These patterns are further classified, and the classified unique patterns are stored in pattern DB 492.

Word pair candidate obtaining unit 494 obtains word pair candidates each including a word pair appearing in a form matching any of the seed patterns from WEB archive 44 while referring to seed pattern DB 404, and stores obtained candidates in word pair candidate DB 496. An identifier is added to each of these word pairs identifying the seed pattern group to which the corresponding seed pattern belongs (or the identifier of the seed pattern itself).

On the other hand, class pair goodness of fit calculator 502 calculates class pair goodness of fit between arbitrary two word classes based on the word pairs stored in word pair candidate DB 496, and stores the results in class pair goodness of fit DB 504. Pattern similarity calculator 506 calculates pattern similarity for each combination of a pattern stored in pattern DB 492 and a seed pattern group stored in seed pattern DB 404, and stores the calculated value in pattern similarity DB 508 combination by combination. Association information calculator 510 calculates association information between a word pair and each pattern stored in pattern DB 492 and between the word pair and each seed pattern group stored in seed pattern DB 404, and stores the information in association information DB 512 for each combination of a word pair and a seed pattern or the like. Excluded class pair specifying unit 514 determines, for each word class pair stored in word class DB 46, whether the difference in word appearance frequency belonging to each class in WEB archive 44 is equal to or higher than a threshold value. Further, excluded class pair specifying unit 514 specifies class pairs having the difference equal to or higher than the threshold value and stores these in excluded class pair DB 516.

Word pair scorer 498 calculates, using the class pair goodness of fit stored in class pair goodness of fit DB 504, the pattern similarity stored in pattern similarity DB 508 and the association information stored in association information DB 512, the above-described score Score for each word pair stored in word pair candidate DB 496.

Word pair selector 500 selects a prescribed number of top-scored word pairs from the word pairs scored by word pair scorer 498, and stores the selected pairs in word pair DB 402. At this time, each word pair has added thereto an identifier of that seed pattern group stored in seed pattern DB 404 which includes a seed pattern that matched the word pair when it was obtained.

Rather than performing the above-described process only once, it may be iterated while adding newly obtained seed patterns to seed pattern DB 404 so that the number and accuracy of word pair DB 402 can be increased. For this purpose, pattern merger 518 adds a pattern having a degree of similarity with a certain seed pattern group higher than a threshold value to the seed pattern group of seed pattern DB 404, using the similarities of patterns and seed pattern groups stored in pattern similarity DB 508. When seed pattern DB 404 is updated in this manner, the above-described process is repeated using the thus updated seed pattern group. By repeating this process until a prescribed end condition is satisfied, a highly accurate word pair DB 402 and seed pattern groups classified in accordance with various semantic relations are obtained. Typically, the number of seed patterns significantly increases from those prepared at the start. As a result, it becomes possible to determine, for a wide range of expressions, the semantic relations each expression matches.

<Collection of Simple Predicate Template>

Simple predicate template collector 60 builds simple predicate template DB 62 through the following operation. Referring to FIG. 2, initial template pair generator 90 generates all possible combinations of all seed templates stored in seed template DB 32 and conjunctions and the like stored in conjunction DB 34, and stores all these combinations as template pairs in initial template pair DB 92. Noun pair collector 94 collects, for each of the template pairs stored in initial template pair DB 92, noun pairs co-occurring with the template pair from WEB archive 44, and stores them in noun pair DB 96. For each of these noun pairs, noun pair polarity determiner 98 determines whether the noun pair has a positive relation or negative relation in accordance with whether the template in the template pair co-occurring with the noun pair is excitatory/inhibitory and in accordance with the type of the junction or the like from conjunction DB 34 connecting the template pair, and adds a polarity tag to each noun pair.

Thereafter, template pair collector 100 collects, for each noun pair, template pairs co-occurring with the noun pair from WEB archive 44, and stores them in template pair DB 102.

For each of the template pairs, template excitation match determiner 104 determines whether the excitatory/inhibitory class of templates forming the template pair is the same or opposite to each other, in accordance with whether the co-occurring noun pair is positive/negative and in accordance with the type (and/thus-type or but-type) of conjunctions and the like. Here, if templates in a certain template pair belong to the same excitatory/inhibitory class in some occasions and belong to opposite excitatory/inhibitory classes at other occasions, the number of appearances of those belonging to the same class is compared with that of those belonging to the opposite classes, and the excitatory/inhibitory class of templates is determined by the majority. Template excitation match determiner 104 adds a tag to each of the template pairs stored in template pair DB 102, the tag indicating whether the templates therein have the same or opposite excitatory/inhibitory class.

Template network builder 106 builds template network 140 (FIG. 3) based on the template pairs stored in template pair DB 102. If the network does not include nodes corresponding to two templates forming a template pair, template network builder 106 adds such nodes to the network, and if the link is not included, it also adds the link. Such a process is executed for every template pair, and thus the prototype of template network 140 is built. Further, for every pair of nodes not linked in the network, template network builder 106 determines whether or not a specific relation such as shown in Table 10 exists between the templates corresponding to the nodes, by looking up synonym/entailment dictionary 108, and if such a relation exists, provides a "SAME" link therebetween. Further, template network builder 106 assigns, to each link of the network thus built, the weight calculated in accordance with Equation (1). The template network 140 having links added in this manner is stored in template network DB 110.

Template excitation value calculator 112 executes the process shown in FIG. 6. Specifically, first, it assigns the excitation value of +1 or −1 to each seed template, in accordance with its excitatory/inhibitory class (step 240). Then, by executing the process of minimizing the value E(x, W) defined by Equation (2) as the amount similar to the electron spin energy (step 242), the excitation value of each template is estimated, and the excitation value is assigned to each template. The excitation value may be positive or negative. High excitation value template extractor 114 selects, from among the templates having their excitation values estimated in this manner, those having the excitation with absolute values higher than a prescribed threshold value, and using these templates, builds simple predicate template DB 62. Here, rather than selection using a threshold value, the templates may be ranked in accordance with the magnitude of absolute values of the excitation values.

End determiner 116 shown in FIG. 2 determines whether the prescribed end condition is satisfied, when simple predicate template DB 62 is built. The end condition may be that the number of iteration has reached a prescribed number, or that the number of templates has exceeded a prescribed number. If the end condition is satisfied, simple predicate template DB 62 is considered complete. If the end condition is not satisfied, seed template updater 118 updates seed template DB 32 using the templates contained in simple predicate template DB 62 as new seed templates. Since these seed templates have the excitation values calculated by the process described above, similar processes as described above are executed utilizing the excitation values.

The above-described processes are repeated and if the end condition is satisfied, simple predicate template DB 62 is complete. Then, complex predicate template collector 64 executes the process of acquiring complex predicate templates from the Internet 40, using simple predicate template DB 62.

<Collection of Complex Predicate Template>

Specifically, complex predicate template candidate extractor 268 of complex predicate template collector 64 builds sahen-noun template candidate DB 270, quantifier noun template candidate DB 272 and trouble-noun template candidate DB 274 (FIG. 7) in the following manner. Referring to FIG. 8, for all sentences in WEB archive 44 (step 300), complex predicate template candidate extractor 268 executes morphological analysis (step 302) and dependency analysis (step 304), and generates dependency trees. Thereafter, the following process is executed on each node (step 306).

First, whether the word of the node is a noun as an object or not is determined (step 308). For this determination, object noun dictionary 260 shown in FIG. 7 is used. If the word is not an object noun (NO at step 308), the process proceeds to the next node. If the word is an object noun (YES at step 308), whether or not its destination of dependency is any simple predicate template is determined (step 310). If it is not a simple predicate template (NO at step 310), the process proceeds to the next node. If it is a simple predicate template (YES at step 310), a particle at the end of the node that is the dependency source of the node under processing, a morpheme of the node under processing and the simple predicate template that is the dependency destination are joined to generate a complex predicate template candidate (step 312), and in accordance with the type of the noun as the object in the complex predicate template, the candidate is classified and stored in sahen-noun template candidate DB 270, quantifier noun template candidate DB 272, or trouble-noun template candidate DB 274 (step 314) shown in FIG. 7. When the process up to this step is completed, the process proceeds to the next node of the dependency tree.

After simple predicate template DB 62 is obtained, sahen-noun polarity determiner 264 shown in FIG. 7 builds sahen-noun polarity dictionary 262 in the following manner, before the addition of polarity to sahen-noun templates by sahen-noun polarity adder 276. Specifically, sahen-noun polarity determiner 264 executes the following process on each sahen-noun template.

Specifically, sahen-noun polarity determiner 264 specifies a sahen-verb corresponding to the sahen-noun of the sahen-noun template candidate, and searches simple predicate template DB 62 for simple predicate templates including the sahen-verb. If all the searched out simple predicate templates have the same polarity, sahen-noun polarity determiner 264 determines that the sahen-noun template being processed has that polarity, and records a combination of the sahen-noun and the polarity as an index in sahen-noun polarity dictionary 262.

If the searched out simple predicate templates do not have the same polarity, or typically when the polarity changes in accordance with the particle at the head of simple predicate template, it is impossible to determine the polarity of complex predicate template in a simple manner. Therefore, in such a situation, sahen-noun polarity determiner 264 executes the following process.

Specifically, sahen-noun polarity determiner 264 specifies all nouns accompanying a case particle " ノ (no)" in WEB archive 44 that depend on the sahen-noun of sahen-noun template candidate. Frequency of case particles accompanying each specified noun co-occurring with the sahen-verb described above is examined. From the results of examination, sahen-noun polarity determiner 264 specifies the simple predicate template consisting of the particle having the highest frequency and the sahen-verb mentioned above, and the polarity of this simple predicate template is regarded as polarity of the sahen-noun template candidate of the combination with the noun depending with the case particle " ノ (no)". This process is executed on every combination of a sahen-noun template candidate and a noun depending on it with case particle " ノ (no)", whereby the polarity of each sahen-noun template candidate in a combination with each noun can be specified.

Sahen-noun polarity determiner 264 stores this information in sahen-noun polarity dictionary 262. Therefore, when a sahen-noun template is given and the polarity of the simple predicate template including the sahen-verb is stored as a single polarity in sahen-noun polarity dictionary 262, the polarity is used as the polarity of the sahen-noun template. Otherwise, if the noun accompanying the case particle " ノ (no)" depending on the sahen-noun template is known, the polarity of the sahen-noun template can be determined by looking up the sahen-noun polarity dictionary 262. In other words, polarities of some of the sahen-noun templates cannot be determined unless the preceding noun with the case particle " ノ (no)" is known, and the polarities depend on contexts.

Referring to FIG. 9, sahen-noun polarity adder 276 shown in FIG. 7 executes the following process on each of the sahen-noun template candidates stored in sahen-noun template candidate DB 270 (step 340). Specifically, sahen-noun polarity adder 276 determines, with reference to sahen-noun polarity dictionary 262, if there is only one index of the sahen-noun included in each sahen-noun template candidate (step 342). If there is only one index (YES at step 342), the corresponding polarity is added as the polarity to the sahen-noun template candidate under processing (step 344), and the process proceeds to the next sahen-noun template candidate. If the determination at step 342 is in the negative, a value indicating that the polarity is context-dependent is added as the polarity to the sahen-noun template candidate, and the process proceeds to the next sahen-noun template candidate. When this process ends on all sahen-noun templates, the process returns to the parent routine.

Quantifier noun polarity adder 278 shown in FIG. 7 adds excitatory polarity to the quantifier nouns in quantifier noun templates stored in quantifier noun template candidate storage, and applies the results to complex predicate template polarity calculator 282.

Referring to FIG. 10, trouble-noun polarity adder 280 shown in FIG. 7 executes the following process to each of the trouble-noun template candidates stored in trouble-noun template candidate DB 274 (step 370). At step 370, first, it determines if there is only one index of the trouble-noun, by looking up trouble-noun polarity determining dictionary 266 (step 372). If the determination is YES, the polarity is added as the polarity of the trouble-noun (step 374), the result is output to complex predicate template polarity calculator 282, and the process proceeds to the next trouble-noun template candidate. If the determination at step 372 is NO, a value indicating that the polarity is context-dependent is added as the polarity to the trouble-noun (step 376), the result is output to complex predicate template polarity calculator 282, and the process proceeds to the next trouble-noun template candidate. When this process ends on all trouble-noun template candidates, the process ends.

Complex predicate template polarity calculator 282 calculates the polarity of complex predicate template by multiplying the polarity value added to the noun (sahen-noun, quantifier noun and trouble-noun) of each complex predicate template candidate and the polarity of the simple predicate template portion of each candidate, and stores the polarity-added complex predicate template in complex predicate template DB 66. At this time, if the polarity of sahen-noun in a sahen-noun template candidate or the polarity of trouble-noun in a trouble-noun template candidate is context-dependent, complex predicate template polarity calculator 282 does not calculate the polarity of the complex predicate template in the above described manner but adds a value indicating that the polarity is context-dependent, to the complex predicate template.

<Collection of Causality Phrase Pairs>

After the complex predicate template DB 66 is generated, causality phrase pair collector 68 shown in FIG. 1 builds causality phrase pair DB 70 in the following manner. Before this process, semantic relation pattern DB 400, word pair DB 402 and noun polarity dictionary 420 (FIG. 11) must be ready.

Causality seed pair collector 408 shown in FIG. 11 collects causality seed pairs in the following manner. Referring to FIG. 12, first, at step 440, a predicate template pair connected to each other by, for example, an and/thus-type conjunction in one sentence and co-occurring in WEB archive 44 and a noun pair comprised of nouns depending on the predicate template pair are collected as causality seed pair candidate, from WEB archive 44. Here, the predicate templates include both the simple predicate templates stored in simple predicate template DB 62 and complex predicate template pairs stored in complex predicate template DB 66. Each simple predicate template has its polarity added. Of the complex predicate templates, some including quantifier nouns, some including sahen-nouns and some including trouble-nouns similarly have their polarities added. Of the complex predicate templates, some of the sahen-noun templates and trouble-noun templates may have values indicating that the noun polarity is context-dependent. In such a case, causality seed pair collector 408 searches sahen-noun polarity dictionary 262, for a combination of a noun depending on such a template accompanying a case particle "ノ (no)" and a sahen-noun in the complex predicate template. The polarity of sahen-noun for this combination is obtained from sahen-noun polarity dictionary 262 and it is multiplied by the polarity of simple predicate template in the complex predicate template, and thus, the polarity of complex predicate template is determined.

Thereafter, on every candidate obtained in this manner, the following step 442 is executed. Specifically, at step 442, whether the relation between the noun pair in the candidate under processing is positive or not is determined (step 444). If the determination is in the positive, whether the excitatory/inhibitory class of the template pair of the candidate is the same or opposite is determined (step 446). If the determination at step 446 is in the negative, the candidate is discarded. Namely, nothing will be done with this candidate. If the determination at step 446 is in the the candidate is added to a group of causality seed pairs (step 448). Then, the process proceeds to the next candidate.

On the other hand, if the determination at step 444 is in the negative, whether the excitatory/inhibitory classes of the predicate template pair of this candidate are opposite is determined at step 450. If the determination is in the negative, the candidate is discarded, if the determination is in the positive, the candidate is added to the group of causality seed pairs (step 448). Then the process proceeds to the next candidate.

When the process described above is completed for all causality seed pair candidates, for all causality seed pairs in the resulting group of causality seed pairs, the process of step 452 is executed. Specifically, at step 454, causality seed pair collector 408 calculates the causality strength score $C_s(p_1, p_2)$, in accordance with Equation (3) on each causality seed pair. Equation (3) is again given below.

$$C_s(p_1,p_2)=|s_1|\times|s_2|\times np\text{freq}(n_1,n_2) \quad (3)$$

where $p_1$, $p_2$ represent phrases constituting the causality seed pair, $s_1$ and $s_2$ represent excitation values of predicate templates forming phrases $p_1$ and $p_2$, respectively, $|s_1|$ represents absolute value of excitation value $s_1$, $n_1$ and $n_2$ represent nouns included in phrases $p_1$ and $p_2$, respectively, npfreq($n_1$, $n_2$) represents frequency of co-occurrence of $n_1$ and $n_2$ in one sentence with the template pair of the same excitatory/inhibitory class if $n_1$ and $n_2$ have, the positive relation, and frequency of co-occurrence of $n_1$ and $n_2$ in one sentence with the template pair of the different excitatory/inhibitory class if $n_1$ and $n_2$ have the negative relation.

After the score of causality strength is calculated for every causality seed pair in this manner, at step 456, the causality seed pairs are output with the scores to causality seed pair DB 410.

By executing such a process, a huge number of phrase pairs representing causality including simple predicate templates or complex predicate templates can automatically be collected from WEB archive 44. As described above, Equation (4) may be used in place of Equation (3).

<<Generation of Causality Hypotheses>>

Though a huge amount of causality seed pairs are stored in causality seed pair DB 410, the pairs do not exhaustively cover all possible causality relations. Therefore, it is necessary to generate a larger number of causality hypotheses in a reasonable scope from these causality seed pairs and thereby to enlarge the scope covered by the eventually obtained social scenarios. For this purpose, causality hypothesis generator 412 shown in FIG. 11 further generates a large number of causality hypotheses in the following manner from the causality seed pairs stored in causality seed pair DB 410 and stores the generated hypotheses in causality hypothesis DB 416. In the present embodiment, before this process, semantic relation pattern DB 400, word pair DB 402 and contradictory expression dictionary 422 storing predicate template pairs containing mutually contradictory expressions must be ready, as already described above.

Semantic relation pattern DB 400 stores patterns in which word classes having a specific semantic relation with each other co-occur, as a group of semantic patterns for each semantic relation. Word pair DB 402 stores word pairs having specific semantic relations matching the patterns stored in semantic relation pattern DB 400. To each word pair stored in word pair DB 402, an identifier is added, identifying that pattern group among the groups of semantic relation patterns stored in semantic relation pattern DB 400 to which the word pair matches.

When contradictory expressions are not used for generating a causality hypothesis, contradictory expression dictionary 422 is unnecessary.

Referring to FIGS. 13 and 15, semantic relation pattern matching unit 470 in causality hypothesis generator 412 reads, for each causality seed pair stored in causality seed pair DB 410, a word class or word classes to which the noun pair in the phrase pair forming the seed pair belong from word class DB 46, and performs the following process (step 520 of FIG. 15). Specifically, semantic relation pattern matching unit 470 determines to which semantic relation pattern stored in semantic relation pattern DB 400 the read word class pair matches (step 522 of FIG. 15), and applies the identifier of the semantic relation pattern group to which the matched semantic relation pattern belongs, to word pair replacing unit 472, together with the causality seed pair. If there is no matching pattern, the process of template replacing unit 476 shown in FIG. 13 is started to generate a new causality hypothesis by rewriting the causality seed pair using a contradictory expression. The operation of template replacing unit 476 will be described later.

If there is a matching semantic pattern, word pair replacing unit 472 executes the following process on all matching patterns (step 524 of FIG. 15). Specifically, all word pairs having the identifier of the group of semantic relation patterns to which the matching semantic pattern belongs are read from word pair DB 402 (step 526 of FIG. 15). Using each of the read word pair, the following process is executed (step 528 of FIG. 15). First, the noun pair of both the cause phrase and the result phrase forming the causality seed pair is replaced by the read word pair (step 530 of FIG. 15).

Score calculator 474 calculates causality strength score of each causality hypothesis by the same method as used at step 454 of FIG. 12 (step 532 of FIG. 15), and after adding the score, outputs the causality hypothesis to causality hypothesis DB 416 (step 534 of FIG. 15). The above-described process is executed on all the word pairs read at step 526. When the above-described process is completed, the process by template replacing unit 476 starts (step 536).

Template replacing unit 476 reads, from contradictory expression dictionary 422, all contradictory expressions of cause and result phrases forming the causality seed pair under processing (step 536 of FIG. 15). Further, template replacing unit 476 executes the process of replacing the cause phrase and the result phrase of causality seed pair under processing with contradictory expressions thereof, using all combinations of contradictory expressions of the cause phrase and contradictory expressions of the result phrase, and thereby generates new causality hypotheses (step 538 of FIG. 15), and applies the results to score calculator 474. Score calculator 474 calculates the causality strength score of each causality hypothesis by the same method as used at step 454 of FIG. 12 (step 540 of FIG. 15), and outputs the causality hypotheses with their causality strength scores added to causality hypothesis DB 416 (step 542 of FIG. 15), and the process proceeds to the next causality seed pair.

As the causality hypothesis generator 412 executes the above-described process on all the causality seed pairs, a large number of new score-added causality hypotheses are generated based on the causality seed pair and added to causality hypothesis DB 416.

<Filtering of Causality Hypotheses>

The causality hypotheses generated in this manner include many irrelevant ones. It is necessary to remove these incorrect causality hypotheses. Causality hypothesis filter 418 shown in FIG. 11 does this task.

Referring to FIG. 16, noun appearance frequency calculator 558 of causality hypothesis filter 418 calculates noun appearance frequency in causality hypotheses stored in causality hypothesis DB 416 noun by noun, and stores the results in noun appearance frequency DB 560. This is in preparation for the filtering process by noun appearance frequency filter 556. On the other hand, modified-noun extractor 562 extracts a noun modified by a modifier phrase in the form of "B of A" ("B" in the form of "B of A"), by searching WEB archive 44, and stores the results in excluded-word DB 564. This is in preparation for the filtering process by word-excluding filter 566.

In the present embodiment, causality hypothesis filter 418 first executes filtering by consistency verifying filter 550. Consistency verifying filter 550 determines, for each causality hypothesis, whether nouns $n_1$ and $n_2$ of a noun pair ($n_1$, $n_2$) of a phrase pair forming the hypothesis appear both in the cause phrase and the result phrase of other causality. If both nouns satisfy this condition, consistency verifying filter 550 discards this causality. Consistency verifying filter 550 applies other causality hypotheses to relevance filter 552.

In the present embodiment, relevance filter 552 calculates relevancy between noun pairs in a phrase pair forming a causality hypothesis, discards that causality hypothesis which has the relevancy lower than a threshold value, and applies other causality hypotheses to appearance order verifying filter 554. In the present embodiment, as the degree of relevance, Pointwise Mutual Information (PMI) of the noun pair is used. An index other than this may be used to represent the degree of relevance of the noun pair, as already described above.

Appearance order verifying filter 554 filters the causality hypotheses applied from relevance filter 552 based on the order of appearance of each of the phrase pairs forming the causality hypotheses, in WEB archive 44. Specifically, appearance order verifying filter 554 excludes a causality hypothesis if the phrase pair forming the causality hypothesis co-occur in a certain sentence in WEB archive 44 and the result phrase thereof appears prior to the cause phrase, and applies others to noun appearance frequency filter 556.

Noun appearance frequency filter 556 filters causality hypotheses applied from relevance filter 552 based on the frequency of appearance in WEB archive 44 of noun pair of the phrase pair forming each of the causality hypotheses. Specifically, if either of the pair of nouns of the phrase pair forming the causality of a causality hypothesis appears with a frequency exceeding a threshold value in causality hypotheses, noun appearance frequency filter 556 excludes that causality hypothesis. Noun appearance frequency filter 556 applies other causality hypotheses to word-excluding filter 566.

Word-excluding filter 566 determines, for each causality hypothesis applied from noun appearance frequency filter 556, whether it includes an excluded word stored in excluded-word DB 564, and excludes it if it includes the excluded word. Word-excluding filter 566 stores only the causality hypotheses not including any excluded word in causality phrase pair DB 70.

By the time filtering by causality hypothesis filter 418 is completed in this manner, causality phrase pair DB 70 have a huge number of causality phrase pairs stored therein.

It is noted that in the present embodiment, filtering operations by consistency verifying filter 550, relevance filter 552, appearance order verifying filter 554, noun appearance frequency filter 556 and word-excluding filter 566 are done in this order. The present invention, however, is not limited to such an embodiment. The order of processes may be changed, and some of the processes may be omitted. Alternatively, these processes may be executed in parallel, and scores matching respective objects may be added to each causality hypothesis, and whether any causality hypothesis is to be adopted or excluded may be determined in accordance with whether the product or sum of the scores exceeded a threshold value or not.

<Generation of Social Scenario>

Using the causality phrase pair DB 70 built by the process above, a large number of social scenarios can be generated. The social scenarios are generated by social scenario generator 72 shown in FIG. 1.

Referring to FIG. 17, when a phrase of a certain causality phrase pair and a phrase of another causality phrase pair stored in causality phrase pair DB 70 have a causal consistency or have a link based on semantic relation therebetween, social scenario candidate generator 580 generates a social scenario by linking a pair of causality phrases having the former in a result phrase and the latter in a cause phrase. By linking the social scenario generated in this manner further to other causality, a longer social scenario can be generated. In the present embodiment, social scenario candidate generator 580 uses causality relations of a constant number or smaller to be linked. If a social scenario is to be generated in an interactive manner, however, such a limit is unnecessary.

Referring to FIG. 18, first synonymity generator 600 of social scenario candidate generator 580 performs the following process on each of the causality phrase pair stored in causality phrase pair DB 70. Specifically, it specifies a noun in a result phrase (considered to be the first phrase) of the causality phrase pair. Of the causality phrase pairs stored in causality phrase pair DB 70, causality phrases having the same noun in the cause phrase are collected. Further, whether or not the polarity of the predicate template of the cause phrase (considered to be the second phrase) of each collected causality phrase pair matches the polarity of the predicate template belonging to the first phrase is determined. If the two match, the first and second phrases are determined to have the same meaning, and join information for the causality including the first phrase and the causality including the second phrase is generated and output to join information generator 608. Here, the join information is an ordered pair of the identifier of the causality phrase pair including the first phrase and the identifier of the causality phrase pair including the second phrase.

The second synonymity generator 602 determines causal consistency based on the sentiment polarity of each phrase and generates join information for linking two causality phrase pairs in accordance with the result, and output the information to join information generator 608. Specifically, the second synonymity generator 602 performs the following process in the result phrase of any causality phrase pair.

In other words, it collects a causality phrase pair having a cause phrase including the same noun as the noun in the result phrase of the causality phrase pair under processing (considered to be the first phrase). If the polarity of the entire phrase of the cause phrase (considered to be the second phrase) of the collected causality phrase pair is the same, the causality phrase pair having the first phrase as the result phrase and the causality phrase pair having the second phrase as the cause phrase are linked. For this purpose, an ordered pair formed by the identifier of the former and the identifier of the latter is given as join information to join information generator 608.

The third synonymity generator 604 determines causal consistency based on similarity of contexts in which phrases appear in a large amount of documents, and outputs join information between two causality phrase pairs. Specifically, the third synonymity generator 604 performs the following process. For this purpose, distribution similarity calculator 616 calculates distributional similarity in WEB archive 44 of each combination of phrases appearing in causality hypothesis DB 416 with reference to causality hypothesis DB 416 and WEB archive 44, and stores the results in template distributional similarity DB 614.

For each of the phrase pairs having the same noun and the same polarity of the entire phrase among the phrases of causality phrase pairs stored in causality phrase pair DB 70, the third synonymity generator 604 reads the distributional similarity from template distributional similarity DB 614. If the distributional similarity is smaller than a threshold value, the phrase pair is discarded. If the distributional similarity is equal to or higher than the threshold value, a causality phrase pair having one in the result phrase can be linked to another causality phrase pair having the other in a cause phrase. The third synonymity generator 604 applies an ordered pair of identifiers of such causality phrase pairs to join information generator 608.

Join relation generator 606 outputs join information for linking two causality phrase pairs by a link based on semantic relation. Specifically, join relation generator 606 executes the following process.

Join relation generator 606 determines whether or not an ordered word pair consisting of a noun (first noun) included in a result phrase of a certain causality phrase pair and a noun (second noun) included in a cause phrase of another causality phrase pair is stored in word pair DB 402. If this word pair is stored in word pair DB 402, it is considered that there is a link representing a semantic relation of the word pair between the result phrase including the first noun and the cause phrase including the second noun. Therefore, for such a pair of causality phrase pairs, join relation generator 606 generates join information from the one to the other, and outputs it to join information generator 608. The join information here is an ordered pair consisting of the identifier of the causality phrase pair having the result phrase including the first noun and the identifier of the causality phrase pair having the cause phrase including the second noun.

Based on the join information received from first, second and third synonymity generators 600, 602 and 604 as well as from join relation generator 606, join information generator 608 generates a tree having each causality phrase pair as a node of the first layer and having causality phrase pair that can be linked from the causality phrase pair of each node as a node of the second layer branching from the node, and the tree output from join information generator 608 is stored in join relation DB 610. By following from a node of the first layer of the tree to nodes of its second layer, and further by following a node of the first layer corresponding to the causality phrase pair represented by node of the second layer to the nodes of its second layer and repeating such a process, it is possible to generate a social scenario of any length from any of the causality phrase pairs.

Causality joining unit 612 generates a social scenario candidate of a prescribed length or shorter by the operation above, and outputs the result to social scenario candidate DB 618.

For each social scenario generated by social scenario candidate generator 580, social scenario ranking unit 582 shown in FIG. 17 calculates a score of the social scenario based on the strength of each causality forming the scenario, and selects and outputs to social scenario DB 38 those social scenarios which have the scores equal to or higher than a threshold value.

Referring to FIG. 19, specifically, social scenario ranking unit 582 executes the following process. First, social scenario ranking unit 582 multiplies the causality strength scores of individual causality relations forming the social scenario, and thereby calculates the score of the social scenario. The causality strength score here is the score calculated by score calculator 474 shown in FIG. 13 and at step 454 of FIG. 12. Here, between the two phrases joined by the processes of first, second and third synonymity generators 600, 602 and 604 as well as the join relation generator 606 all shown in FIG. 18, a certain constant is given. The constants may all have the same value, or may have different values. For example, causality strength score for a joining based on causal consistency may be higher than the score of a joining based on a semantic relation link. Overall causality score calculator 640 stores the social scenarios having the scores calculated for each social scenario in this manner in score-added social scenario candidate DB 642.

Social scenario sorter 644 sorts the social scenario candidates stored in score-added social scenario candidate DB 642 in the descending order of scores, and stores the sorted social scenario candidates in sorted social scenario candidate DB 646.

Social scenario selector 648 selects those of the social scenarios stored in sorted social scenario candidate DB 646 which have the scores equal to or higher than a threshold value and outputs those to social scenario DB 38.

In this manner, by this social scenario generating system 30, it is possible to generate a large number of social scenarios having not only the causality phrases existing in WEB archive 44 but also a huge number of phrases including semantic relation of word pairs linked by causality relations. The number can be enormous and, in addition, since the causality hypotheses generated based on the semantic relation of word pairs are used for the generation of social scenarios as described above, various and many social scenarios, including not only the phrases existing in WEB archive 44 but also phrases not actually found in WEB archive 44, can also be generated. As a result, a huge number of social scenarios can be provided, which can be referred to in decision making considering all risks and chances.

Second Embodiment

In the first embodiment above, the scores of social scenarios are calculated by multiplying the scores calculated for each causality phrase pair in the course of generating the social scenarios. The method of ranking social scenarios, however, is not limited to the method of the embodiment above. Various methods different from this one may be used. In the second embodiment described in the following, the score of a social scenario is calculated in accordance with how many documents on the Internet 40 carries the social scenario or part of it (referred to as "partial scenario") and to what degree the posted part and the partial scenario of the social scenario match each other.

Figure 20:
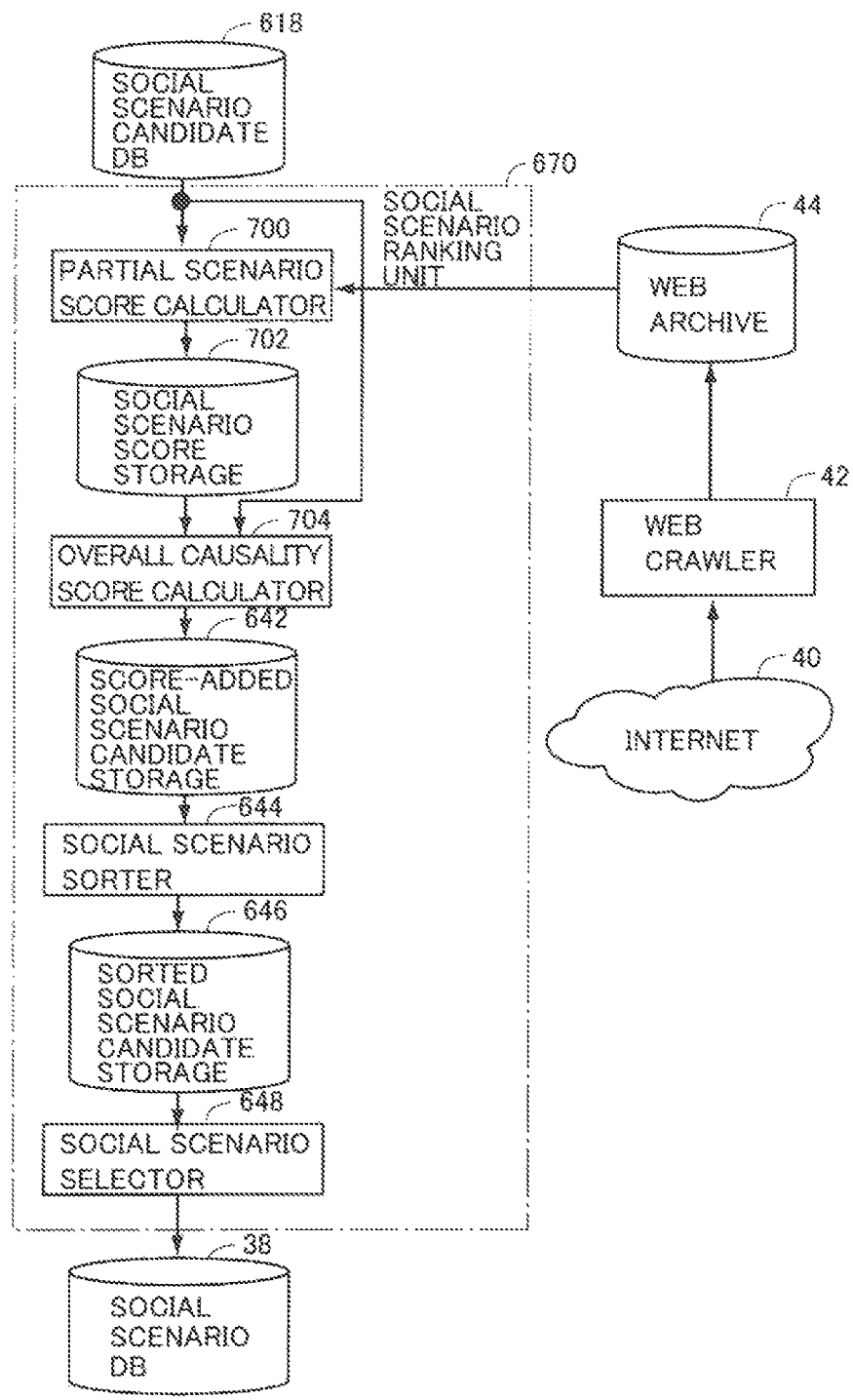
FIG. 20 is a block diagram showing a functional structure of the social scenario ranking unit in accordance with a second embodiment of the present invention.

A social scenario ranking unit 670 shown in FIG. 20 is for ranking the social scenarios in accordance with the process mentioned above. Social scenario ranking unit 670 may be used in place of social scenario ranking unit 582 shown in FIGS. 17 and 19.

Referring to FIG. 20, social scenario ranking unit 670 in accordance with the present embodiment includes: in place of overall causality score calculator 640 shown in FIG. 19, a partial scenario score calculator 700 calculating a score of a partial scenario based on how a partial scenario forming a social scenario is described in what document on the Internet 40; a partial scenario score storage 702 storing partial scenario scores calculated by partial scenario score calculator 700 in association with the partial scenario of each social scenario; and an overall causality score calculator 704 calculating, in response to completion of calculation of partial scenario score by partial scenario score calculator 700 for each social scenario candidate stored in social scenario candidate DB 618, a score of the social scenario as an increasing function of the partial scenarios such as multiplication or addition of such scores of partial scenarios, adding the calculated score to the social scenario and outputting the results to score-added social scenario candidate DB 642. In the present embodiment, not only the phrase exactly the same as the partial scenario forming the social scenario but also phrases including the noun replaced by other nouns of the same word class are regarded as the same phrase of the social scenario and searched in the Internet 40. Besides the noun in the phrase, in the present embodiment, phrases including predicate templates replaced by other templates having the same polarity are also regarded as the same phase of the social scenario and searched in the Internet 40.

Figure 21:
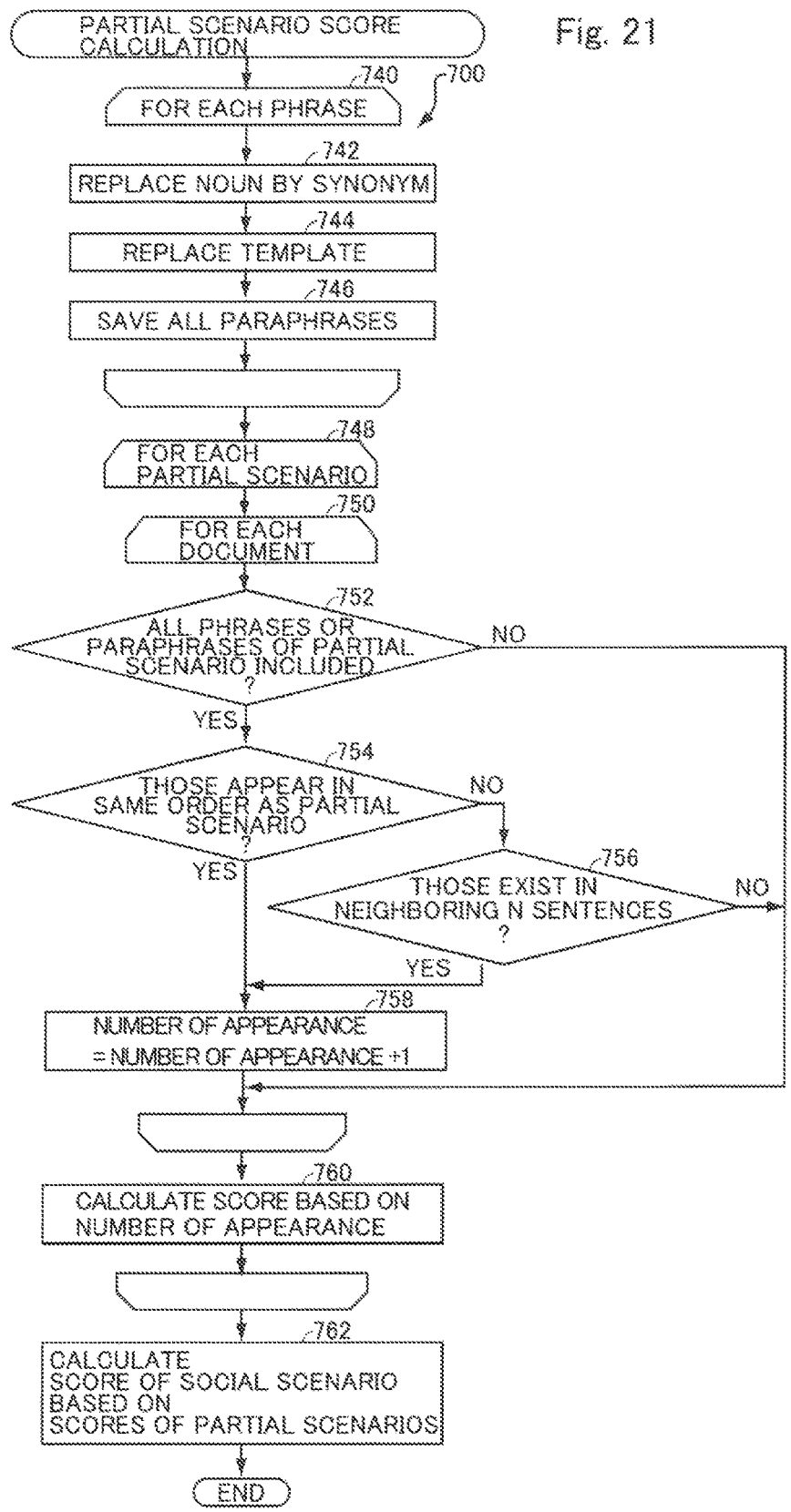
FIG. 21 is a flowchart representing a control structure of a program realizing a partial scenario score calculator shown in FIG. 20 by a computer.

Similar to many other functional units, social scenario ranking unit 670 can be realized by computer hardware and a computer program executed on the computer hardware. FIG. 21 shows, in the form of a flowchart, a control structure of the computer program for this purpose. The program is for executing the process described above on a certain social scenario.

Referring to FIG. 21, a program executed by partial scenario score calculator 700 includes a step 740 of executing the following process on every phrase of the social scenario as an object of processing. Specifically, step 740 includes: a step 742 of replacing a noun of the phrase with words of the same class (synonyms) and thereby generating new phrases; a step 744 of replacing a template of the phrase with other templates of the same polarity and generating a larger number of phrases by combining with the new phrases generated at step 742; and a step 746 of storing all the new phrases generated at step 744 (hereinafter referred to as "paraphrases") and the original phrase to a storage, not shown. Steps 742, 744 and 746 are the process steps executed on each phrase at step 740.

The program further includes a step 748 of executing, after the completion of step 740, the following process on all partial scenarios obtained by combining the resulting phrases.

Step 748 includes a step 750 of executing the following process on all documents on the Internet 40. Here, all the documents may be limited to documents existing in a prescribed site on the Internet 40.

Step 750 includes: a step 752 of determining whether or not a document as the object of processing includes all phrases or paraphrases (those saved at step 746) of the partial scenarios of the social scenario as the object of processing, and branching the control depending on the result of determination; a step 754, executed if the determination in step 752 is in the positive, of determining whether or not the phrases or paraphrases appearing in the document appear in the same order as the original phrases in the partial scenario; a step 758, executed if the determination at step 754 is in the positive, of incrementing the number of appearance of the partial scenario by one; and a step 756, executed if the determination at step 754 is in the negative, of determining whether the phrase or paraphrase appearing in the document under processing exists in neighboring N sentences or not. If it is YES at step 756, the control proceeds to step 758. If it is NO at step 756, or if it is NO at step 752, the control proceeds to processing of the next document.

When the process at step 750 is completed on all the documents, the control proceeds to step 760. At step 760, the score for the partial scenario under processing is calculated in accordance with a score calculation function that is a function of the number of appearance calculated at step 758 and becomes higher as the number of appearance becomes higher.

When the process of step 748 is completed for all partial scenarios, the control proceeds to step 762. At step 762, the score of the social scenario under processing is calculated in accordance with a score calculation function that is a function of the scores of partial scenarios included in the social scenario and becomes higher as the scores of partial scenarios become higher, and the result is added as a score to the social scenario under processing.

<Modifications>

Many modifications may be made to the embodiments described above. Such modifications will be enumerated below.

For example, the following methods may be used for the scoring of social scenarios individually or in combination.

(1) The score of a social scenario is made higher when the maximum length of partial scenarios described in documents in WEB archive 44 becomes longer.

(2) When documents describing the same partial scenarios are hyper-linked, the score of social scenario including the partial scenarios is made higher.

(3) Even when documents describing the same partial scenarios are not hyper-linked, if these are indirectly hyper-linked with another one or a plurality of documents interposed, the score of social scenario is made higher.

(4) Documents may be scored with respect to importance, and the score of social scenario may be increased/decreased in accordance with the score of document carrying a partial scenario. Here, as the importance score of a document, a value of so-called PageRank, for example, may be used. Alternatively, document importance may be weighted in accordance with domain type of the site carrying the document. For instance, documents posted on sites of governmental, educational or international organizations' domains may have importance scores higher than others. Importance scores of anonymous blogs, for example, may be made lower.

(5) When a plurality of partial scenarios described in a document have overlapping portions in one social scenario, the scores of these partial scenarios may be made higher, and the score of the social scenario including these may be made higher accordingly. Here, the score may be made higher if the overlapping scope is wider.

For example, consider a generated social scenario "a→b→c→d→e→f→g→ . . . ." When we look at a first partial scenario "a→b→c→d" and a second partial scenario "c→d→e→f" of the social scenario, there is an overlapping portion "c→d" in these two partial scenarios. Here, assume that the first partial scenario is described in a first WEB document and the second partial scenario is described in second and third WEB documents. Since the first partial scenario is described in one WEB document, its score is increased. Since the second partial scenario is described in two documents, its score is further increased. The two partial scenarios have an overlapping portion and, therefore, scores of these are both increased in accordance with the scope (two portions) of the overlap.

(6) In the second embodiment, the number of appearances of partial scenarios in documents is counted, including paraphrases having nouns and predicate templates in the phrases replaced. The present invention, however, is not limited to such an embodiment. An embodiment not involving replacement of a noun or predicate template or either may be possible.

(7) The score of a social scenario having contents contradictory to another social scenario may be decreased. In this regard, in two social scenarios derived from one same cause phrase, if result phrases included in parts of these contradict to each other, the social scenarios can be regarded as contradictory. Contradictory phrases may be prepared in advance manually in the form of a dictionary, or they may be automatically collected by the same method as applied to the causality phrase pairs described in the first embodiment. When contradictory phrase pairs (contradictory pairs) are to be collected, the phrase pairs are collected under the following conditions, in place of the process shown in FIG. 12.

(1) Each of the two phrases consists of one noun and one excitatory or inhibitory template. Example: "(kaze) ni kakaru: catch (cold)" and "(kaze) wo yobo suru: prevent (cold)".

(2) Two nouns included in the two phrases have the same meaning (or are exactly the same). Example: combination such as <kaze, kambo> (cold, rheum) or <kaze, kaze> (cold, cold).

(3) One of the two templates included in the two phrases is excitatory and the other is inhibitory. Example: "ni kakaru (catch)" (excitatory) and "wo yobo suru (prevent)" (inhibitory).

(4) The two templates share many nouns that co-occur (have dependency) on the Internet. Specifically, these two templates have high similarity of distribution. For example, nouns co-occurring with "ni kakaru (catch)" may include kaze (cold), kambo (rheum), haien (pneumonia), while nouns co-occurring with "wo yobo suru (prevent)" may include kaze (cold), kambo (rheum), haien (pneumonia), kaji (fire), saigai (disaster), and similarity of distribution is high between the two.

(5) The frequency of occurrence of each phrase is equal to or higher than a prescribed threshold value on the Internet. Specifically, the noun in each phrase and the template have the dependency relation with the frequency being equal to or higher than the threshold value. For example, it is necessary that the condition of frequency of occurrence "(kaze) ni kakaru: catch (cold)"≥threshold value and the condition of "(kaze) wo yobo suru: prevent (cold)"≥threshold value must both be satisfied.

(6) Further, phrase pairs having synonymous or similar predicate templates but having nouns of opposite meanings/antonyms may be regarded as contradictory phrase pair. In order to determine whether templates are synonymous or similar, distributional similarity of the two in a document corpus of large amount (for example, WEB archive 44) may be used as an index, or a database or the like manually verified may be used. Similar method may be used for determining antonyms of nouns.

(7) When a social scenario includes mutually contradictory phrases, the score of the social scenario may be decreased. An example may be " . . . →coup d'état occurs→public safety deteriorates . . . →public safety improves."

[Computer Implementation]

Figure 22:
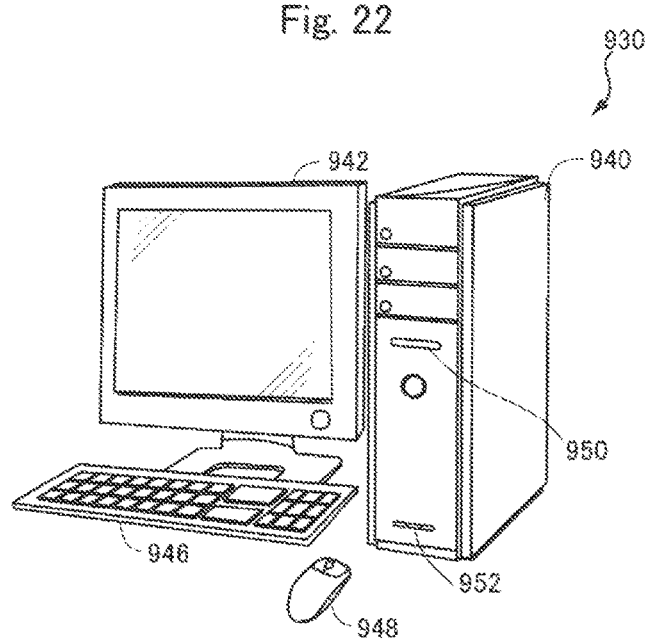
FIG. 22 shows an appearance of a computer for realizing the social scenario generating system in accordance with the embodiments of the present invention.

The system in accordance with the embodiments above can be implemented by computer hardware and computer programs executed on the computer hardware. FIG. 22 shows an appearance of computer system 930 and FIG. 23 shows an internal configuration of computer system 930.

Referring to FIG. 22, computer system 930 includes a computer 940 having a memory port 952 and a DVD (Digital Versatile Disk) drive 950, a keyboard 946, a mouse 948, and a monitor 942.

Figure 23:
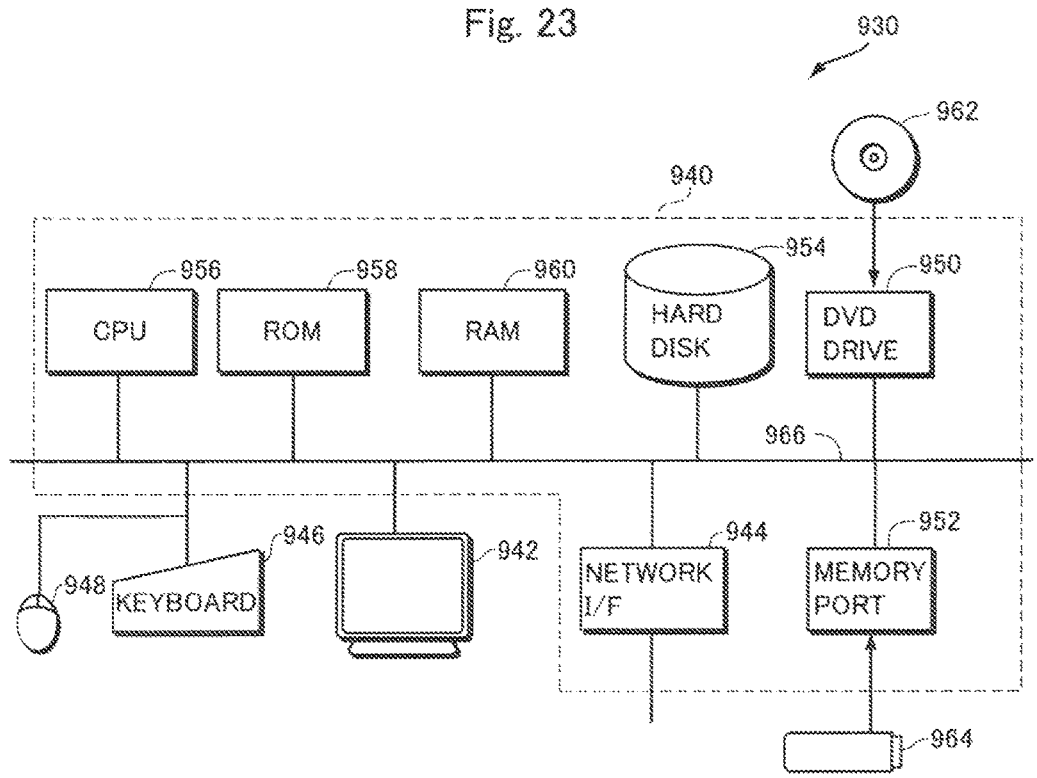
FIG. 23 is a block diagram showing hardware configuration of the computer shown in FIG. 22.

Referring to FIG. 23, computer 940 includes, in addition to memory port 952 and DVD drive 950, a CPU (Central Processing Unit) 956, a bus 966 connected to CPU 956, memory port 952 and DVD drive 950, a read only memory (ROM) 958 storing a boot-up program and the like, and a random access memory (RAM) 960 connected to bus 966, storing program instructions, a system program and work data. Computer system 930 further includes a network interface (I/F) 944 providing the computer 940 with the connection to a network allowing communication with another terminal.

The computer program causing computer system 930 to function as each of the functioning sections of the system in accordance with each of the embodiments above is stored in a DVD 962 or a removable memory 964 loaded to DVD drive 950 or to memory port 952, and transferred to hard disk 954. Alternatively, the program may be transmitted to computer 940 through a network, not shown, and stored in hard disk 954. At the time of execution, the program is loaded to RAM 960. The program may be directly loaded from DVD 962, removable memory 964 or through network to RAM 960.

The program includes a plurality of instructions to cause computer 940 to operate as functioning sections of the system in accordance with each of the embodiments above. Some of the basic functions necessary to realize the operation are provided by the operating system (OS) running on computer 940, by a third party program, or by a module of various programming tool kits installed in computer 940. Therefore, the program may not necessarily include all of the functions necessary to realize the system and method of the present embodiment. The program has only to include instructions to realize the functions of the above-described system by calling appropriate functions or appropriate program tools in a program tool kit in a manner controlled to attain desired results. The operation of computer system 930 is well known and, therefore, description thereof will not be given here.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to a system for providing useful information that can be inferred based on a huge amount of electronically available documents of various and wide fields in accordance with relations among events and incidents described in the documents but that cannot be obtained by simple information search or by existing question-answering system to users in a form of social scenarios, as well as providing users with appropriate actions to be taken next based on such social scenarios.

REFERENCE SIGNS LIST 30 social scenario generating system
32 seed template DB
34 conjunction DB
36 social scenario DB builder
38 social scenario DB
40 Internet
42 WEB crawler
44 WEB archive
46 word class DB
48 social scenario output unit
60 simple predicate template collector
62 simple predicate template DB
64 complex predicate template collector
66 complex predicate template DB
68 causality phrase pair collector
70 causality phrase pair DB
72 social scenario generator
90 initial template pair generator
92 initial template pair DB
94 noun pair collector
96 noun pair DB
98 noun pair polarity determiner
100 template pair collector
102 template pair DB
104 template excitation match determiner
106 template network builder
108 synonym/entailment dictionary
110 template network DB
112 template excitation value calculator
114 high excitation value template extractor
116 end determiner
118 seed template updater
140 template network
260 object noun dictionary
262 sahen-noun polarity dictionary
264 sahen-noun polarity determiner
266 trouble-noun polarity determining dictionary
268 complex predicate template candidate extractor
270 sahen-noun template candidate DB
272 quantifier noun template candidate DB
274 trouble-noun template candidate DB
276 sahen-noun polarity adder
278 quantifier noun polarity adder
280 trouble-noun polarity adder
282 complex predicate template polarity calculator
400 semantic relation pattern DB
402 word pair DB
404 seed pattern DB
406 word pair extractor
408 causality seed pair collector
410 causality seed pair DB
412 causality hypothesis generator
416 causality hypothesis DB
418 causality hypothesis filter
420 noun polarity dictionary
422 contradictory expression dictionary
470 semantic relation pattern matching unit
472 word pair replacing unit
474 score calculator
490 pattern extractor
492 pattern DB
494 word pair candidate obtaining unit
496 word pair candidate DB
498 word pair scorer
500 word pair selector
502 class pair goodness of fit calculator
504 class pair goodness of fit DB
506 pattern similarity calculator
508 pattern similarity DB
510 association information calculator
512 association information DB
514 excluded class pair specifying unit
516 excluded class pair DB
518 pattern merger
550 consistency verifying filter
552 relevance filter
554 appearance order verifying filter
556 noun appearance frequency filter
558 noun appearance frequency calculator
560 noun appearance frequency DB
562 modified-noun extractor
564 excluded-word DB
566 word-excluding filter
580 social scenario candidate generator
582 social scenario ranking unit
600, 602, 604 synonymity generator
606 join relation generator
608 join information generator 610 join relation DB
612 causality joining unit
614 template distributional similarity DB
616 distributional similarity calculator
618 social scenario candidate DB
640 overall causality score calculator
642 score-added social scenario candidate DB
644 social scenario sorter
646 sorted social scenario candidate DB
648 social scenario selector
700 partial scenario score calculator
702 social scenario score storage
704 overall causality score calculator

The invention claimed is:

1. A scenario generating apparatus, comprising:
a first non-transitory computer readable medium for storing a large number of causality phrase pairs, wherein:
   each causality phrase pair of said large number of causality phrase pairs includes two phrases comprising a cause phrase and a result phrase of causality; and
   each phrase includes a noun and a predicate template following the noun; and
a processor for generating a scenario formed of a series of phrases, by linking those of the phase pairs stored in said first non-transitory computer readable medium which are linkable as causality, the processor configured to generate the scenario by:
   for each of said large number of causality phrase pairs, searching said first non-transitory computer readable medium for a causality phrase pair having a cause phrase with causal consistency with the result phrase of the causality phrase pair;
   generating join information for joining causality phrase pairs comprising:
      accessing a plurality of phrase pairs stored in said first non-transitory computer readable medium, wherein each phrase pair of the plurality of phrase pairs includes a first phrase and a second phrase;
      for each phrase pair of the plurality of phrase pairs:
         identifying a noun word included in the first phrase of the phrase pair;
         identifying a noun word stored in the second phrase of the phrase pair; and
         specifying in the join information, a causal consistency between the noun word included in the first phrase and the noun word included in the second phrase,
   storing the join information in a second non-transitory computer readable medium comprising non-transitory computer readable medium,
   designating an arbitrary phrase pair as an initial scenario,
   using the join information stored in said second non-transitory computer readable medium, searching said first non-transitory computer readable medium for a phrase pair including a cause phrase having causal consistency with a result phrase at a tail of the initial scenario,
   linking the searched out causality phrase pair to the tail of said initial scenario, and
   generating the scenario by continuing to link, starting from the designated initial scenario, a causality phrase pair to the tail of the scenario until a predetermined end condition is satisfied, such that:
      when the predetermined end condition is satisfied, the generated scenario is stored in a scenario database comprising a non-transitory computer readable medium; and
      when the predetermined end condition is not satisfied, the generating of the scenario continues.

2. The scenario generating apparatus according to claim 1, wherein a polarity is assigned beforehand to said predicate template, and said processor is further configured to detect from said first non-transitory computer readable medium said phrase pair having causal consistency using the polarity of predicate template included in each phrase.

3. The scenario generating apparatus according to claim 2, wherein said processor is further configured to search said first non-transitory computer readable medium, for each of said large number of causality phrase pairs, for a causality phrase pair having a cause phrase sharing a noun of semantic sameness with a result phrase of the causality phrase pair and having a predicate template of the same polarity, and for generating join information for joining from the original causality phrase pair to the searched out causality phrase pair.

4. The scenario generating apparatus according to claim 2, wherein said processor is further configured to search said first non-transitory computer readable medium, for each of said large number of causality phrase pairs, for a causality phrase pair having a cause phrase sharing a noun of semantic sameness with a result phrase of the causality phrase pair and having same sentiment polarity as a whole phrase, and for generating join information for joining from the original causality phrase pair to the searched out causality phrase pair.

5. The scenario generating apparatus according to claim 1:
further comprising third non-transitory computer readable medium for storing distributional similarity of predicate templates in a corpus; and
the processor is further configured to search said first non-transitory computer readable medium, for each of said large number of causality phrase pairs, for a causality phrase pair having a cause phrase sharing a noun of semantic sameness with a result phrase of the causality phrase pair and having the distributional similarity of predicate template equal to or higher than a threshold value, and for generating join information for joining from the original causality phrase pair to the searched out causality phrase pair.

6. The scenario generating apparatus according claim 2:
further comprising a third non-transitory computer readable medium for storing a word pair consisting of first and second words having a prescribed semantic relation with each other, with a word order of first to second; and
the processor is further configured to generate, for each of the word pairs stored in said third non-transitory computer readable medium, connection information for connecting a causality phrase pair having the first word of the word pair to a causality phrase pair having the second word of said word pair.

7. A computer program causing a computer including to function as the processor recited in claim 1.

8. The scenario generating apparatus according claim 3:
further comprising third non-transitory computer readable medium for storing a word pair consisting of first and second words having a prescribed semantic relation with each other, with a word order of first to second; and the processor is further configured to generate, for each of the word pairs stored in said third non-transitory computer readable medium, connection information for connecting a causality phrase pair having the first word of the word pair to a causality phrase pair having the second word of said word pair.

9. The scenario generating apparatus according claim 4:
further comprising a third non-transitory computer readable medium for storing a word pair consisting of first and second words having a prescribed semantic relation with each other, with a word order of first to second; and the processor is further configured to generate, for each of the word pairs stored in said third non-transitory computer readable medium, connection information for connecting a causality phrase pair having the first word of the word pair to a causality phrase pair having the second word of said word pair.

10. The scenario generating apparatus according claim 5:
further comprising a fourth non-transitory computer readable medium for storing a word pair consisting of first and second words having a prescribed semantic relation with each other, with a word order of first to second; and the processor is further configured to generate, for each of the word pairs stored in said fourth non-transitory computer readable medium, connection information for connecting a causality phrase pair having the first word of the word pair to a causality phrase pair having the second word of said word pair.

11. A computer program causing a computer to function as the processor recited in claim 2.

12. A computer program causing a computer to function as the processor recited in claim 3.

13. A computer program causing a computer to function as the processor recited in claim 4.

14. A computer program causing a computer to function as the processor recited in claim 5.

15. A computer program causing a computer to function as the processor recited in claim 6.

* * * * *